US006983420B1

(12) United States Patent  
Itou et al.

(10) Patent No.: US 6,983,420 B1  
(45) Date of Patent: Jan. 3, 2006

(54) MOTION PICTURE INFORMATION DISPLAYING METHOD AND APPARATUS

(75) Inventors: Tsutomu Itou, Kodaira (JP); Hirotada Ueda, Kokubunji (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/517,173

(22) Filed: Mar. 2, 2000

(30) Foreign Application Priority Data

Mar. 2, 1999 (JP) .................................. 11-054441  
Apr. 27, 1999 (JP) .................................. 11-119104

(51) Int. Cl.  
*H04N 5/93* (2006.01)

(52) U.S. Cl. ........................................ 715/723; 715/854

(58) Field of Classification Search ................ 345/723, 345/724, 725, 762, 806, 807; 715/719–726, 715/968, 853–855; 707/10, 1.3; 382/305, 382/199; 386/52, 64  
See application file for complete search history.

(56) References Cited

U.S. PATENT DOCUMENTS

| 5,537,528 A * | 7/1996 | Takahashi et al. .......... 715/512 |
| 5,606,655 A * | 2/1997 | Arman et al. ............... 345/440 |
| 5,956,453 A * | 9/1999 | Yaegashi et al. ............ 386/52 |
| 6,115,037 A * | 9/2000 | Sumiyoshi et al. ......... 345/726 |
| 6,195,497 B1 | 2/2001 | Nagasaka et al. |
| 6,310,625 B1 * | 10/2001 | Yoshio et al. .............. 345/473 |
| 6,356,899 B1 * | 3/2002 | Chakrabarti et al. .......... 707/5 |
| 6,487,360 B1 * | 11/2002 | Sumiyoshi et al. ........... 386/52 |
| 6,526,215 B2 * | 2/2003 | Hirai et al. ................... 386/52 |
| 6,628,303 B1 * | 9/2003 | Foreman et al. ............ 345/723 |

FOREIGN PATENT DOCUMENTS

| EP | 0843311 | 5/1998 |
| JP | 7175816 | 7/1995 |

OTHER PUBLICATIONS

H. Ueda, "Automatic Scene Separation and Tree Structure GUI for Video Editing", Proceeding of ACM Multimedia 96, Nov. 18-22, 1996, pp. 405-406.

\* cited by examiner

*Primary Examiner*—Steven P Sax  
(74) *Attorney, Agent, or Firm*—Mattingly, Stanger, Malur & Brundidge, P.C.

(57) ABSTRACT

An image information displaying method and apparatus for the edition of a motion picture are disclosed in which representative image representing a series of frame images forming the motion picture are displayed on a screen of a display device and a hierarchical structure based on a plurality of representative images is generated on the screen through an operation using a GUI to perform the edition of the motion picture. A plurality of frame images included in the representative image are subjected to an image detection processing for detecting frame images having a predetermined image recorded thereon. Information indicating the detected frame image having the predetermined image recorded thereon is displayed as a detection result displaying window on the screen. Information concerning frame images having not been subjected to the image detection processing is displayed on the detection result displaying window.

17 Claims, 43 Drawing Sheets

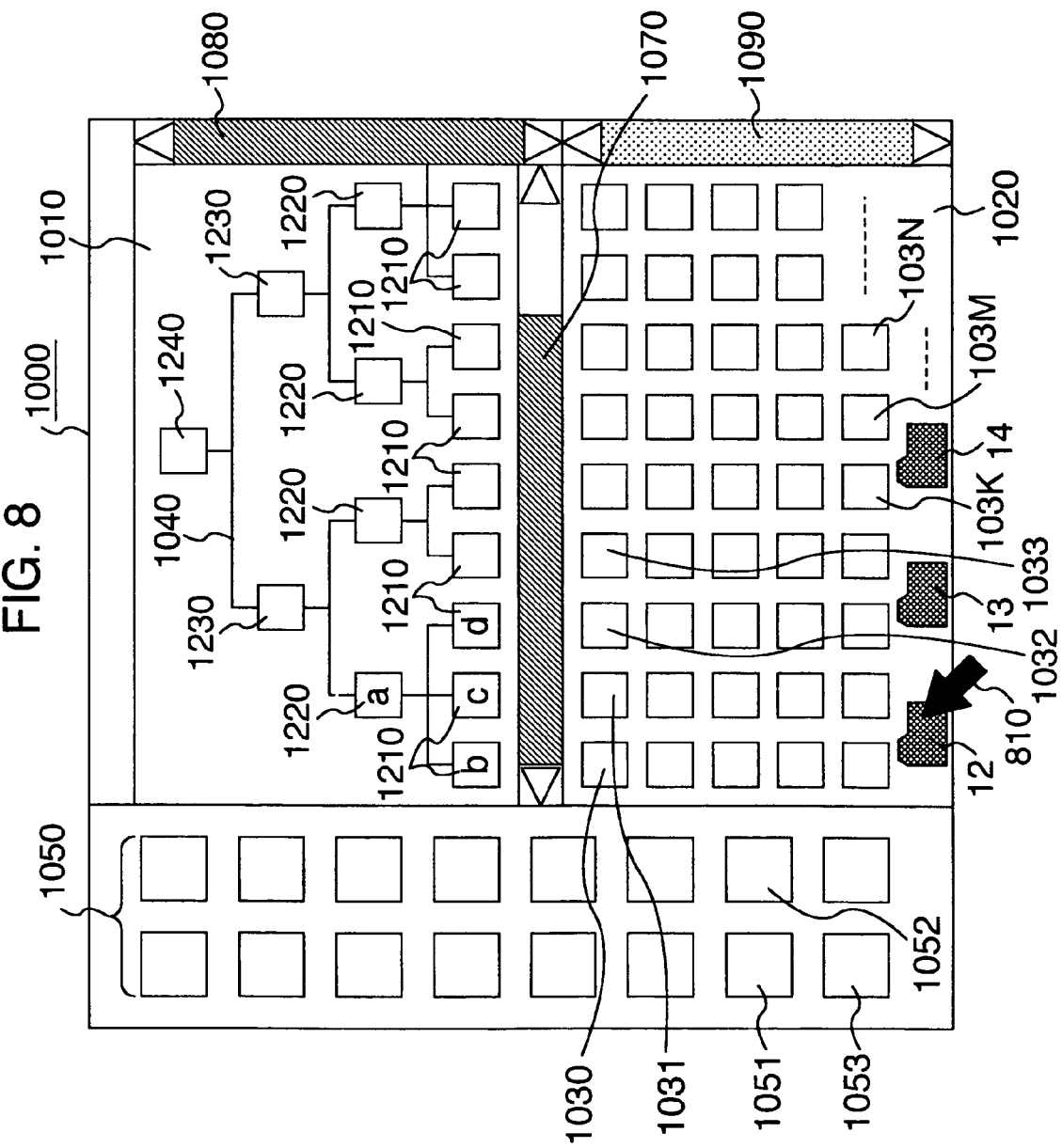

FIG. 35

ATTACH STRUCTURE 7000(a)

| POINTER TO NEXT ATTACH STRUCTURE | ~71 |
| SCENE NUMBER | ~72 |
| - - - - | |

ATTACH STRUCTURE 7000(b)

| POINTER TO NEXT ATTACH STRUCTURE | ~73 |
| SCENE NUMBER | ~74 |
| - - - - | |

ATTACH STRUCTURE 7000(c)

| POINTER TO NEXT ATTACH STRUCTURE | ~75 |
| SCENE NUMBER | ~76 |
| - - - - | |

FIG. 36

SCENE STRUCTURE 7100

| POINTER TO SCENE STRUCTURE OF LOWERMOST TREE LAYER | ~77 |
| --- | --- |
| DISPLAY CLASS NUMBER | ~78 |
| SCENE NUMBER | ~79 |
| CUT NUMBER | ~80 |
| - - - - | |

SCENE STRUCTURE 7100 A

| POINTER TO SCENE STRUCTURE OF LOWERMOST TREE LAYER | ~81 |
| --- | --- |
| DISPLAY CLASS NUMBER | ~82 |
| SCENE NUMBER | ~83 |
| CUT NUMBER | ~84 |
| - - - - | |

SCENE STRUCTURE 7100 B

| POINTER TO SCENE STRUCTURE OF LOWERMOST TREE LAYER | ~85 |
| --- | --- |
| DISPLAY CLASS NUMBER | ~86 |
| SCENE NUMBER | ~87 |
| CUT NUMBER | ~88 |
| - - - - | |

SCENE STRUCTURE 7100 C

| POINTER TO SCENE STRUCTURE OF LOWERMOST TREE LAYER | ~89 |
| --- | --- |
| DISPLAY CLASS NUMBER | ~90 |
| SCENE NUMBER | ~91 |
| CUT NUMBER | ~92 |
| - - - - | |

FIG. 37B
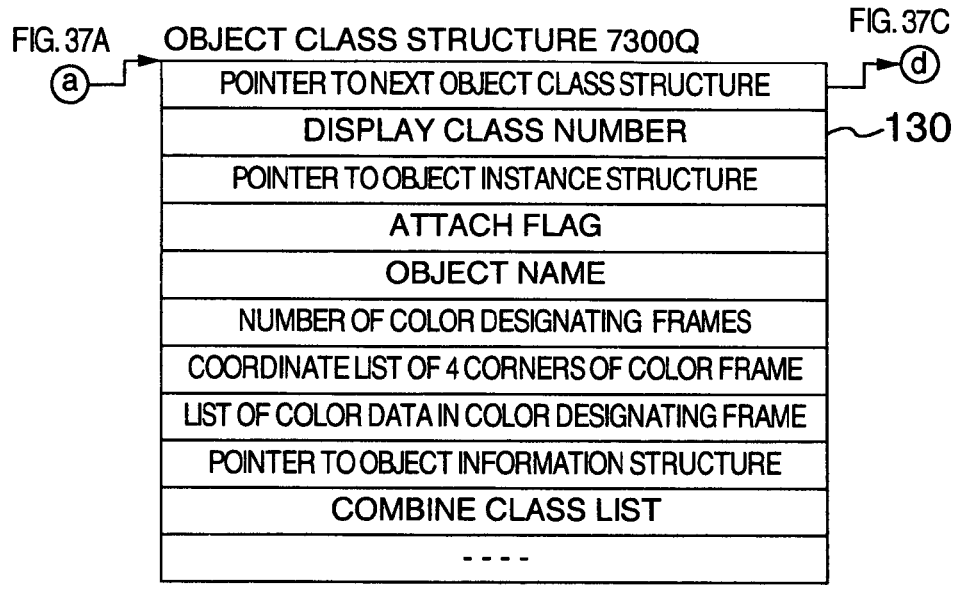
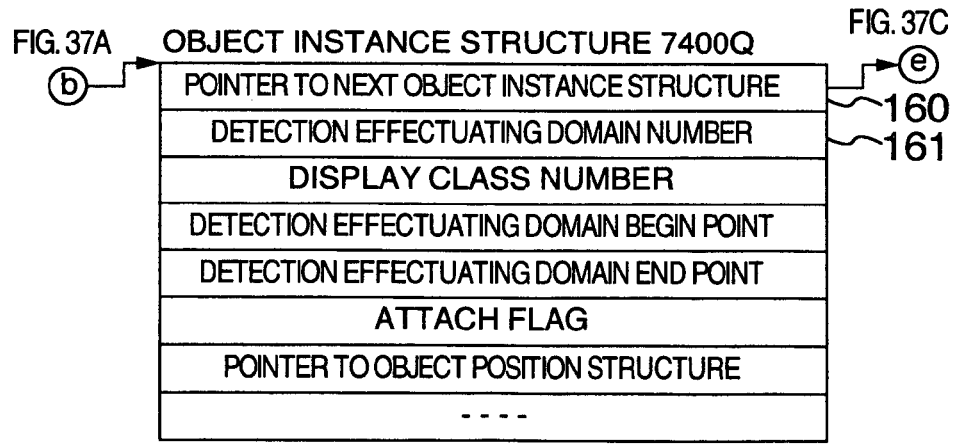
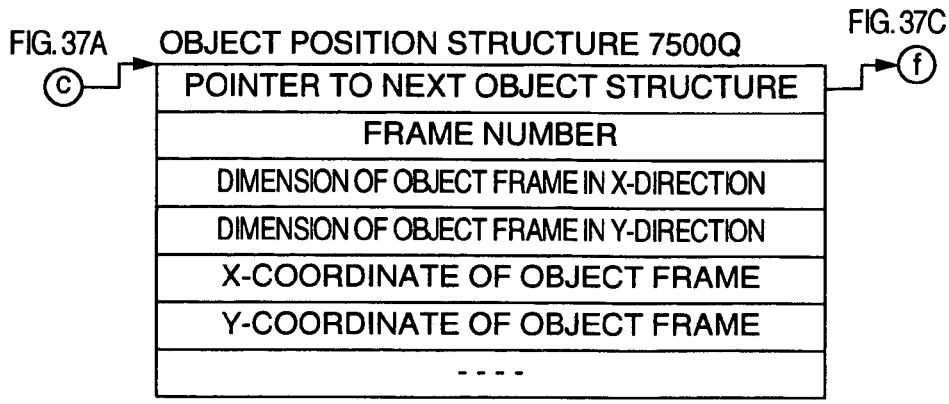

FIG. 37C
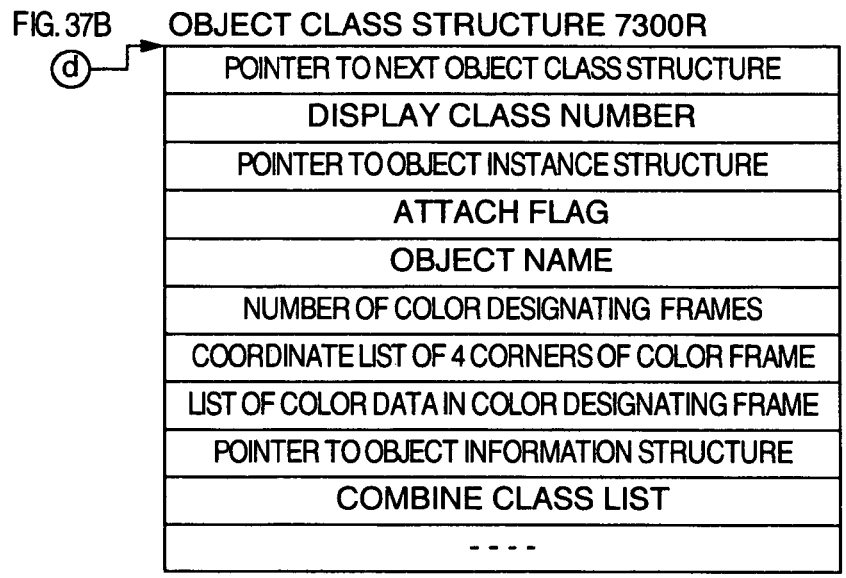
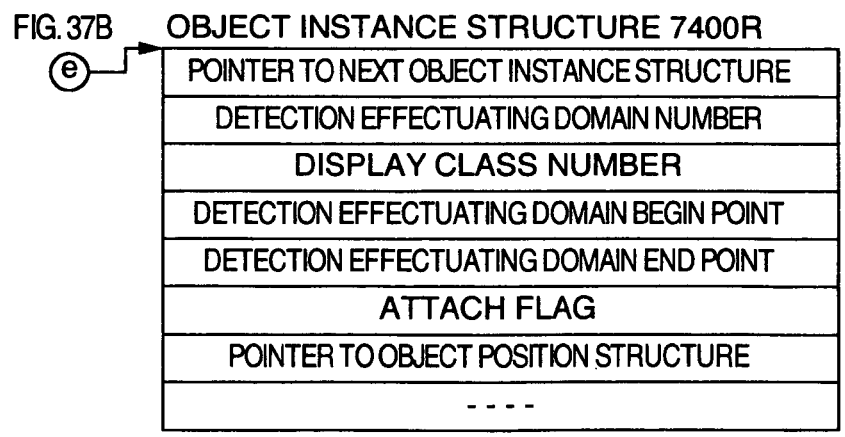
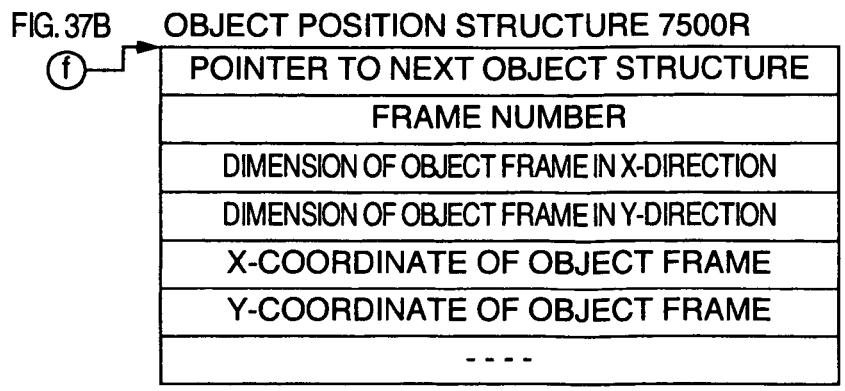

MOTION PICTURE INFORMATION DISPLAYING METHOD AND APPARATUS

BACKGROUND OF THE INVENTION

The present invention relates to an image information displaying method and apparatus in which a motion picture is edited by operating icons or screen menus on a display screen by means of a GUI (Graphical User Interface).

In recent years, the enhancement of speed of computers and the improvement in functionality thereof have brought about the rapid progress of the variegation and improvement in functionality of software. The improvement in functionality of a production equipment for producing or arranging a TV broadcast program or video program has been advanced by use of a computer and an image editing program.

Particularly, in the recent program arrangement, the edition of image information using a motion picture editing apparatus with a random access information storage device (for example, a hard disk which is easy of handling and preservation and is low in cost) is made in lieu of an image editing method in which a video tape recorder is used to edit an image by repeating the quick feed and rewind depending a tape counter. The use of such a motion picture editing apparatus in combination with a computer and software improved in functionality and variegated has made the progress of more improvement in functionality of the motion picture editing apparatus. Here, the image information is any information which concerns an image and may include voice.

FIG. 4 shows an example of display on a screen used for an edition processing in a motion picture editing apparatus for editing a motion picture by use of a computer. With the use of a motion picture editing apparatus provided with a required edition processing software in a memory device, image information of a motion picture to be edited can be managed in a manner stored in the memory device. Reduced versions of cut images or scene images of a motion picture stored in the memory device are displayed as moving icons (M-icons) on a monitor screen to form a tree structure having cut images or scene images as its unit, thereby making it possible to perform an editing work for the motion picture. In the screen shown in FIG. 4, reference numeral 1000 denotes an editing window, numeral 1010 an editing area, numeral 1020 a material area, numerals 1030, 1031, 1032, 1033, - - -, 103K, 103M, 103N, - - - moving icons of image materials or sources displayed in the material area 1020 (where K, M and N are natural numbers and K=N−2 and M=N−1 are satisfied), and numeral 1040 a tree structure which is formed by moving icons and represents the contents of edition of an edited motion picture.

The cut images, scene images, moving icons (M-icons) and so forth will now be described.

A cut image 1210 is a set of frame images obtained through one photographing by a TV camera from its start to its end, and a representative image representing a series of frame images.

A scene image 1220 is a set of plural cut images 1210 obtained for a predetermined object of photographing.

A plurality of scene images 1220 may be gathered to provide a block 1230. A plurality of blocks 1230 can be gathered on the basis of a specified theme of photographing to provide or display an edited motion picture (or program) 1240 of the specified photographing theme.

Thus, a motion picture to be edited can be arranged as image data with a hierarchical structure (or tree structure) which may be formed by several cut images 1210 selected from among a plurality of cut images 1030, 1031, 1032, 1033, - - -, 103K, 103M, 103N, - - - as image materials in compliance with a specified theme of photographing, scene images 1220 each including the collection of a plurality of cut images 1210, blocks 1230 each including a group of selected scene images 1220, and a motion picture 1240 including the collection of blocks 1230 and providing a program with a title.

This tree structure is ordered and applied with data of a series of frame numbers for a motion picture, frame numbers of images at detected cut change points, cut image numbers serially applied to cut images, and sequence numbers representing the sequence of plural cut images each forming a scene image. This data or hierarchical structure information is included in control information used in the motion picture editing apparatus.

The M-icons are GUI (Graphical User Interface) parts each having a one-to-one correspondence to a cut image, that is, a representative image representing a series of frame images obtained through one photographing from its start to its end.

The M-icon is an image for the purpose of display which has a size reduced at a required ratio. The M-icons are displayed in the case where scene images or the whole or a part of a motion picture formed by a plurality of frame images are to be viewed promptly, as required. Otherwise, the M-icons may be displayed as representative ones of cut images.

The monitor screen provides a GUI screen for displaying edition information of cut images, scene images and a tree structure representative of the state of edition which is used for the edition of a motion picture. An editor uses an input device (for example, a mouse or keyboard) to select this edition information displayed on the monitor screen, thereby making it possible to give an instruction to the motion picture editing apparatus.

Thus, with the construction in which a motion picture to be edited is stored and managed as a tree structure, the motion picture editing apparatus is enabled to arrange a program and to perform an editing work with cut images or scene images taken as units.

The screen of the motion picture editing apparatus shown in FIG. 4 can be used, as a specific example, in the case where image materials 1030–1033 of an existing news program are used as materials of edition to prepare another news program (e.g. a digest version) newly.

In the display screen shown in FIG. 4, reference numeral 1050 denotes a group of edition function buttons for selecting various control functions used in an editing work, numeral 1051 a character (or appearing person) detecting button, numeral 1052 a tree structure forming button, numeral 1070 a slider for sliding the display contents of the editing area 1010 in a lateral direction, numeral 1080 a slider for sliding the display contents of the editing area 1010 in a longitudinal direction, numeral 1090 a slider for sliding the display contents of the material area 1020 in a longitudinal direction, numeral 1210 M-icons representative of cut images registered in the editing area 1010, numeral 1220 an M-icon representative of a scene image formed by one or plural cut images, numeral 1230 an M-icon formed one or more scene images, numeral 1240 an M-icon representative of a motion picture (or program) edited in compliance with a given theme, and numeral 810 a mouse pointer displayed on the GUI screen when a GUI operation is performed by a pointing device such as a mouse. Though the M-icon has thereon the corresponding reduced image for the purpose of display, the illustration or depiction of this reduced image will be omitted for avoiding the complexity, so long as there is no special necessity.

In FIG. 4, the tree structure 1040 formed by the M-icons in the editing area 1010 is such that one or plural M-icons 1210 on a first hierarchical layer representing cut images selected for edition are collected to form an M-icon 1220 representative of a scene image as a second hierarchical layer on the first hierarchical layer, one or plural M-icons 1220 representing the scene images are collected to form an M-icon 1230 representative of the collection of specified scene images as a third hierarchical layer on the second hierarchical layer, and a plurality of M-icons 1230 each representing the collection of specified scene images are finally collected to form an M-icon 1240 representing a program edited in compliance with a theme.

The number of hierarchical layers in the tree structure 1040 may be arbitrary. It is of course that an upper hierarchical layer can further be provided. Since the size of the window of the editing area 1010 is limited, there may be the case where it is not possible to display the whole of the tree structure 1040 within the editing area 1010. In order to see an undisplayed portion, the slider 1070 or 1080 is operated by use of the input device to move the display contents of the editing area 1010 in a required lateral or longitudinal direction, thereby making it possible to view the whole of the tree structure 1040.

In the material area 1020, different cut images obtained by detecting cut change points for a series of motion picture materials and dividing them at the cut change points are temporarily located as image material M-icons 1030, 1031, 1032, 1033, - - - , 103K, 103M, 103N, - - - which are displayed so that it is possible to take a look at them.

At a stage in which the editing work proceeds to the invocation of images so that M-icons 1030, 1031, 1032, 1033, - - - , 103K, 103M, 103N, - - - are generated and displayed, the M-icons 1030, 1031, 1032, 1033, - - - , 103K, 103M, 103N, - - - are displayed in the material area 1010 at a time serial sequence in the left to right direction and the up to down direction.

Also for the M-icons 1030, 1031, 1032, 1033, - - - , 103K, 103M, 103N, - - - in the material area 1020, there may be the case where the number of the M-icons is large so that they cannot be displayed in the window of the material area 1020 at once, as in the case of the editing area 1010. In that case, the slider 1090 can be operated by use of the input device to move the display contents of the material area 1020 in the longitudinal direction, thereby making it possible to view all the M-icons.

In order to perform the edition, M-icons required for edition are selected from the material area 1020 and the tree structure forming button 1052 in the function button group 1050 is then turned on. Thereby, the selected M-icon 1030 is moved or copied into the editing area 1010. Thus, the tree structure 1040 is formed to make progress on the edition.

FIG. 4 shows a state in which the progress of the edition to a certain extent is attained so that the tree structure 1040 has already been formed in the editing area 1010 and the edition is then continued to further select desired M-icons from among the M-icons 1030, 1031, 1032, 1033, - - - , 103K, 103M, 103N, - - - in the material area 1020.

The M-icon displayed in the material area 1020 or the editing area 1010 is shown as one card in the illustration of the figure. However, this is a simplified form. On the actual monitor screen, each M-icon is displayed in a form having the thickness of superimposition of frame images possessed by that M-icon.

Though the edition of the motion picture is advanced, there is less the case where image materials actually required for the arrangement of a program are all image information stored in the information storage device (cut images or a series of motion pictures read as a file of one motion picture).

Namely, there may not be the case where all the plurality of M-icons 1030, 1031, 1032, 1033, - - - , 103K, 103M, 103N, - - - displayed in the material area 1020 become =necessary. Only image materials associated with some M-icons selected in accordance with an object of edition or a theme of photographing are used for a program.

Also, since it is general that a plurality of scenes are included in the image materials, a search is made so that M-icons required for edition are selected from among a multiplicity of M-icons 1030, 1031, 1032, 1033, - - - , 103K, 103M, 103N, - - - included in image materials or image information read from the information storage device.

The operation of the motion picture editing apparatus using the screen shown in FIG. 4 and the method of performing the edition of a motion picture while forming a tree structure by use of M-icons have been disclosed by, for example, JP-A-10-51733.

Also, JP-A-2-184181 has disclosed an example of means for detecting change points for cut images, that is, a technique of analyzing the illuminance, sound volume, color tone or the like of a motion picture to detect a portion with a remarkable change as a change point for a cut image.

In order to perform the edition of a motion picture as mentioned above, it is required for an editor that an M-icon representing a cut necessary for the program should be selected from among the plurality of M-icons 1030, 1031, 1032, 1033, - - - , 103K, 103M, 103N, displayed in the material area 1020.

One function supporting the search for the necessary M-icon is a character detecting function. The character detecting function detects an object such as a specified character or person from image materials or plural cuts or scenes. Here, this specified character, that is object is assumed as "X".

With the character detecting function, an operator selects and inputs the combination of features possessed by the object "X" so that a search for a frame conformable to those features and its pixel region is made from image materials or plural cuts or scenes (that is, images in a section subjected to detection) by use of an image recognition technique.

JP-A-6-223179 has disclosed a method in which a cut containing a specified object therein is detected from a motion picture on the basis of the features of that character.

First, the operator designates the combination of features (for example, hair color, skin color and dress color) of a specified person of an object "X" in a series of selected M-icons (that is, a section subjected to detection where the character "X" may appear). Thereby, the motion picture editing apparatus detects an image region conformable to the designated combination of colors through an image processing so that information of the conforming image and its frame is displayed on the GUI screen.

When the frame containing the character "X" therein is detected, the editor confirms a cut which includes that frame. If this cut is appropriate as a part of the program material, the cut is selected and is inserted into the hierarchical structure 1040 of the editing area 1010 shown in FIG. 4.

In the conventional motion picture editing apparatus, a frame containing a specified image is detected from a motion picture but there is not provided a function of displaying information of the result of detection in a form which is comprehensible for an editor to use as information for edition. Also, the conventional motion picture editing apparatus is not capable of displaying a motion picture range having already been subjected to a processing for detection of a frame containing a specified character therein and a range having not yet been subjected to the detection processing so that they are displayed on a screen in a distinctive manner. Further, there is not provided a function of make a correction or change for the result of detection.

SUMMARY OF THE INVENTION

An object of the present invention is to provide a method and apparatus in which a frame containing a specified image therein is detected from a motion picture on the basis of features possessed by the specified image and information of the result of detection is displayed on a motion picture editing screen in a form comprehensible for an editor. Another object of the present invention is to display a motion picture range having already been subjected to a processing for detection of a frame containing a specified character therein and a range having not yet been subjected to the detection processing so that they are displayed on a screen in a distinctive manner. A further object of the present invention is to provide an editing screen with a function of making a correction or change for the result of detection. The specified image to be detected in the method or apparatus of the present invention is not limited to a character or person and may include a physical solid other than a character, a scenery (or landscape) and so forth.

In an image information displaying method for the edition of a motion picture in one aspect of the present invention, representative image representing a series of frame images forming the motion picture are displayed on a screen of a display device and a hierarchical structure based on a plurality of representative images is generated on the screen through an operation using a GUI to perform the edition of the motion picture. According to the present invention, a plurality of frame images included in the representative image are subjected to an image detection processing for detecting frame images having a predetermined image recorded thereon. Information indicating the detected frame image having the predetermined image recorded thereon is displayed as a detection result displaying window on the screen. Information concerning frame images having not been subjected to the image detection processing is displayed on the detection result displaying window.

An image information displaying apparatus for the edition of a motion picture according to another aspect of the present invention comprises a display device having a screen for displaying representative images representing a series of frame images forming the motion picture, a control device for controlling image information displayed on the screen of the display device, a storage device for storing the frame images, the image information and data for managing the frame images and the image information, and an input device for inputting data into the control device. The control device includes means with which a hierarchical structure based on a plurality of representative images is generated on the screen of the display device on the basis of data inputted by the input device and in response to an operation using a GUI, means with which a plurality of frame images included in the representative image are subjected to an image detection processing for detecting a frame image having a predetermined image recorded thereon, means with which information indicative of the detected frame image having the predetermined image recorded thereon is displayed as a detection result displaying window on the screen, and means with which information concerning frame images having not been subjected to the image detection processing is displayed on the detection result displaying window.

The image information displaying method for the edition of a motion picture according to the present invention can be stored in a recording medium as a program which can be read by a computer. The computer readable medium has computer readable program code means comprising means with which representative images representing a series of frame images forming the motion picture are displayed on a screen of a display device, means with which a hierarchical structure based on a plurality of representative images is generated and displayed on the screen of the display device on the basis of inputted instruction data, means with which a plurality of frame images included in the representative image are subjected to an image detection processing for detecting frame images having a predetermined image recorded thereon, means with which information indicative of the detected frame image having the predetermined image recorded thereon is displayed as a detection result displaying window on the screen, and means with which information concerning frame images having not been subjected to the image detection processing is displayed on the detection result displaying window.

BRIEF DESCRIPTION OF THE DRAWINGS

FIG. 8 is a diagram showing an example of an editing window;

FIG. 35 shows an example of a data structure concerning a hierarchical structure for attached M-icons;

FIG. 36 shows an example of a data structure concerning a hierarchical structure for scenes;

FIGS. 37A, 37B and 37C show an example of a data structure concerning a hierarchical structure for cuts;

DESCRIPTION OF THE EMBODIMENTS

Embodiments of a method and apparatus of the present invention will now be described in reference to the drawings.

Figure 3:
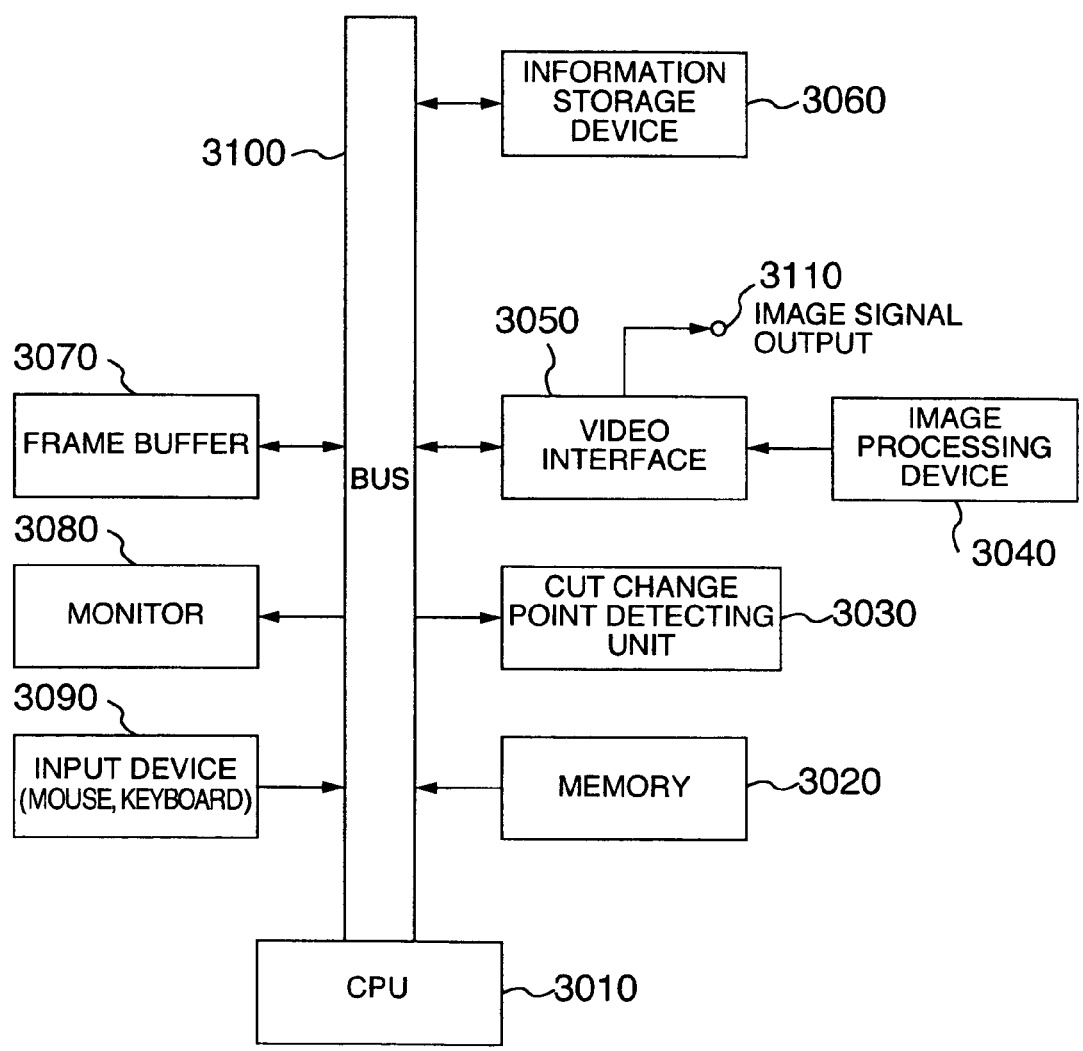
FIG. 3 is a block diagram showing an example of the construction of a motion picture editing/displaying apparatus.

FIG. 3 is a block diagram showing an example of the construction of a motion picture editing apparatus according to the present invention. Reference numeral 3010 denotes a CPU (Central Processing Unit), numeral 3020 a memory, numeral 3030 a cut change point detecting unit, numeral 3040 an image reproducing device, numeral 3050 a video interface, numeral 3060 a random access information storage device such as a magnetic disk, numeral 3070 a frame buffer, numeral 3080 a monitor, numeral 3090 an input device, numeral 3100 a bus, and numeral 3110 an image signal output terminal.

This motion picture editing apparatus is provided with the CPU 3010 for performing the control of each component of the motion picture editing apparatus and the edition under the control of software (or program), the monitor 3080 for displaying control information of the CPU 3010 and information concerning edition which includes information of a motion picture, scene images and cut images and information of a hierarchical structure (or tree structure) representing the state of edition, the input device 3090 such as a mouse or keyboard for selecting information displayed on a screen of the monitor 3080 to make the input of a command to the CPU 3010, the frame buffer memory 3070 for storing image information to be displayed on the monitor 3080, the image reproducing device 3040 such as a video tape recorder (VTR) for reading and reproducing from a recording medium an image signal of a motion picture to be used for edition and outputting it to the video interface 3050, the video interface 3050 for receiving the image signal of the motion picture inputted from the image reproducing device 3040 to convert it into image information having a format handled by the motion picture editing apparatus which information is then outputted to the information storage device 3060, the cut t change point detecting unit 3030 and the memory 3020 and for receiving image information of the motion picture edited with the format handled by the motion picture editing apparatus and outputted from the information storage device 3060 to convert it into an image signal which is then outputted from the image signal output terminal 3110, the cut change point detecting unit 3030 for comparing adjacent ones of frame images forming a motion picture to separate them from each other under the judgement of the adjacent frame images as belonging to different cut images in the case where a difference between the adjacent frame images has a change exceeding a predetermined quantity, the memory 3020 for storing software for control of the CPU 3010 and temporarily storing various control information (for example, a series of frame numbers for a motion picture, frame numbers of detected cut change points, M-icons or images for the purpose of display to be displayed on the screen of the monitor 3080 and having a reduced image size, M-icon file names, cut image numbers serially applied to cut images, and sequence numbers representing the sequence of plural cut images forming scene images) and so forth used in the motion picture editing apparatus, the information storage device 3060 such as a hard disk device, the bus 3100 used for the transfer of digital information between the components in the motion picture editing apparatus, and the image signal output terminal 3110 for outputting image information of the motion picture. The random access information storage device 3060 stores the image information of the motion picture reproduced by the image reproducing device 3040, converted by the video interface 3050 into a required format and used for edition, and stores edition information and control information (for example, M-icons) temporarily stored in the memory 3020 and used in the motion picture editing device.

The bus 3100 is connected with the CPU 3010, the memory 3020, the cut change point detecting unit 3030, the video interface 3050, the information storage device 3060, the frame buffer memory 3070, the monitor 3080 and the input device 3090 which constructs the motion picture editing apparatus. The CPU 3010 makes the transmission and reception of various signals for those devices which are in turn controlled by access signals from the CPU 3010. Also, an instruction to the CPU 3010 is inputted from the input device 3090 such as a mouse or keyboard.

The procedure of an operation for detecting a specified object or character from a motion picture source subjected to edition will be described using FIGS. 2, 4 and 13.

Figure 4:
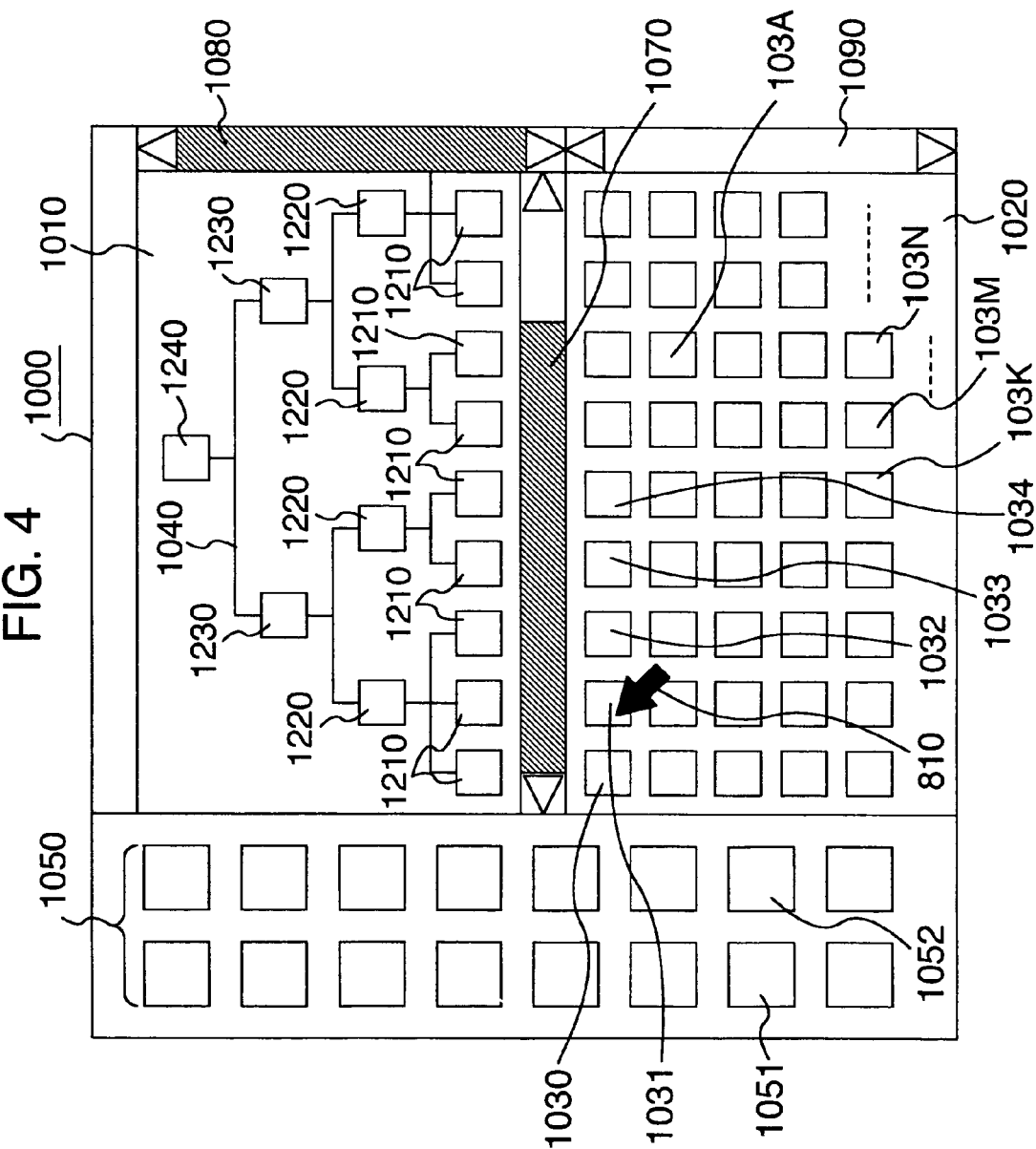
FIG. 4 is a diagram showing an example of display on an editing window.

FIG. 4 shows an editing window on the screen of the monitor 3080 (FIG. 3) of the non-linear editing apparatus.

In order to detect an object or a character (for example, "X"), an operator uses the mouse pointer 810 to select an M-icon corresponding to a cut or scene to be deleted from the editing area 1010 or the material area 1020 by clicking the mouse. At this time, the M-icon is brought into a selected condition. To thus bring an M-icon into a selected condition is called attach (or attaching the M-icon). A method of displaying the selected condition may include, for example, enclosing the selected M-icon by a thick frame, changing the display color of the M-icon, and flickering the M-icon.

For example, M-icons 1031 to 1033 in the material area 1020 shown in FIG. 4 are attached and the character detecting button 1051 in the edition function button group 1050 is then clicked. As a result, a window shown in FIG. 2 is displayed on the monitor 3080. A processing for detecting the character "X" is performed on this window. FIG. 2 is a diagram for explaining a method in which the detection of a specified character is made with the features of that character defined. Reference numeral 300 denotes an identify (ID) window, numeral 301 an OK button, numeral 302 a CANCEL button, numeral 303 a slider knob, numeral 304 a sliding cursor, numeral 305 an enlarged image, numeral 306 an enlargement display area, numeral 307 an OBJECT button, numeral 308 a color designating frame, numeral 309 a SEARCH button, numeral 311 a still image view slider, numerals 321 to 330 frame images, numeral 809 a film image, numeral 810 a mouse pointer, numeral 815 a BEGIN button, and numeral 816 an END button.

Figure 2:
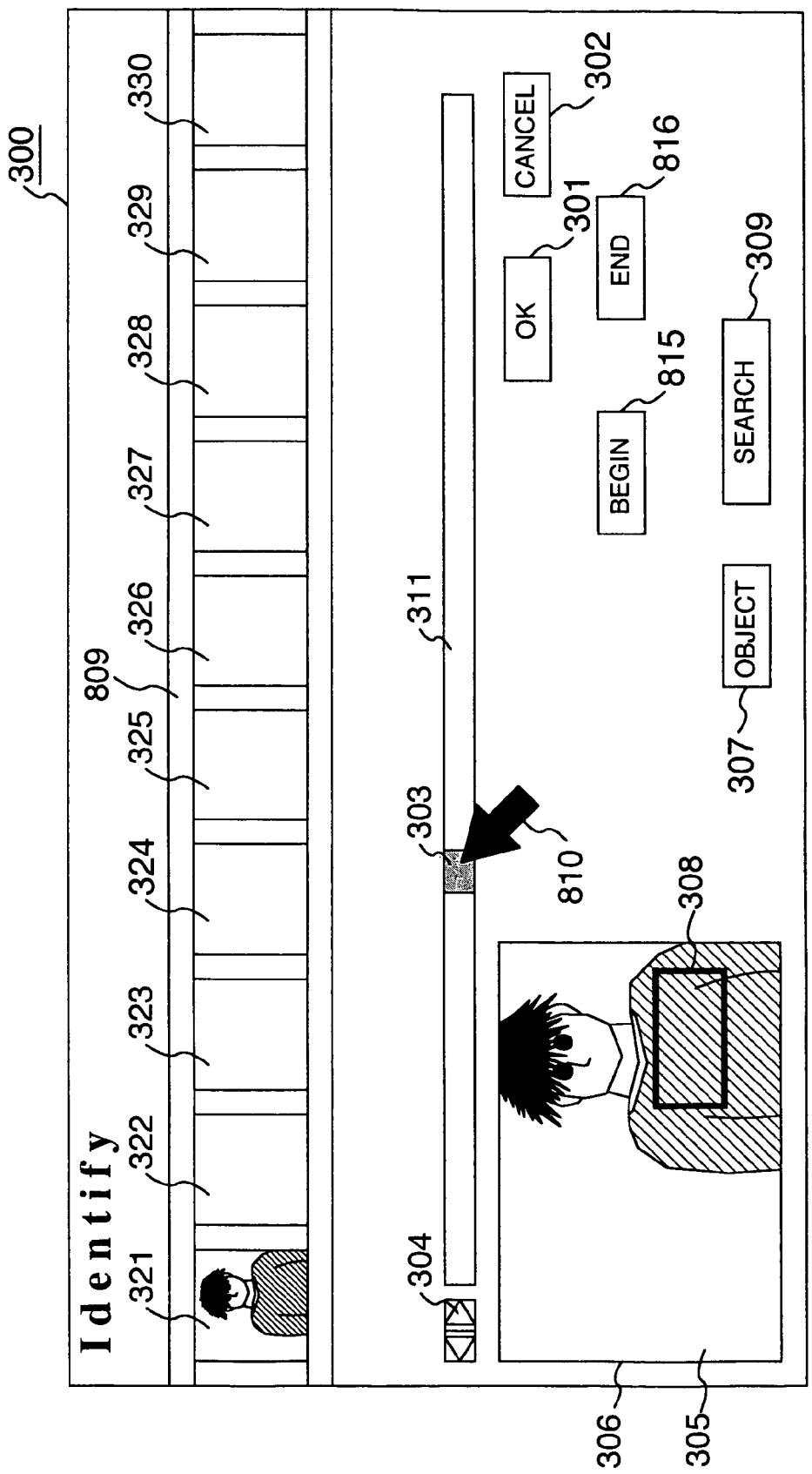
FIG. 2 is a diagram an example of an ID window for explaining the detection of character.

In FIG. 2, frame images 321 to 330 included in the attached M-icons 1031 to 1033 are displayed in the film image 809. The frame images 321 to 330 are arranged in order along a time axis. Right and left portions being not displayed in the window can be viewed by performing a processing for scrolling the slider knob 303 of the still image view slider 311 right and left to slide displayed frame images. This scroll processing is enabled, for example, by moving the mouse pointer 810 to the slider knob 303 and dragging the pointer by the mouse or attaching an arrow portion of the sliding cursor 304. An enlarged frame image 305 is displayed in the enlargement display area 306 at a left/lower portion of the ID window 300. The enlarged frame image 305 is an enlarged version of the leftmost one 321 of the frame images 321 to 330 in the film image 809. In order to perform a processing for detecting the character "X", features to be detected as the character "fix" are defined using the enlarged image 305. The frame image 321 displayed at the leftmost and the enlarged image 305 displayed in the enlargement display area 306 are interlocked with each other. Therefore, the operator can scroll a frame image in the film image 809 so that it is displayed in the enlargement display area 306 as the enlarged image 305 which is to be used for the character "X" detection processing. While viewing the enlarged image 305 with the frame images in the film image 809 scrolled, the operator selects a frame image which is regarded as being optimum in regard to the character "X", detection processing. Next, the combination of specific colors possessed by the character "X" is designated on the basis of the enlarged image 305. The frame image 321 of the frame images 321 to 330 is shown so that it is displayed with a simple image. The representation of images to be displayed as the other frame images 322 to 330 is omitted from the illustration of FIG. 2.

A method of designating the combination of specific colors includes clicking the OBJECT button 307 and then designating a color designating frame 308 in the enlarged image 305 for defining an extent in which a specific color is designated.

The designation of the color designating frame 308 is similar to a method of generating a square frame in the case where the drawing is made in a personal computer or the like. It is of course that the movement and size change of the color designating frame 308 after the designation are possible.

The color of a portion enclosed by the color designating frame 308 assumes a specific color possessed by the character "X" (or a pixel region occupied by the character "X" in the frame image). In the example shown in FIG. 2, the color of a dress worn by the character "X" is designated. The others, for example, the color of hair, the color of skin and so forth are designated. Data of the combination of these designated colors is used for the detection processing.

The character detecting function as mentioned above can be provided using a method disclosed by, for example, JP-A-6-223179.

After the color designation is completed, the SEARCH button 309 is clicked to perform the detection processing for the M-icons 1031 to 1033. After the detection processing has been performed, the result of detection for the character "X" is displayed on the ID window 300, as shown in FIG. 13. The description of FIG. 13 will be made later on. When the result of detection is to be held, the OK button 301 is clicked, thereby closing the ID window. When the result of detection is not to be held, the CANCEL button 302 is clicked, thereby closing the ID window.

Two results are obtained by the character detecting function. One is information of a detection effectuating domain indicative of a coverage or domain throughout which the character "X" exists in an image material or cut. The other is position information indicating where is the character "X" located in frame images of the detection effectuating domain (for example, leftside, central/rightside, upside, left/downside or the like).

Under present conditions, however, the character detecting function may bring about erroneous detection or overlook owing to the precision of recognition. Accordingly, it is preferable that the operator makes a manual confirmation or correction by use of the mouse while viewing the ID window.

FIG. 8 shows an example of the editing window on which the result of the above-mentioned character detection made with the M-icons 1031, 1032 and 1033 selected in FIG. 4 is displayed. In FIG. 8, the same parts as those in FIG. 4 are denoted by the same reference numerals as those used in FIG. 4. Numerals 12, 13 and 14 denote index (IDX) icons.

When the OK button 301 on the ID window 300 shown in FIG. 2 is attached after the character detection is made, the ID window 300 is closed with the result of detection held and an IDX icon 12 is displayed at a lower portion of the material area 1020 of the editing window 1000. Each time another M-icon is selected to make the character detection, IDX icons 13, 14, - - - are successively displayed.

Next, an example of the GUI operation concerning the confirmation or correction of the result of character detection will be described by virtue of the window example shown in FIG. 13. FIG. 13 shows an example of display on the ID window in the case where the confirmation or correction of the result of character detection is made. In FIG. 13, the same parts as those in FIG. 2 are denoted by the same reference numerals as those used in FIG. 2. Numeral 80 denotes an ID window, numerals 800, 801, 802, 802' and 803 detection arrows, numerals 804, 805, 806, 807 and 808 object frames, numeral 809' a film image, numerals 811 and 812 detection effectuating domains, numerals 813, 814, 823 and 824 frame images arranged in the film image 809' in order along the time axis from the left of the window, and numerals 817, 818, 820, 821 and 822 pixel regions which the character "X" occupies in the respective frame images.

Figure 13:
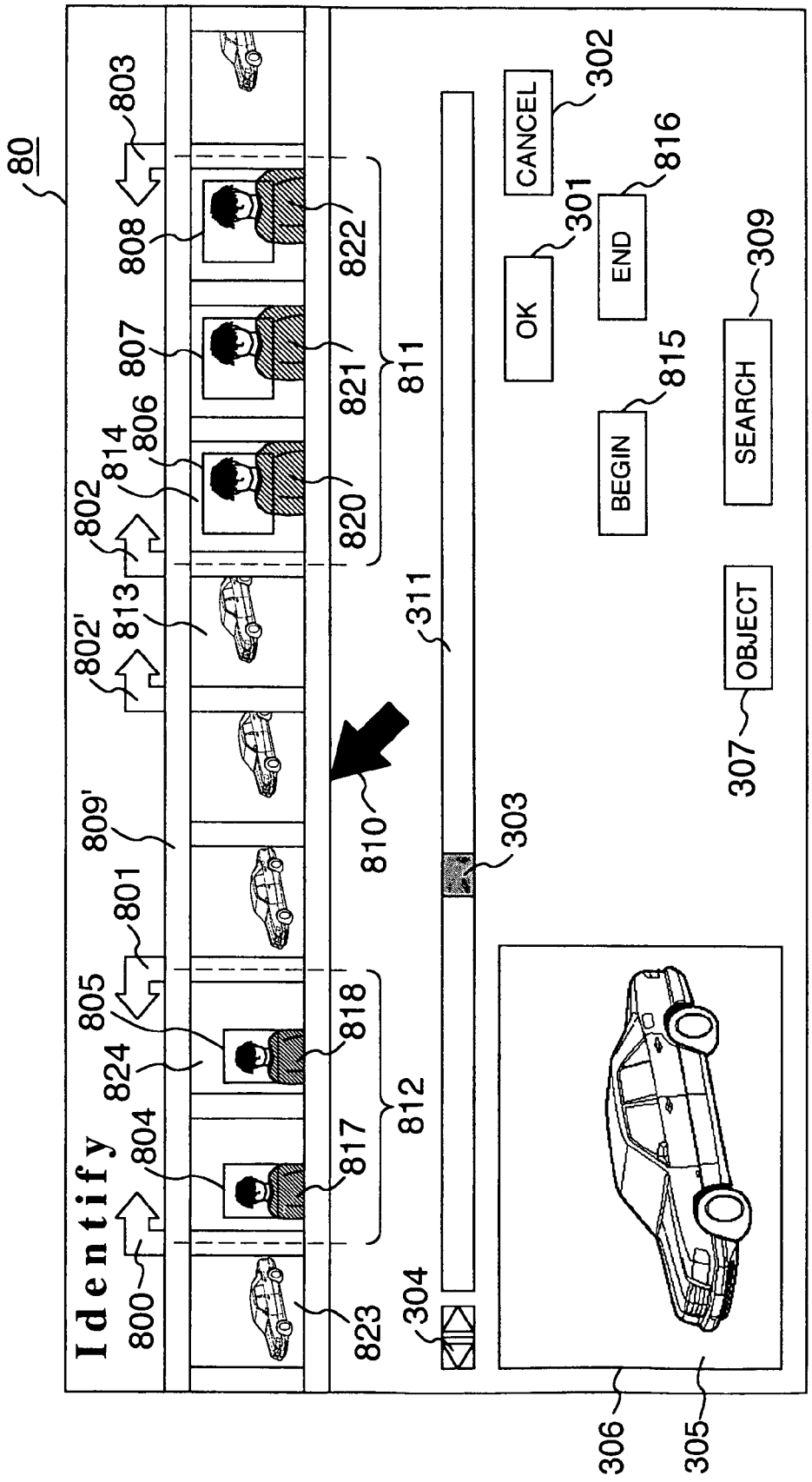
FIG. 13 is a diagram showing an example of display on an ID window on which the confirmation of for the result of a detection of an object or a correction therefor is made.

On the ID window 80 shown in FIG. 13, detection arrows 800 to 803 displayed on the upper side of a film image 809' are arrows indicating the beginning and end of each detection effectuating domain. The detection arrow 800 or the detection arrow 802 is a detected head called a begin point. The detection arrow 801 or the detection arrow 803 is a detected termination called an end point. A domain sandwiched between the detection arrow 800 of the begin point and the detection arrow 801 of the end point is a detection effectuating domain 812, and a domain sandwiched between the detection arrow 802 of the begin point and the detection arrow 803 of the end point is a detection effectuating domain 811. Each of object frames 804 to 808 displayed in frame images belonging to the detection effectuating domain 811 and the detection effectuating domain 812 indicates a position at which the character "X" exists in the frame image. The object frame is displayed as the result of character detection.

The change or correction for the detection effectuating domain and the object frame is made as mentioned below. First, the change of the detection effectuating domain will be described.

Referring to FIG. 13, the description will be made in conjunction with the case where the detection arrow 802 indicative of the begin point is moved into the frame 813 located on the left side by one frame to elongate the detection effectuating domain 811. The mouse pointer 810 is GUI parts capable of being moved on the window by virtue of a mouse (not shown). The mouse pointer 810 may also be operated by a general pointing device other than the mouse.

First, the mouse pointer 810 is moved to a BEGIN button 815 and the mouse is then clicked. Next, the mouse pointer 810 is moved to the frame 813 and the mouse is then clicked. Thereupon, a detection arrow 802' representing a new begin point is displayed. Thereafter, the detection arrow 802 representing the original begin point is clicked to extinguish the detection arrow 802 of the original begin point. As a result, the detection effectuating domain 811 is enlarged leftwards by one frame. Similarly, a change in end point may be made by clicking an END button 816, clicking a frame for which the setting of a new end point is desired, and thereafter clicking a detection arrow of the original end point.

Next, the change or correction for the object frame will be described. This change too is made using the mouse pointer 810.

The description referring to FIG. 13 will be made in conjunction with an example taken for the case where the object frame 806 of the frame image 814 is changed. In FIG. 13, the object frame 805 of the frame image 824 approximately coincides in size and position with a pixel region 818 representative of the character "X" whereas the object frame 806 of the frame image 814 has a size somewhat larger than a pixel region 820 of the character "X" and a position nearer to the center than the pixel region 820. In this case, when seeing this frame image 814, the operator may be perplexed by the position of the object frame 806 with the result of erroneous recognition that the pixel region of the character "X" resides at a central portion of the frame. Therefore, it is necessary to change or correct the size and position of the object frame 806 in order to make conformability to the pixel region 820 of the character "X". The change in size or position of the object frame (804, 805, 806, 807, 808) can be made by use of a method of deleting the present object frame and there-instead setting a new frame as well as known methods, for example, screen operation and object operation in Windows 95 which is an operating system (OS) of Microsoft.

In the case where there is performed the operation of changing the object frame 806 in conformity to the pixel region 820 of the character "X", all object frames succeeding the object frame 806 are similarly changed so that they have the same size and position as the changed object frame 806 or they have the same size and position as the pixel regions of the character "X" (for example, the pixel regions 821 and 822 of the character "X" in the object frames 807 and 808).

When the CANCEL button 302 shown in FIG. 2 is attached in the course of character detection or after the completion thereof, the ID window 300 is closed with the result of detection cancelled. On the other hand, when the OK button 301 on the window 300 is attached, the window 300 is closed with the result of detection held and an IDX icon 12 is displayed at the lower portion of the material area 1020 of the editing window 1000, as shown in FIG. 8. Information concerning the result of detection processing for the character "X" is stored in the data structure of the IDX icon 12.

Such an IDX icon is generated one for all M-icons simultaneously attached in the editing window 1000 for character detection. Namely, if different M-icons are attached respective times for character detection processing, new IDX icons 13, 14, - - - are successively generated.

Figure 6:
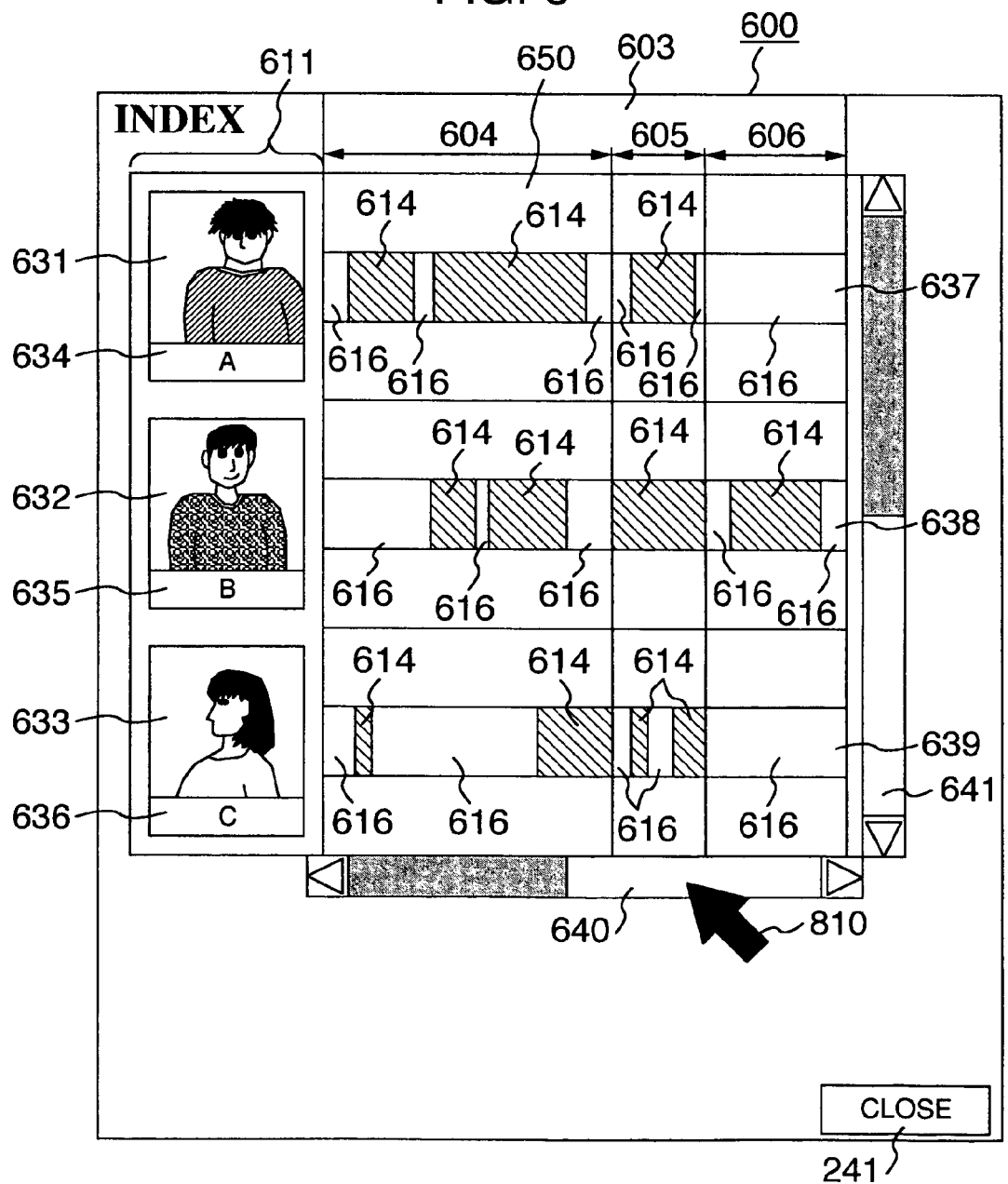
FIG. 6 is a diagram showing an example of display of the result of image detection on an IDX window.

When the IDX icon 12 is double-clicked by the mouse or the IDX icon 12 is selected and an IDX information button 1053 is attached, an IDX window indicative of IDX information as shown in FIG. 6 is pop-up displayed.

FIG. 6 shows an example of display on the IDX window in which the respective results of detection for characters "A", "B" and "C" are displayed. This corresponds to the result when the same group of M-icons 1031 to 1033 is subjected to respective detection processings for three different characters. Reference numeral 600 denotes an IDX window, numeral 603 a detection zone display area, numerals 604, 605 and 606 zones, numeral 611 a target display column, numeral 614 a detection effectuating domain, numeral 615 a detection ineffectuating domain, numerals 631, 632 and 633 target images, numerals 634, 635 and 636 character's names, numerals 637, 638 and 639 detection domain bars, numeral 650 a detection result display column, numeral 640 a slider for sliding the display contents of the detection result display column 650 in a lateral direction, numeral 641 a slider for sliding the display contents of the detection result display column 650 in a longitudinal direction, numeral 810 a mouse pointer, and numeral 241 a CLOSE button.

In FIG. 6, a detection zone display area 603 on the IDX window 600 is displayed along a time axis with the lateral direction taken as a progressing direction. Also, the detection zone display area 603 are now divided into three zones 604 to 606. The division to these zones 604 to 606 is made in accordance with the cut length (or the number of frames) of each of the M-icons 1031 to 1033 attached by the operator. Namely, the number of frames of the M-icon 1031 corresponds to the number of frames of the zone 604, the number of frames of the M-icon 1032 corresponds to that of the zone 605, and the number of frames of the M-icon 1033 corresponds to that of the zone 606. Further, in a target display column 611, the target images 631, 632 and 633 of detected characters and the character's names 634, 645 and 636 thereof are displayed in the longitudinal direction.

For example, in the case where a character "A" is detected, a target image 631 and a character's name 634 are displayed in a target display column 611 and a detection domain bar 637 is displayed in a detection result display column 650 on the right side of the target display column 611. Further, in the case where a character "B" is detected, a target image 632 and a character's name 635 are displayed on the lower side of the character "A" in the target display column 611 and a detection domain bar 638 is displayed in the detection result display column 650 on the right side of the target display column 611. Similarly, in the case where a character "C" is detected, a target image 633 and a character's name 636 are displayed on the lower side of the character "B" in the target display column 611 and a detection domain bar 639 is displayed in the detection result display column 650 on the right side of the target display column 611. The target image 631, 632 or 633 is a frame image (for example, the frame image 305 in FIG. 2) in an enlarged display form used for acquiring specific colors to detect the character "A", "B" or "C". The character's names 634 to 636 under the target images 631 to 633 have the respective names of objects of detection displayed therein. Since the display column for the detection domain bars 637, 638 and 639 is limited, there may be the case where a detection area is so large that the whole of the detection area cannot be displayed at once. In that case, a slider 640 is operated to scroll the display in the lateral direction. Also, in the case where the number of detected characters is large, it is not possible to display all the detected characters at once. (In the example shown in FIG. 6, the number of characters capable of being displayed at once is 3.) In this case, a slider 641 is operated to scroll the display in the longitudinal direction.

As mentioned in the above, the area of the detection domain bars 637 to 639 includes the results of detection of the characters "A", "B" and "C" carried out for the cuts or M-icons 1031 to 1033.

Next, the result of detection will be described with the detection domain bar 637 taken as one example.

A detection effectuating domain 614 indicates a domain where the character "A" is detected (or the detection of the character "A" is effectuated) in the zones 604, 605 and 606 with regard to the M-icons 1031 to 1033. A detection ineffectuating domain 616 indicates a domain where the character "A" is not detected (or the detection of the character "A" is ineffectuated). For example, the zone 604 includes a time-sequential array of frame images collected in association with the M-icon 1031, the zone 605 includes a time-sequential array of frame images collected in association with the M-icon 1032, and the zone 606 includes a time-sequential array of frame images collected in association with the M-icon 1033. The zone is represented with a predetermined width applied for each frame image. In FIG. 6, the detection effectuating domain 614 and the detection ineffectuating domain 616 are represented in a distinctive manner so that the former has an oblique line pattern and the latter has a white pattern. The representation of effectuation/ineffectuation of detection may be arbitrary so long as the distinction from each other is provided. For example, the detection effectuating and ineffectuating domains 614 and 616 may be displayed with orange and grey colors, respectively, or one of the domains 614 and 616 may be flickered.

The detection effectuating domain 614 and the detection ineffectuating domain 616 are also displayed on the side faces of the M-icons 1031 to 1033 shown in FIG. 8.

Figure 12A:
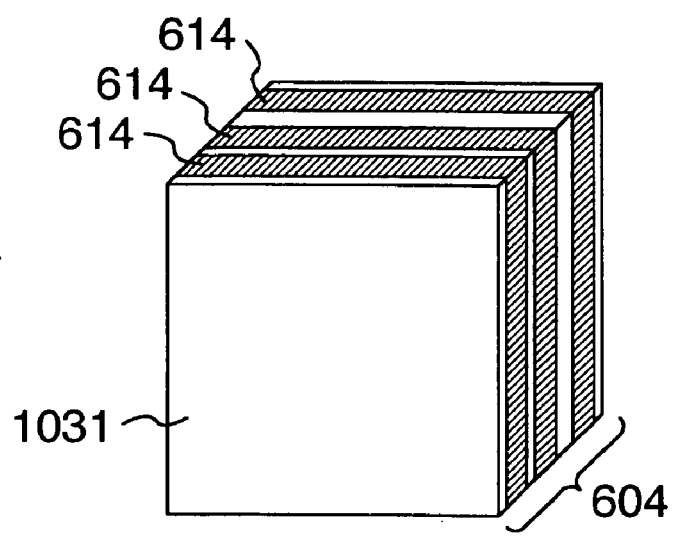
FIGS. 12A, 12B and 12C are views showing that the result of a detection of an object is displayed on a side face of an M-icon which represents a representative image in the form of a solid figure.
Figure 12B:
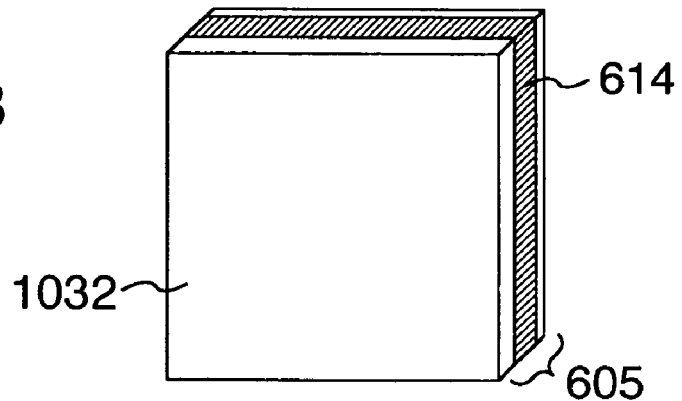
Figure 12C:
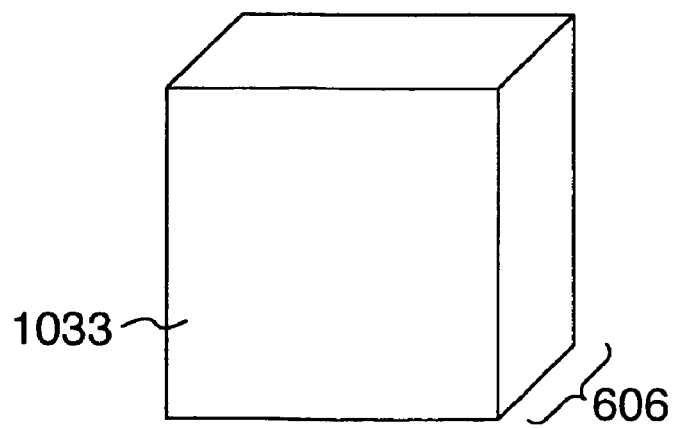

FIGS. 12A, 12B and 12C are views showing that the results of character detection are displayed on the side faces of the M-icons 1031 to 1033 shown in FIG. 8. As in FIG. 6, zones 604, 605 and 606 are ones for the M-icons 1031, 1032 and 1033, respectively. The width of the side face of the M-icon indicates the number of frames of that M-icon itself (or is represented with a fixed thickness for each one frame image). For the detection effectuating domain 614, the side face of the M-icon 1031, 1032 or 1033 is displayed with oblique lines by the corresponding number of frames. For the detection ineffectuating domain 616, the side face of the M-icon is displayed with a white color by the corresponding number of frames. The display of such domains may be set such that it is always made as the result of detection or is usually made in the case where the operator attaches the target image 631. Also, only one of the domains 614 and 616 may be displayed.

Actually, each of the M-icons 1031 to 1033 shown in FIGS. 12A, 12B and 12C is displayed with a reduced image for the purpose of display associated with that M-icon. However, such display is omitted from the illustration of FIGS. 12A to 12C.

When one of the detection effectuating domains 614 in, for example, the zone 605 is attached, the pattern or color of the display of the attached detection effectuating domain belonging to the zone 605 of the detection domain bar 637 is changed to, for example, a purple color and a purple spot light is directed therefrom towards the M-icon 1032 (FIG. 8) corresponding to the zone 605. This function makes it easy to find out which one of M-icons does a given detection effectuating domain belong to.

In the case where the IDX window 600 shown in FIG. 6 is to be closed, the CLOSE button 241 is clicked.

The character detecting/displaying method described above has the following problems.

(1) With the above-mentioned character detecting function, one IDX icon for attached M-icons is generated in the material area. Namely, if different M-icons are attached respective times for character detection processing, there results in that new IDX icons are successively generated. This makes it hard to see the material area.

(2) An IDX icon has no information of which M-icon has the detection processing for who of characters been performed for. Therefore, an operator is required to confirm such information by opening an IDX window corresponding to the IDX icon. Thus, a some time/labor is taken for confirmation.

(3) There is not provided a function of deleting detection result information displayed on an IDX window for each character. Therefore, it is not possible to delete an unnecessary detection result from the window.

(4) Data of the combination of colors used the respective detection processings for characters "A", "B" and "C" is not preserved in the data structure of the corresponding IDX icon. Therefore, the combination of colors having already been used for a detection processing for a certain M-icon cannot be utilized in a detection processing for another M-icon.

In embodiments of the present invention as will now be described, the above-mentioned problems are overcome, thereby providing an image editing/displaying method in which the implementation of a simple screen operation is possible and a high functionality is available.

In the image editing/displaying method according to the embodiments of the present invention, detection information concerning a specified character stored in the data structure of an IDX icon in the above-mentioned method is stored in not the data structure of the IDX but the data structure an M-icon which will be mentioned later on. Thereby, it is not necessary to generate IDX icons.

An IDX window is displayed on the basis of detection information stored in the data structure of an M-icon. However, since attached M-icons may include ones having not yet been subjected to a detection processing for a specified image, there is provided a representation distinctively indicating whether or not the M-icon is one having been subjected to detection processing. Further, though the side face of an M-icon in the above-mentioned method is provided with only the representation of a detection effectuating domain, the M-icon side face in the embodiment of the present invention is provided with this representation as well as the representation indicating whether or not the M-icon is one having been subjected to detection processing.

Also, a function of deleting the result of detection displayed for each specified object image is newly added.

Further, there is provided a combining function with which after a detection processing has been performed for various objects, the results of detection for different color information (for example, the cases of different dress colors) concerning the same object are combined into one. As a function contrary to that, there is also provided an uncombining function with which the combinative result of detection is restored to the original results of detection.

There are further provided a preview function with which only a detection effectuating domain obtained by a detection processing is reproduced in a motion picture form and an information function with which, for example, information of images subjected to detection processing is added to the result of detection and this is stored into the data structure.

Also, there is provided a function with which the width of the time series of a detection zone display area can freely be set. Thereby, it is possible to adjust the width of display of a detection effectuating domain or the like freely.

Further, data of the combination of colors used in the respective detection processings for the images of objects of detection is preserved in the data structure of the corresponding M-icon so that it can be reused.

An embodiment of the present invention will now be described. The successive description of the procedure of operation referring to FIGS. 4 to 10 will be made starting from a state in which a processing for detection of a specified character has never been performed.

Start from the screen of FIG. 4 which shows an example of an editing window displayed on the screen of the monitor 3080 in the motion picture editing apparatus shown in FIG. 3.

In order to detect a character "A", an operator first attaches M-icons 1031 to 1033 corresponding to cuts or scenes made an object of detection. Then, the operator attaches the character detecting button 1051 in the edition function button group 1050. As a result, an IDX window shown in FIG. 5 is displayed on the monitor 3080.

Figure 5:
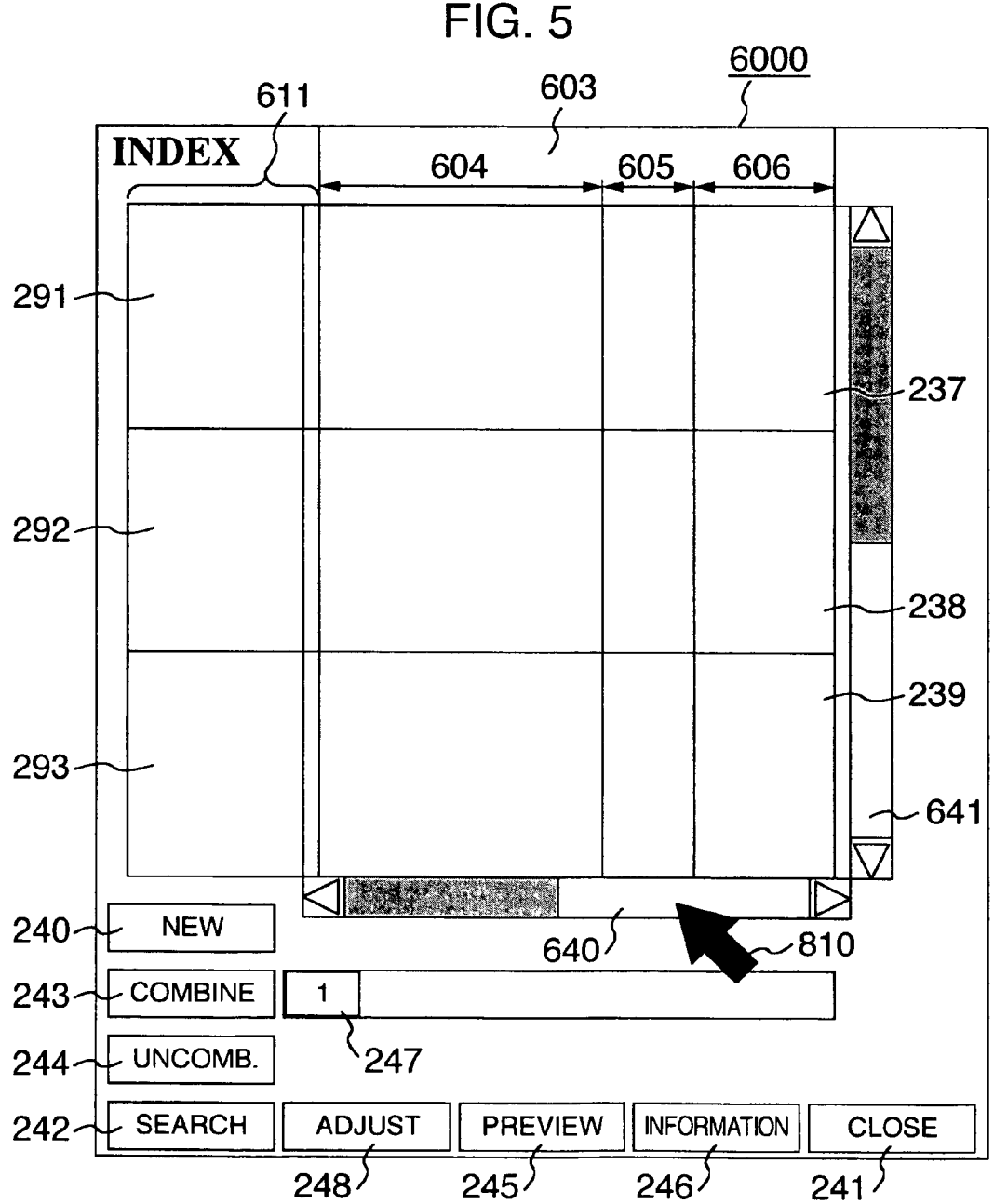
FIG. 5 is a diagram showing an example of an initial state of an IDX window in the present invention.

FIG. 5 shows an example of the IDX window in a state in an initial state or a state in which a character detection processing has not yet been performed. Reference numeral 6000 denotes an IDX window, numerals 237, 238 and 239 detection result display columns, numeral 240 a NEW button, numeral 241 a CLOSE button, numeral 242 a SEARCH button, numeral 243 a COMBINE button, numeral 244 an UNCOMBINE button, numeral 245 a PREVIEW button, numeral 246 an INFORMATION button, numeral 247 a visual range adjusting slider, and numeral an ADJUST button. Other numerals are the same those used in FIG. 6.

This stage is a state in which the detection processing has never been performed for the M-icons 1031 to 1033. Therefore, neither the target display column 611 nor the detection result display columns 237, 238 and 239 on the IDX window 6000 has data displayed therein, as shown in FIG. 5. This state is an initial state.

First, the detection processing is initiated for the character "A".

When the operator clicks the NEW button 240, an ID window 300 shown in FIG. 2 is displayed on the monitor 3080. On this ID window 300, the operator performs the detection processing for the character "A". The details of the operation for this detection processing have already been described.

After the detection processing is performed, the result of detection for the character "A" is displayed on the ID window 300, as shown in FIG. 13. If necessary, the operator makes a change or correction for the result of detection. Thereafter, the OK button 301 is clicked, thereby closing the ID window 300.

At a point of time when the OK button 301 is clicked, data of the result of detection for the character "A" is stored into data structures corresponding to the attached M-icons 1031 to 1033. However, in the case where an upper layer of the tree structure, for example, an M-icon 1220 "a" (FIG. 8) is attached, the data of the result of detection is stored into data structures corresponding to M-icons 1210 "b", "c" and "d" in the lowermost layer of the tree structure. The reason why the detection result data is always stored in the lowermost M-icons is that the detection result data is prevented from being affected by an editing operation in the editing area 1010. Namely, if data of the result of detection for the lowermost layer M-icons 1210 "b", "c" and "d" is stored in the M-icon 1220 "a" of the upper layer of the tree structure, a change in detection result data may be required, for example, in the case where the M-icon 1210 "c" is removed from the tree structure. The procedure for thus storing data of the result of detection always in the information region of an M-icon of the lowermost layer of the hierarchical structure will be described later on in reference to a flow chart shown in FIG. 33.

Figure 7:
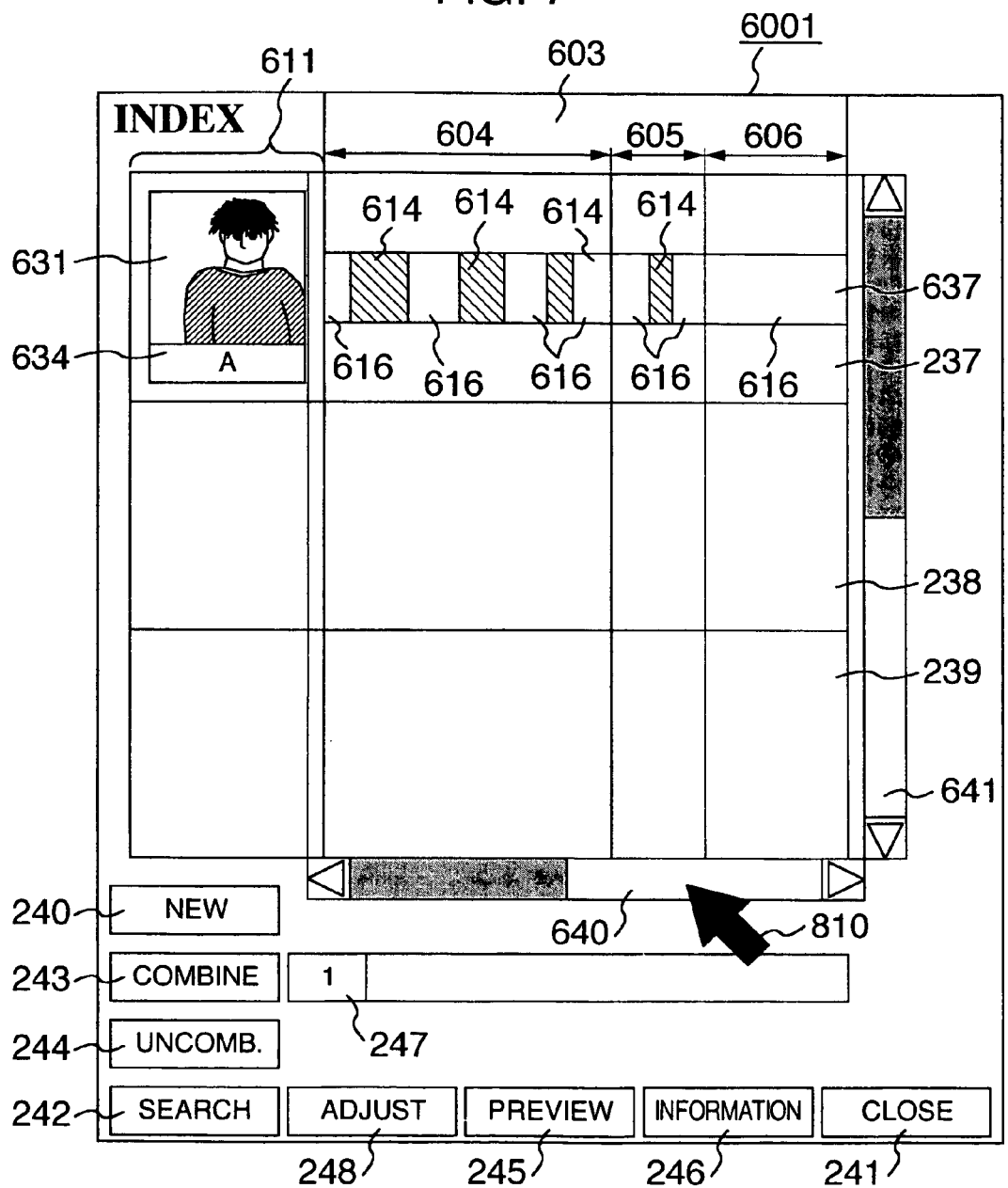
FIG. 7 is a diagram showing an embodiment of an IDX window in the present invention.

When the ID window 300 is closed, there returns to the display of the IDX window again. In this case, the result of detection concerning the character "A" is displayed on the IDX window, as shown in FIG. 7. FIG. 7 shows the IDX window on which only the result of detection concerning the character "A" is displayed. Reference numeral 6001 denotes an IDX window, numeral 631 a target image of the character "A", numeral 634 a character's name, and numeral 637 a detection domain bar. The other numerals are the same as those used in FIG. 5.

When the CLOSE button 241 is clicked, there returns to the editing window 1000 shown in FIG. 4.

Further, the detection processing is also performed for characters "B" and "C". However, an M-icon made an object of detection is changed. By way of example, it is assumed that the M-icons 1031 and 1033 are attached when the detection processing is to be performed for the character "B" and only the M-icon 1032 is attached when the detection processing is to be performed for the character "C". The description of an operation of this detection processing will be omitted since the operation is similar to that mentioned above.

Figure 1:
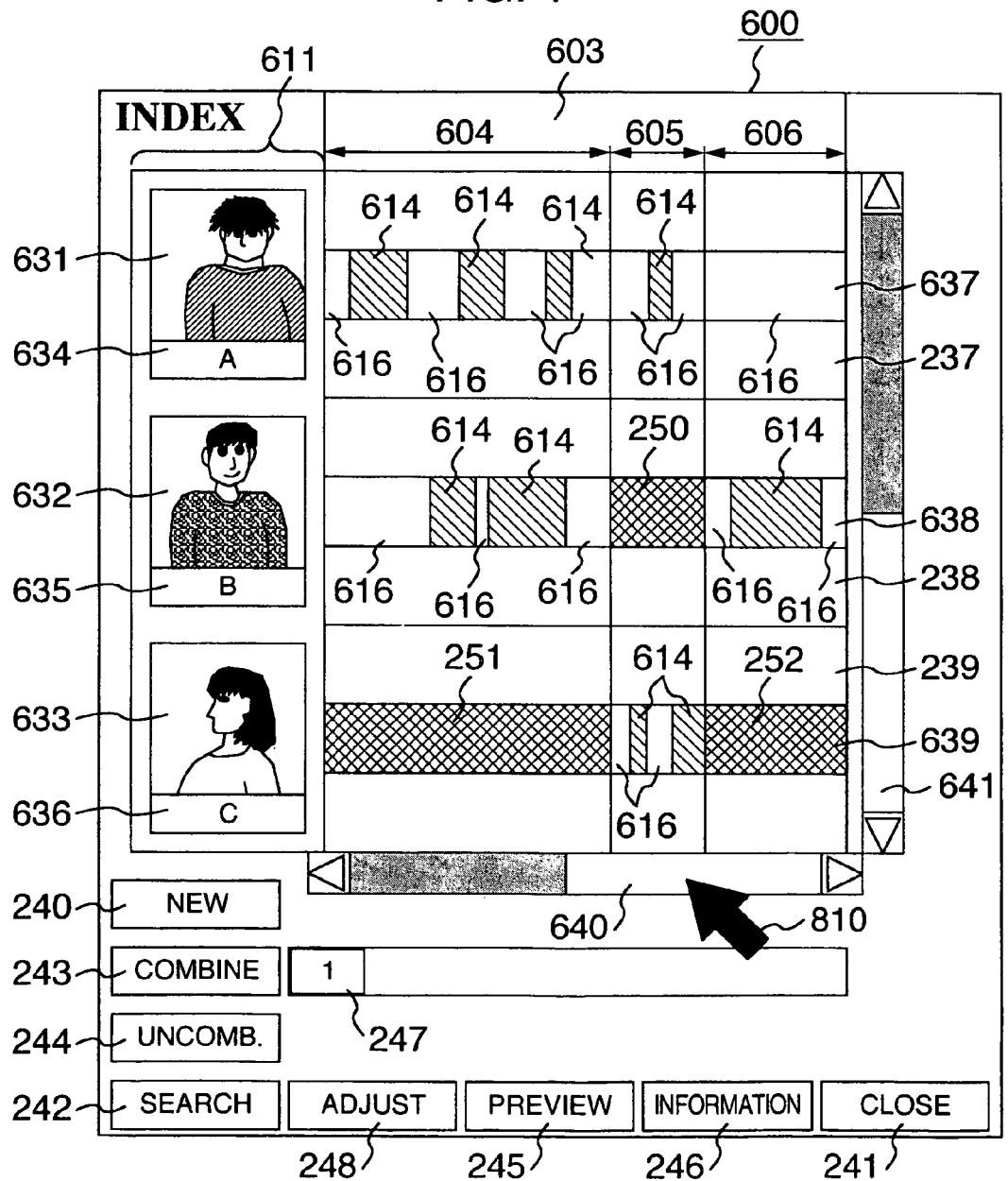
FIG. 1 is a diagram showing an embodiment of an IDX window in the present invention.

After the detection processing for the characters "B" and "C" is completed, the M-icons 1031 to 1033 are attached again to open the IDX window 600. An example of this state is shown in FIG. 1. FIG. 1 shows an embodiment of the IDX window. In FIG. 1, parts having the same functions as those in FIG. 7 are denoted by the same reference numerals as those used in FIG. 7. Numeral 600 denotes an IDX window, and numerals 250, 251 and 252 denote detection unsubjected zones which represent zones have not yet been subjected to character detection processing.

The portions of the detection unsubjected zones 250 to 252 represent frame information of M-icons in regard to which no detection processing has been performed. Namely, the detection unsubjected zone 251 indicates that no detection processing has been performed for the character "C" in regard to the M-icon 1031 (or zone 604). This state will hereinafter referred to as "having not yet been subjected to detection processing". To the contrary, a state in which the detection processing has already been performed will be referred to as "having already been subjected to detection processing". Similarly, the detection unsubjected zone 250 indicates that the M-icon 1032 (or zone 605) has not yet been subjected to detection processing for the character "B". The detection unsubjected zone 252 indicates that the M-icon 1033 (or zone 606) has not yet been subjected to detection processing for the character "C". Thereby, the distinctive representation of an M-icon having already been subjected to detection processing for a character made an object of detection and an M-icon having not yet been subjected to detection processing therefor is enabled on the IDX window.

Figure 9A:
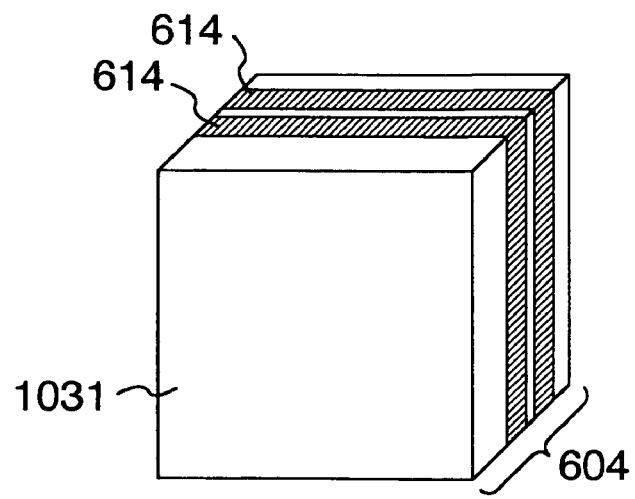
FIGS. 9A, 9B and 9C are views showing that the result of a detection of an object is displayed on a side face of an M-icon which represents a representative image in the form of a solid figure.
Figure 9B:
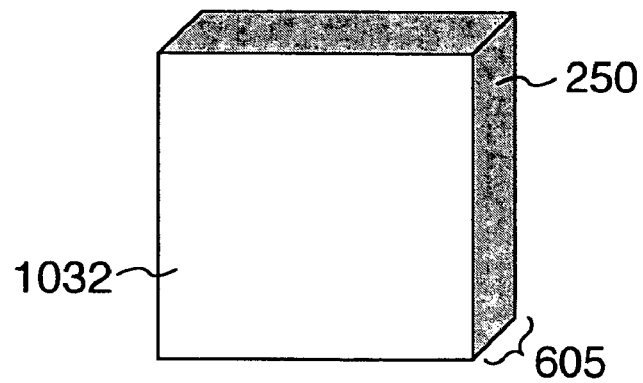
Figure 9C:
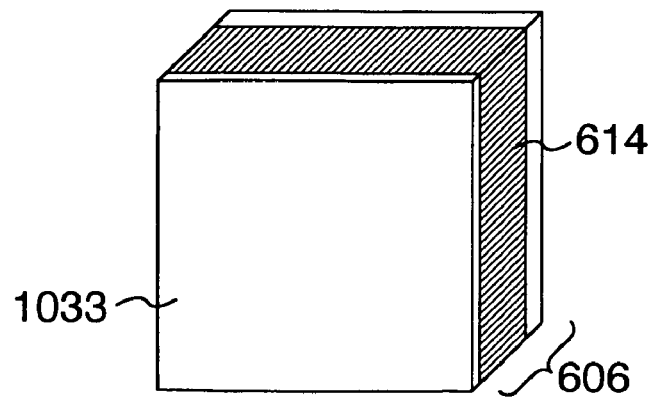

This representation of the state of "having not yet been subjected to detection processing" is also reflected on the side face of an attached M-icon. For example, consider the result of detection for the character "B". An operation is performed by attaching the target image 632. When the target image 632 is attached, the M-icon 1032 is displayed so that the whole of the side face thereof has a color representing the detection unsubjected zone 250 having not yet been subjected to detection processing, as shown in FIG. 9B, since the M-icon 1032 has not yet been subjected to detection processing for the character "B" and the width of the side face of the M-icon indicates the number of frames of the M-icon itself. FIGS. 9A, 9B and 9C are views showing that the result of detection for the character "B" is displayed on the side faces of the M-icons 1031 to 1033 shown in FIG. 4. As in the case of FIG. 6, zones 604, 605 and 606 are ones for the M-icons 1031, 1032 and 1033, respectively.

Thereby, the representation of an M-icon having not yet been subjected to detection processing is also enabled on the editing window 1000.

Further, since data of the combination of colors used in the detection processings for the character "A", "B" or "C" is preserved in the data structure of an M-icon, it becomes possible to use this data for an M-icon portion having not yet been subjected to detection processing. By way of example, there will now be described the case where a detection processing is to be performed for the character "C" in regard to zones having not yet been subjected to detection processing, that is, the M-icons 1031 and 1033, as indicated by the detection unsubjected zones 251 and 252. First, the target image 633 is attached and a SEARCH button 242 is then clicked. As a result, the M-icons 1031 and 1033 are subjected to a detection processing by use of data of the combination of colors used in the processing for detection of the character "C".

Figure 10:
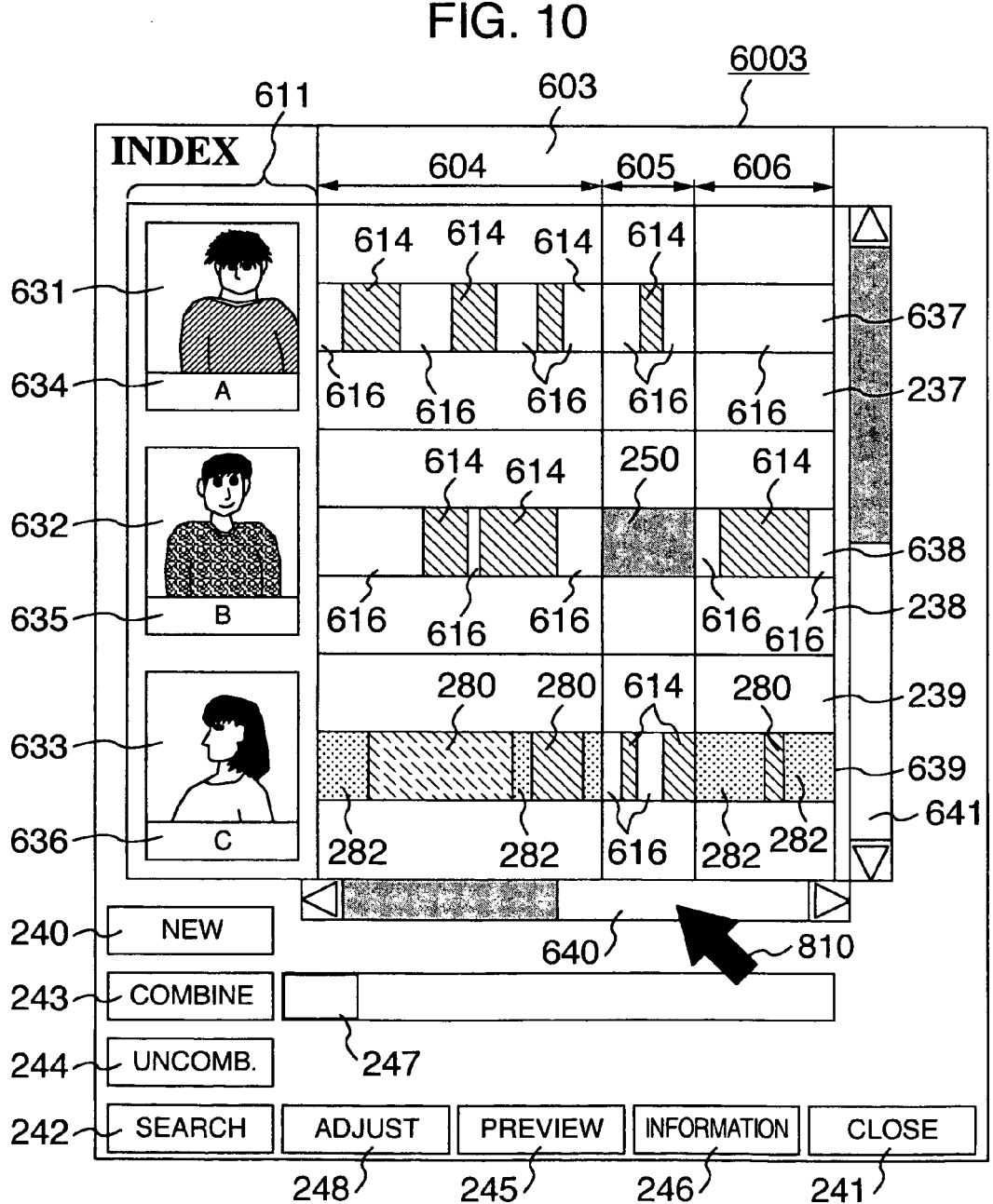
FIG. 10 is a diagram showing an embodiment of an IDX window in the present invention.

An example of the result of detection mentioned in the above is shown in FIG. 10. FIG. 10 is a diagram showing an embodiment of an IDX window according to the present invention. In FIG. 10, the same parts as those in FIG. 1 are denoted by the same reference numerals as those used in FIG. 1. Numeral 6003 denotes an IDX window, numeral 280 a new detection effectuating domain representing a portion where the character "C" is detected, and numeral 282 a new detection ineffectuating domain representing a portion where the character "C" is not detected. Thus, the detection effectuating and ineffectuating domains 280 and 282 are newly added. The procedure for distinctively displaying a zone having already been subjected to detection processing and a zone having not yet been subjected to detection processing will be described later on in reference to FIGS. 34 and 35.

This function provides the following merits. A first merit is that when a detection processing for the character "C" is to be performed for the M-icons 1031 and 1033, it is not necessary to designate the combination of colors again. Also, since the preserved data of color combination is used as it is, the detection processing can be performed with the same condition as that for the M-icon 1032. Further, since data of the result of detection is stored for each M-icon, it becomes possible to find out only the M-icons 1031 and 1033 having no result of detection concerning the character "C", thereby subjecting only such M-icons to detection processing. Thereby, it is possible to reduce a time required for the detection processing.

Next, the description will be made of the improvement in function of the IDX window.

Figure 11:
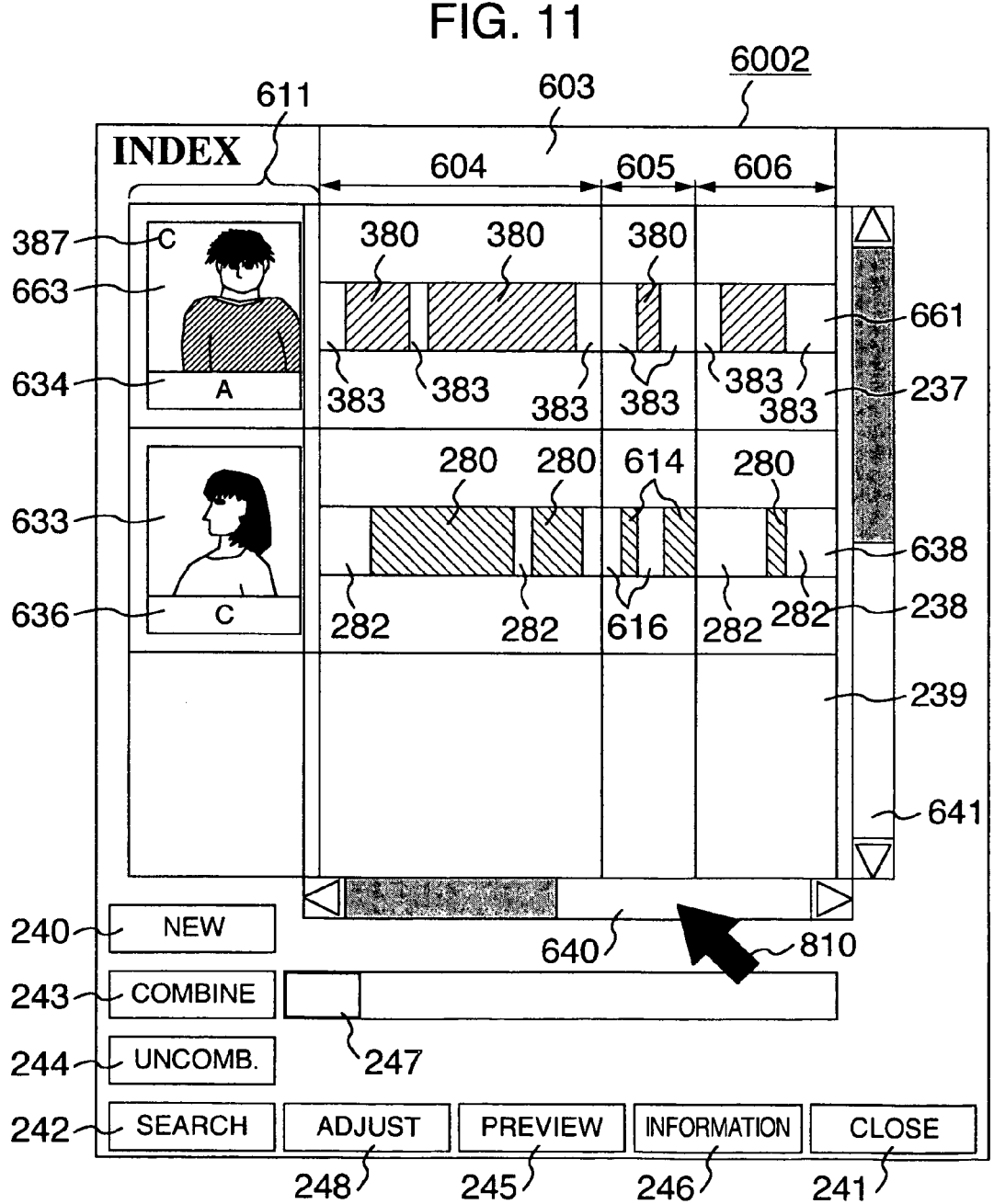
FIG. 11 is a diagram showing an embodiment of an IDX window in the present invention.

First, there is provided a combining function of combining the results of detection. This combining function is used, for example, in the case where provided that the characters "A" and "B" are fellow friends, it is desired to handle the results of detection for the two characters in a form combined into one within the framework of fellow friends. There are two ways of combinative handling, that is, a method in which a new detection effectuating domain is provided with frames where either the character "A" or the character "B" exists (OR condition) and a method in which a new detection effectuating domain is provided with frames where both the character "A" and the character "B" exist together (AND condition). An operation for this purpose is performed by clicking a COMBINE button 243 after the attachment of the target image 631 of the character "A" and the target image 632 of the character "B". FIG. 11 is a diagram showing one embodiment of the combination. In FIG. 11, the same parts as those in FIG. 10 are denoted by the same reference numerals as those used in FIG. 10. Numeral 6002 denotes an IDX window, numeral 380 a detection effectuating domain, numeral 383 a detection ineffectuating domain, numeral 387 a combine mark, numeral 661 a detection domain bar representing the result of detection of frames where either the character "A" or the character "B" exists, and numeral 663 a target image.

In FIG. 11, a detection domain bar 661 is displayed with detection effectuating domains 380 in the case where frames containing either the character "A" or the character "B" are taken as a new detection effectuating domain. Also, a target image 663 is displayed with one 631 of the attached target images concerning the character "A" located at an upper position on the IDX window (FIG. 10). A combine mark 387 (for example, "C") representative of the combination is added to a left/upper portion of the target image. The result of detection of the character "C" is displayed in a manner sited close upwards by one stage.

There is also provided an uncombining function contrary to the combining function. The uncombining function is a function of restoring the combinative detection result to the original results of detection. In operation for this purpose, the combined target image 633 is attached and a UNCOMBINE button 244 is thereafter clicked by the mouse. As a result, there returns to the state shown in FIG. 1.

With the combining and uncombining functions, the results of detection individually provided for respective characters can be arranged or integrated in terms of abstract contents of, for example, "fellow friends".

Next, a detection result deleting function will be described. This function is a function of deleting an unnecessary result of detection from the structure data of an M-icon. In an operation for this purpose, for example, in the case where the result of detection of the character "A" is to be deleted, the target image 631 (FIG. 1) is attached and a DELETE key of the keyboard 3090 is thereafter depressed. Thereby, the result of detection concerning the character "A" is deleted from the data structure of the M-icon as well as the IDX window. And, the remaining results of detection concerning the characters "B" and "C" are displayed on the IDX window in a manner sited close upwards.

Next, a preview function will be described. This preview function is a function of movie-reproducing only a detection effectuating zone obtained by a detection processing. In an operation for this purpose, for example, in the case where detection effectuating zones for the character "A" are to be previewed, the target image 631 of the character "A" is attached and a PREVIEW button 245 is thereafter clicked. As a result, a motion picture reproducing window is displayed in the editing window 1000 and only the frames of detection effectuating domains 214 to 215 are previewed by the reproduction. Thereby, it is possible to confirm the detection effectuating domain by means of a motion picture.

Next, an information function will be described. This information function is a function with which information such as information of a character subjected to detection processing is added to the result of detection and this information added detection result is stored into the data structure of an M-icon. In an operation for this purpose, for example, in the case where it is desired to see or record information concerning the character "A", the target image 631 of the character "A" is attached and an INFORMATION button 246 is thereafter clicked. Thereby, it is possible to add information (for example, name, birth date and so forth) for the character "A" to the result of detection of the character "A".

A detection result adjusting function is performed, for example, in the case where the result of detection of the character "A" is to be adjusted. This is performed by attaching the target image 631 of the character "A" and thereafter clicking an ADJUST button 248.

Finally, there will be described a function of adjusting a visible range of the result of detection displayed in the detection domain bar shown in FIG. 1. This adjustment of the visible range of the result of detection is made by dragging a visible range adjusting slider 247. In the case where a numeral displayed on the visible range adjusting slider 247 is "1", the visible range on the detection domain bar is one second, that is, 30 frames. By moving the visible range adjusting slider 247, it is possible to freely changing the display width of a detection effectuating domain or the number of frames of an M-icon. With the use of this function, however large the number of frames possessed by an M-icon to be displayed is, the M-icon can be displayed with a display width reduced to allow to take a look at it. Also, even a detection effectuating domain having only one frame can be displayed with a display width enlarged. The unit of a numeral displayed on the visible range adjusting slider 247 can be set arbitrarily. For example, it may be the number of frames.

In the foregoing embodiment, one example of the image detecting method has been described in conjunction with an example in which a character is detected. However, it is self-evident that an object image other than characters can be detected by designating the combination of specific colors. Further, it is needless to say that the present invention can also be applied in conjunction with a detecting method other than that mentioned above.

According to the embodiment of the present invention mentioned above, the result of a detection processing is stored in the data structure of an M-icon. Thereby, the representation of an M-icon having already been subjected to detection processing and the representation of an M-icon having not yet been subjected to detection processing are enabled on an IDX window and on the side face of the M-icon.

A second effect of the embodiment of the present invention is that with the construction in which data of the combination of colors used in a detection processing is preserved in the data structure of an M-icon, it becomes possible to perform a detection processing for only another M-icon which has not yet been subjected to detection processing.

A third effect of the embodiment of the present invention is that the improvement in functionality of an IDX window is attained by newly adding a combining/uncombining function, a deleting function, a preview function, an information function and a visible range adjusting function for the result of detection.

Figure 14:
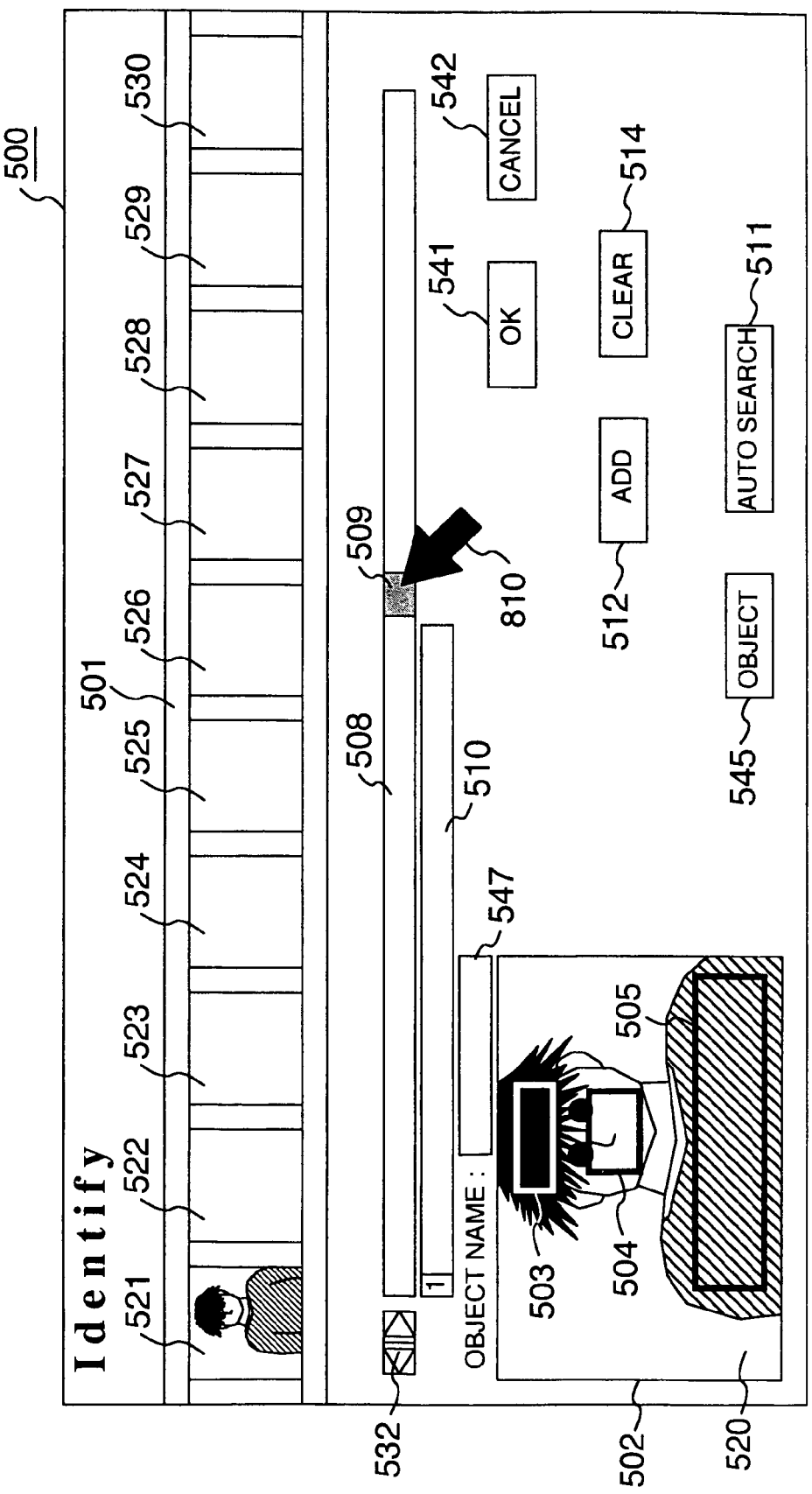
FIG. 14 is a diagram showing an example of display on an ID panel.

FIG. 14 shows another example of the character detecting window. Reference numeral 500 denotes an ID panel, numeral 501 a film image, numerals 521 to 530 frame images arranged and displayed on the film image 501 time-sequentially from the left of the screen to the right thereof, numeral 520 an enlarged version of the leftmost frame image 521 in the film image, numeral 502 an enlargement display area for displaying the enlarged image 520, numerals 503, 504 and 505 color designating frames, numeral 508 a still image view slider, numeral 509 a slider knob of the still image view slider, numeral 532 a sliding cursor, numeral 510 a display frame unit changing slider, numeral 511 an AUTOMATIC SEARCH button, numeral 512 a detection effectuating domain ADD button, numeral 514 a detection effectuating domain CLEAR button, numeral 541 an OK button, numeral 542 a CANCEL button, numeral 545 an OBJECT button, numeral 547 an object name enter column, and numeral 810 a mouse pointer.

In FIG. 14, frame images 521 to 330 as a part of frame images included in attached M-icons 1030, 1034 and 103A (FIG. 4) are displayed in the film image 501. The frame images 521 to 530 are arranged in order along a time axis.

Right and left portions being not displayed in the window can be viewed by performing a processing for scrolling the slider knob 509 of the still image view slider 508 right and left to slide frame images. This right/left scroll processing is enabled, for example, by moving the mouse pointer 810 to the slider knob 509 and dragging the mouse pointer by the mouse or attaching an arrow portion of the slider cursor 532. The display frame unit changing slider 510 is a slider for setting every what frames are the frame images 521 to 530 in the film image to be displayed. In an example shown in FIG. 14, since a value set by the display frame unit changing slider 510 is "1", the frame images are displayed every frame. The set value can be changed up to, for example, "90". If the value is set to "90", the frame images will be displayed every 90 frames so that 10 frame images displayed in the film image 501 represent a part of 900 frame images.

An enlarged frame image 520 is displayed in the enlargement display area 502 at a left/lower portion of the ID panel 500. This enlarged frame image 520 is an enlarged version of the leftmost one 521 of the frame images 521 to 530 in the film image 501. In order to perform a processing for detecting a character "X", features to be detected as the character "X" are defined using the enlarged image 520. The frame image 521 displayed at the leftmost and the enlarged image 520 are interlocked with each other. Therefore, an operator can scroll a frame image in the film image 501 so that it is displayed in the enlargement display area 502 as the enlarged image 520 which is to be used for the character "X" detection processing. While viewing the enlarged image 520 with the frame images in the film image 501 scrolled, the operator selects a frame image which is regarded as being optimum in regard to the character "X" detection processing. Next, the combination of specific colors possessed by the character "X" is designated on the basis of the enlarged image 520. In FIG. 14, the frame image 521 of the frame images 521 to 530 is shown so that it is displayed with a simple image. The representation of images to be displayed as the other frame images 522 to 530 is omitted from the illustration of FIG. 14.

A method of designating the combination of specific colors includes attaching the OBJECT button 545 and then designating that color designating frames 503 to 505 in the enlarged image 520 each of which defines an extent for designating a specific color. The number of the color designating frames may be any value equal to or larger than one. The size and the form of the color designating frame can be designated. The others of the window shown in FIG. 14 are similar to the window shown in FIG. 2.

Next, another embodiment of the present invention will be described. In the foregoing embodiment, it is necessary to operating three windows (or the ID panel, the IDX panel and the editing window) for character detection. However, there is a problem that since these windows are individually displayed on the monitor in the case where a function established (or built in) for each window is set or performed, it is not possible to make occasional confirmation of a relationship between the panels and a relationship between the material area and the editing area in the editing window on which the edition of a motion picture itself is performed.

The embodiment described in below solves the above problem, thereby providing an editing method in which the result of generation and correction of data on an ID panel and an editing widow can be recognized on an IDX panel at a look.

In the motion picture editing method of the present embodiment, two panels and an editing window as mentioned above are always displayed. Further, a processing on one of the two panels is simultaneously reflected on the other panel and also displayed on M-icons on the editing window, thereby enabling the realization of a motion picture editing method which is used in a motion picture editing apparatus for selecting icons as image materials displayed on a display screen to make edition based on a screen display operation and in which when M-icons as image materials to be edited are selected, the sequence of combination in the edition is displayed together with the M-icons, thereby facilitating an editing work.

Now, the mutual operation of an ID panel, an IDX panel, an editing area 1010 and a material area 1020 in a character detecting function according to the present invention will be described in accordance with the actual procedure of a detection processing.

Figure 15:
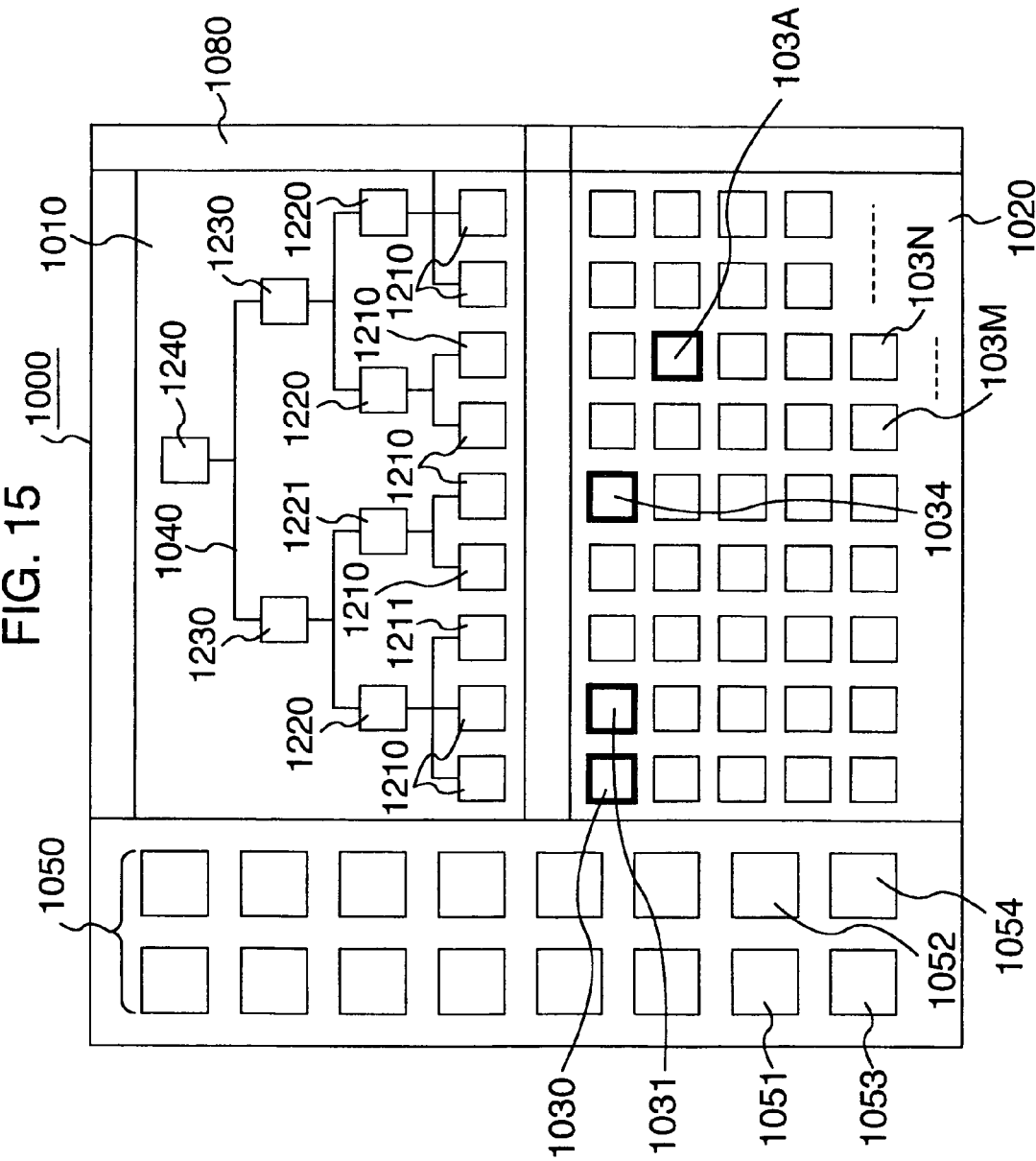
FIG. 15 is a diagram showing an embodiment of an editing window in the present invention.

When an operator selects M-icons 1030, 1034 and 103A on the editing window 1000 of FIG. 4 having already been described, this selection can be recognized in a form in which the selected M-icons 1030, 1034 and 103A are enclosed by thick color frames (for example, red solid lines), as shown in FIG. 15.

FIG. 15 is a diagram showing an embodiment of the editing window when M-icons are selected. In FIG. 15, the same parts as those in FIG. 4 are denoted by the same reference numerals as those used in FIG. 4. Numeral 1000 denotes an editing window. Thus, the operator first selects M-icons in a section which is to be subjected to a processing for detection of a character. In this case, the number of selected M-icons may be plural. The selected M-icons may be ones in either the editing area 1010 or the material area 1020 or over both these areas. They may be upper M-icons in a tree structure.

Figure 16:
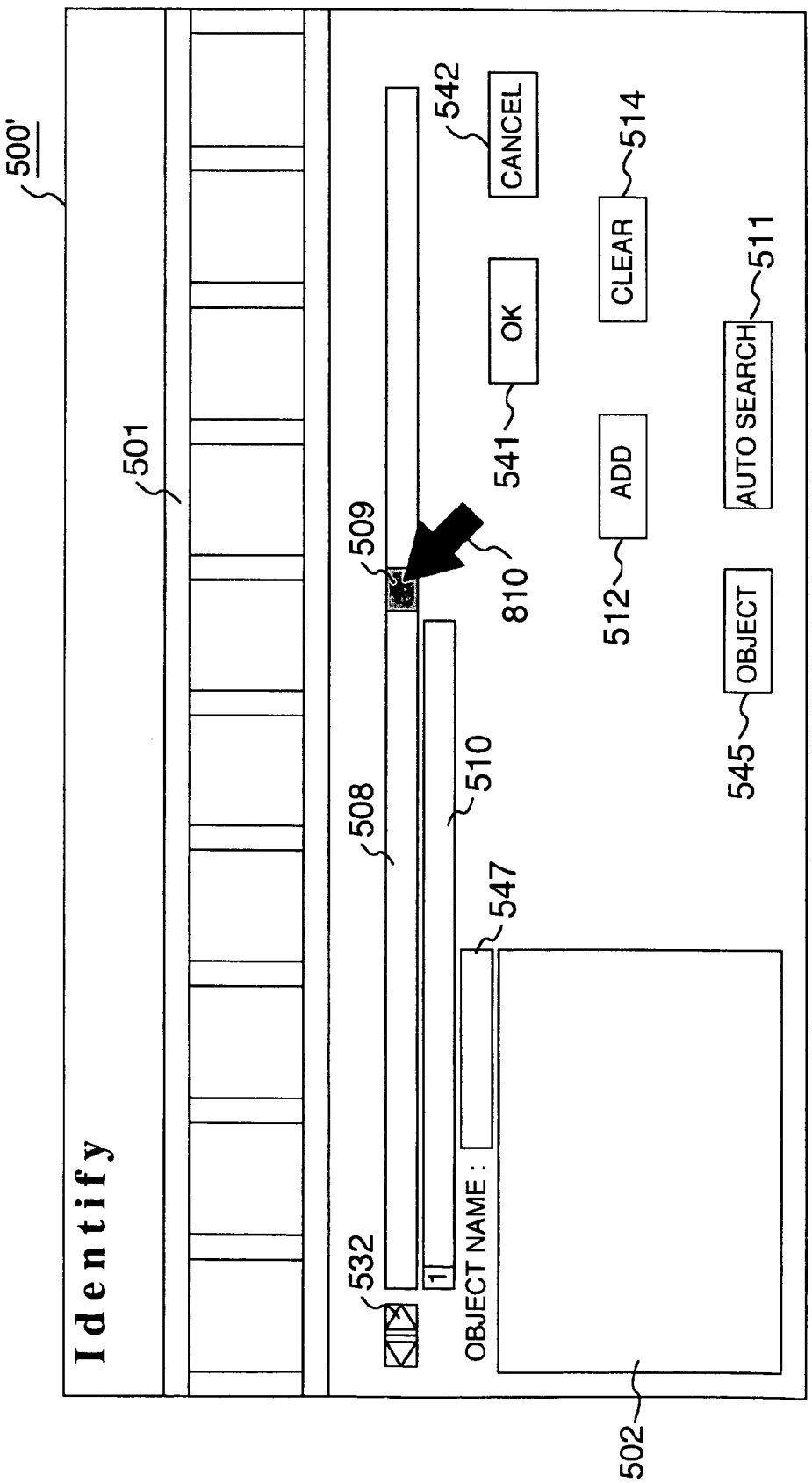
FIG. 16 is a diagram showing an embodiment of an ID panel in the present invention.

Next, a character detecting button 1051 in an edition function button switch group 1050 is clicked. Then, an ID panel is displayed on the monitor 3080 so that it overlaps a part or the whole of the editing window 1000. FIG. 16 is a diagram showing an example in which an ID panel 500' is displayed to cover the editing window 1000 fully. FIG. 16 shows an initial state of the ID panel. In FIG. 16, the same parts as those in the ID panel shown in FIG. 14 are denoted by the same reference numerals as those in FIG. 14. Numeral 500' denotes an ID panel.

In FIG. 16, the frame images of ten leading frames are displayed as a film image 501 on the ID panel 500' which is the display window of the ID panel in the initial state. Also, a frame image designated by the operator is displayed in an enlargement display area 502. In FIG. 16, the illustration of each frame image as the film image 501 is omitted.

In a first step for detection, the operator selects a desired frame image (in which a character to be detected exists) from the film image 501 displayed on the ID panel 500' so that it is dragged and dropped to the enlargement display area 502.

At this time, a frame image corresponding to the selected frame and read from the information storage device 3060 (or a version thereof trimmed into a proper size) is displayed as an enlarged image 520 in the enlargement display area 502, as shown in FIG. 14. Next, the operator selects color designating frames 503, 504 and 505 indicative of the extents for designation of specific colors with respect to the character "X" as an object of detection from the enlarged image 520 and turns on an AUTOMATIC SEARCH button 511, thereby initiating a detection processing. Since the operation of the detection processing has already been described, the description thereof will be omitted.

Figure 17:
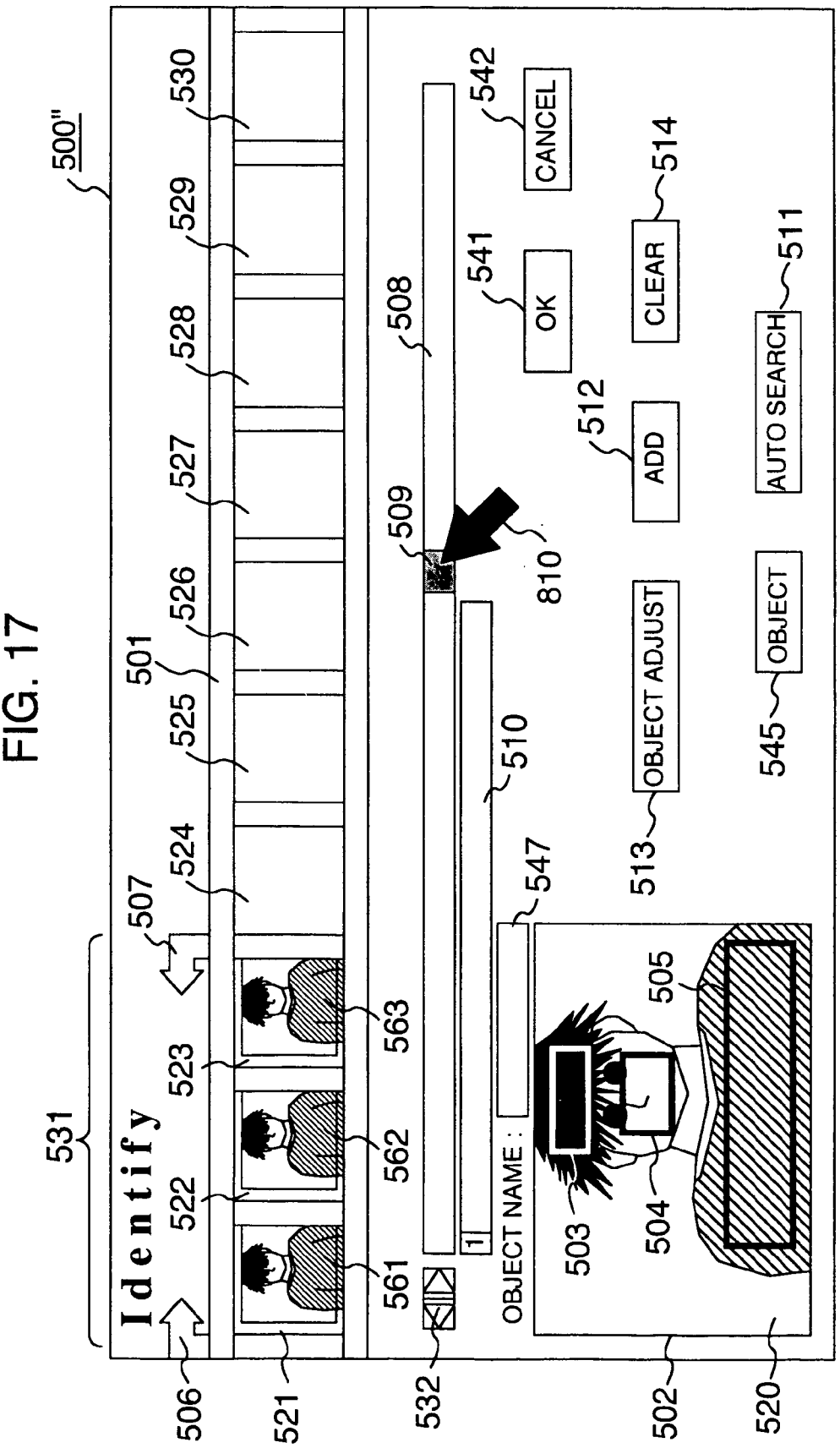
FIG. 17 is a diagram showing an embodiment of an ID panel in the present invention.

FIG. 17 is a diagram showing an embodiment of the ID panel of the present invention. It is shown that object frames are additionally displayed on the ID panel shown in FIG. 14. In FIG. 17, the same parts as those in FIG. 14 are denoted by the same reference numerals as those used in FIG. 14. Numeral 500" denotes an ID panel, numeral 531 a detection effectuating domain, numeral 506 a detection arrow representing a begin point of the detection effectuating domain 531, numeral 507 a detection arrow representing an end point of the detection effectuating domain 531, and numerals 561 to 563 object frames.

Namely, when a detection processing is performed on the ID panel 500 shown in FIG. 14, the detection processing is performed for each frame to be subjected to detection so that regions having a character "X" therein and their frame numbers are stored. When the detection processing is completed, frames resulting in the effectuation of detection of the character "X" are sandwiched between a detection arrow 506 (or a begin point) and a detection arrow 507 (an end point) on a film image 501 of the ID panel 500", as shown in FIG. 17. Further, pixel regions having the character "X" therein are displayed in a form enclosed by object frames 561 to 563. In FIG. 17, frame images resulting in the ineffectuation of detection of the character "X" are omitted from the illustration.

In FIG. 17, if the result of detection of the character "X" is satisfactory, the operator turns on an OK button 541 so that the ID panel 500" is displayed with a reduced size at a predetermined location on the monitor 3080, for example, a left/upper portion thereof. At the same time, an IDX panel 600 as shown in FIG. 6 is displayed covering the editing window 1000 and the ID panel. On this IDX panel 600, there is displayed the result of the character detection processing performed in the above. After the confirmation of the result of detection is completed in this state, a CLOSE button 241 is turned on so that the ID panel is displayed with a reduced size at a predetermined location on the monitor 3080, for example, a right/upper corner portion thereof.

Though each of the ID panel and the IDX panel is displayed on the monitor 3080 in a reduced state, its display size can arbitrarily changed (enlarged or reduced). For example, in order that for the convenience of an operation only a part of the panel can be seen, it may be displayed in an enlarged form. After the completion of the operation, the panel may be displayed on a predetermined location of the monitor 3080 with an reduced size mentioned above.

Figure 18:
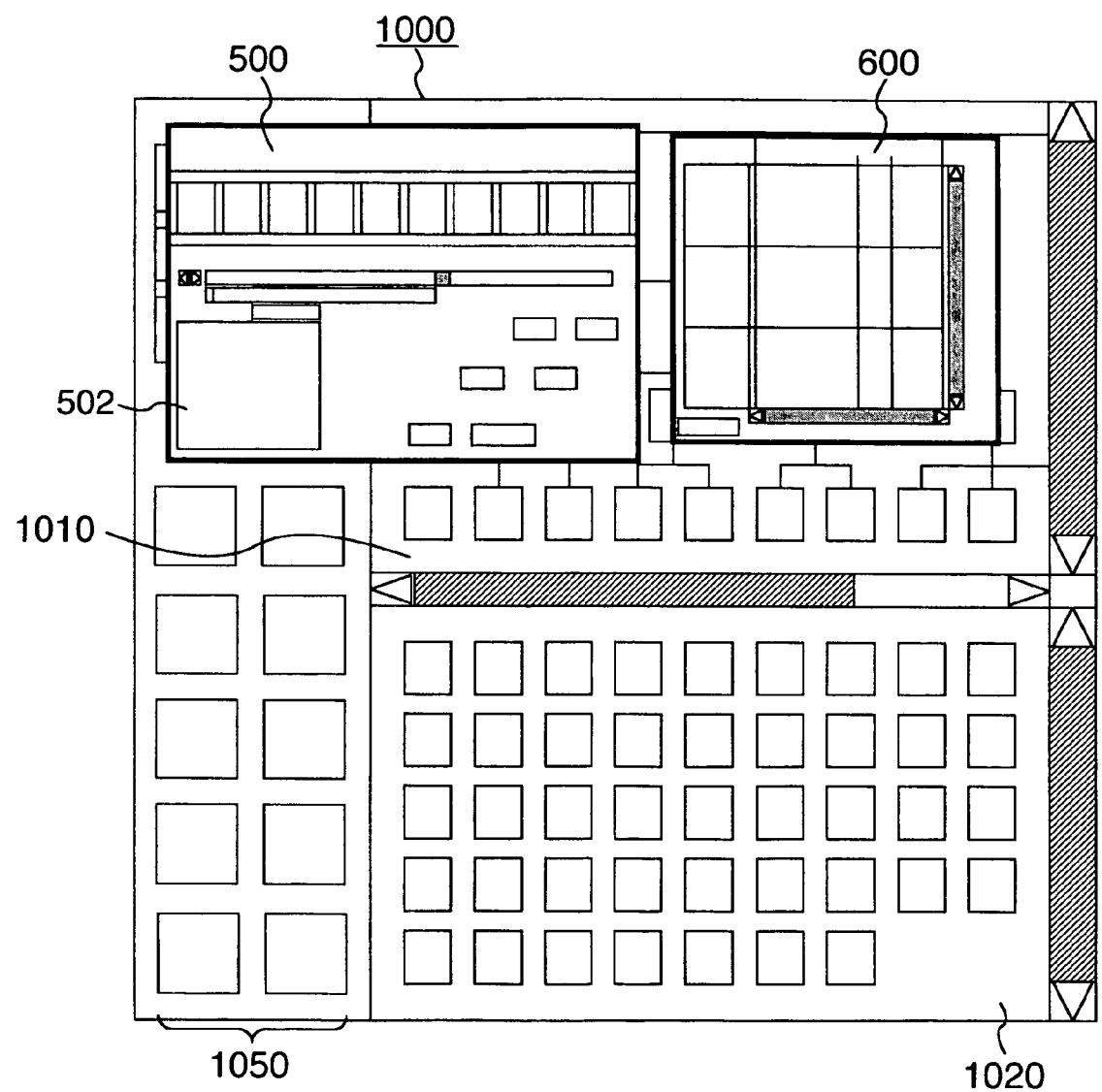
FIG. 18 is a diagram showing an embodiment of a monitor screen on which an editing window, an ID panel and an IDX panel are simultaneously displayed.

An example of the multiple window display in this state is shown in FIG. 18. FIG. 18 is a diagram showing an embodiment of the present embodiment in which an ID panel, an IDX panel and an editing window (that is, an editing area and a material area) are simultaneously displayed on the monitor 3080. Reference numeral 1000 denotes the editing window, numeral 1010 the editing area, numeral 1020 the material area, numeral 500 the ID panel, and numeral 600 the IDX panel.

Since the display contents of the editing window, the ID panel and the IDX panel shown in FIG. 18 are changed, on an editing operation performed by the operator, in accordance with the contents of the editing operation, the description of the details thereof will be omitted.

First, the description concerning FIG. 18 will be made in reference to the editing window 1000 shown in FIG. 4, the ID panel 500' shown in FIG. 16 and the IDX panel 6000 shown in FIG. 5.

In FIG. 18, the editing window 1000 shown in FIG. 4 is displayed on the monitor 3080. Further, the ID panel 500' shown in FIG. 16 and the IDX panel 6000 shown in FIG. 5 are displayed as an ID panel 500 and an IDX panel 600 so that they overlap the editing window 1000 at an upper portion thereof.

When the operator selects M-icons 1030, 1034 and 103A on the editing window 1000 shown in FIG. 4, the selected M-icons 1030, 1034 and 103A are enclosed by thick color frames (for example, flickered red solid lines), as shown in FIG. 15. Thus, the selection of those M-icons can be recognized at a look. Simultaneously, the display of the ID panel changes to the ID panel 500 shown in FIG. 14. Also, the frame images of ten leading frames are displayed as a film image 501.

Next, in the case where all the M-icons 1030, 1034 and 103A selected by the operator have never been subjected to detection processing, the IDX panel 6000 shown in FIG. 18 is such that target image display areas 291, 292 and 293 and detection result display areas 237, 238 and 239 are all blank, as shown by the IDX panel 6000 of FIG. 5.

In the case where the detection is to be performed, a desired frame image 521 containing a character or object to be detected is selected from the film image 501 displayed on the ID panel 500, as has already been described in conjunction with FIGS. 14 and 16, so that it is dragged and dropped to the enlargement display area 502. And, a frame image read from the information storage device 3060 (or a version thereof trimmed into a proper size) is displayed as an enlarged image 520 in the enlargement display area 502. Next, the operator selects color designating frames 503, 504 and 505 indicative of the extents of designation of specific colors for an image as an object of detection (for example, the character "X" in this case) from the enlarged image 520 and turns on an AUTOMATIC SEARCH button 511, thereby initiating a detection processing. In the case where the display window of the ID panel 500 is so small that it is hard to see, the ID panel 500 is displayed with a properly enlarged size.

Here, the frame image 521 dragged and dropped to the enlargement display area 502 is the target image 631. This frame image is displayed as the synoptical display area 611 for the target image 631 on the IDX panel 600 having already been described in conjunction with FIG. 6.

With the detection processing performed for respective frames to be subjected thereto, regions having the character "X" therein and their frame numbers are stored. As the result of the detection processing, frames resulting in the effectuating of detection of the character "X" are sandwiched between a detection arrow 506 (or a begin point) and a detection arrow 507 (an end point) on the film image 501 of the ID panel 500", as shown in FIG. 17. Further, pixel regions having the character "X" therein are displayed in a form enclosed by object frames 561 to 563.

At the same time, the detected conditions or the result of detection mentioned above are reflected by the IDX panel 600 and the editing window 1000 (FIG. 18) in accordance with the present invention.

Namely, the editing window 1000 of FIG. 18 assumes an editing window, as shown in FIG. 8, on which an IDX icon 12 is generated and displayed. Also, the result of detection is displayed on the side faces of the M-icons 1030, 1034 and 103A, as shown in FIGS. 12A, 12B and 12C.

Figure 19:
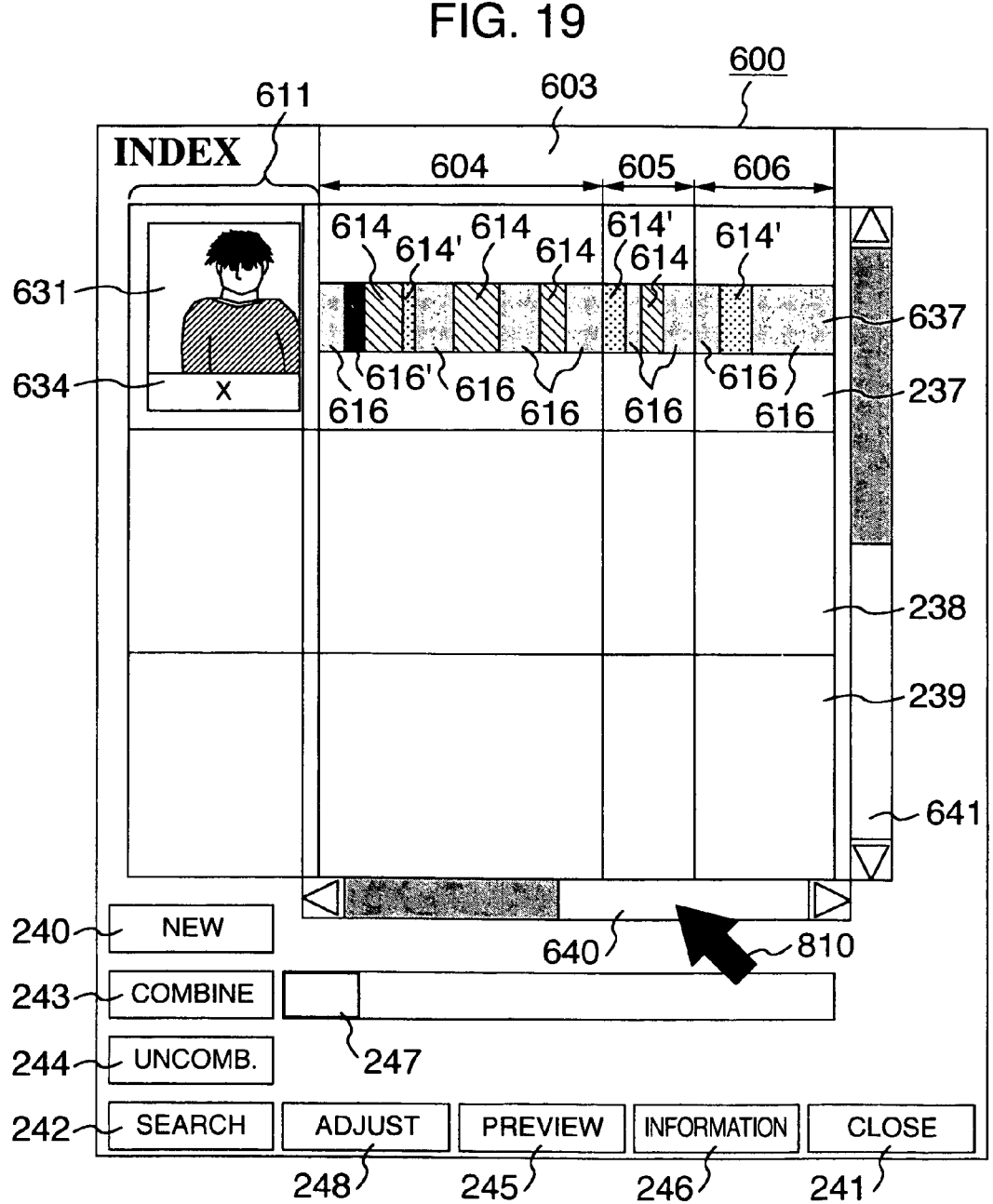
FIG. 19 is a diagram showing an embodiment of an IDX panel in the present invention.

Further, the IDX panel 600 of FIG. 18 assumes an IDX panel as shown in FIG. 19. The IDX panel shown in FIG. 19 shows an embodiment of the display on the IDX panel 600 shown in FIG. 18. In FIG. 19, the same parts as those in FIGS. 5 and 6 are denoted by the reference numerals as those used in FIGS. 5 and 6. Numeral 614' denotes the representation of a newly added detection effectuating domain area, and numeral 616' denotes the representation of a deleted detection effectuating domain area. The area representations 614' and 616' will be described later on. In FIG. 19, a target image 631 is displayed in a target image display area 611 while the conditions of frames subjected to detection processing are displayed in a detection domain bar 637 in units of one frame. Namely, in the detection domain bar 637 including divisional zones 604, 605 and 606 in units of the selected M-icons 1030, 1034 and 103A, a domain 614 resulting in the effectuation of detection of the character "X" is showily (or heavily) colored or patterned in units of one frame, thereby representing frame positions at which the character "X" exists.

With the construction, as shown in FIG. 18, in which the ID panel 500 and the IDX panel 600 are displayed together with the editing window 1000 to reflect the detected conditions or the result of detection into other information display columns, it is possible to make confirmation in M-icon units (on the IDX panel) and in frame units (on the ID panel and the IDX panel).

Figure 20:
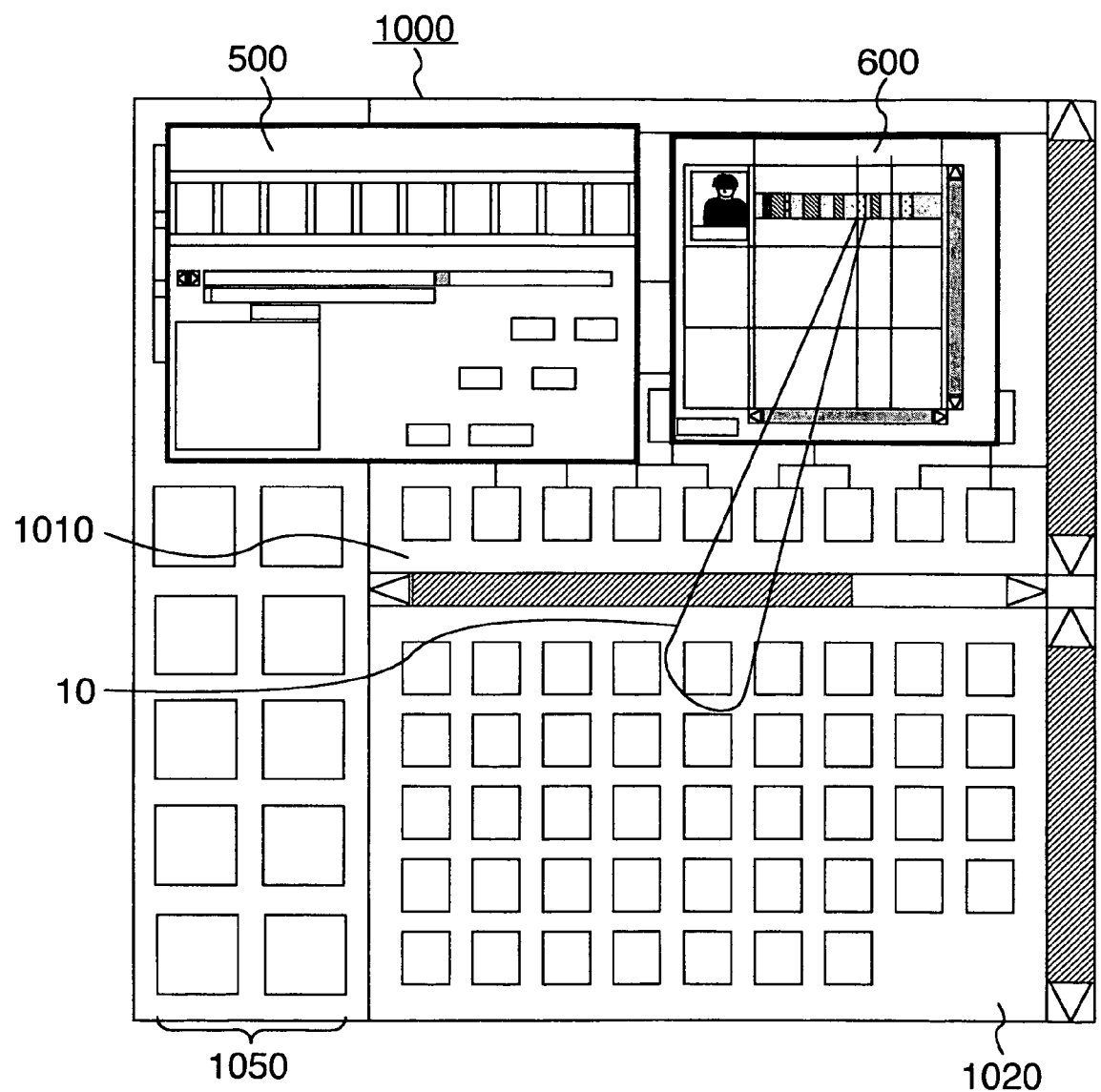
FIG. 20 is a diagram showing an editing window according to an embodiment of the present invention.

Next, the description will be made of a displaying method in the case where the result of detection is to be corrected. Though a correcting work may include the correction of the detection effectuating domain 531 shown in FIG. 17 (that is, the domain sandwiched between the detection arrows 506 and 507) and the correction of the object frames 561, 562 and 563, the correction of the detection effectuating domain will be made in the case of linkage display. This work is performed in such a manner that on the ID panel 500" of FIG. 17 displayed as the ID panel 500 in FIG. 18, frames to be subjected to correction are displayed in the film image 501 and the detection arrow 506 indicative of a begin point or the detection arrow 507 indicative of an end point is then dragged by the mouse pointer 810. When this correction work is performed, the IDX 600 displayed in FIG. 18 together with the ID panel 500 assumes the IDX panel 600 of FIG. 19 in which the detection effectuating domain 614 for the character "X" is being displayed in the detection domain bar 637. Therefore, if any frame position in the zones of M-icons subjected to the detection processing in the detection domain bar is double-clicked by the mouse, it is possible to display image data of the corresponding frame so that it is located at the head of the film image 501 (or the left extreme of the ID panel). As a result, a work of displaying a desired frame on the film image in order to correct or confirm the result of detection is facilitated. This also holds for the case where a detection effectuating domain is newly added. At this time, a beam representation 10 as shown in FIG. 20 is applied for the corresponding M-icon on the editing window 1000.

Next, the operation on the ID panel 500 side will be described in more detail.

First, there will be described the case where the detection effectuating domain 531 shown in FIG. 17 is corrected. This is realized by moving the mouse pointer 810 to move the detection arrow 506 indicative of a begin point or the detection arrow 507 indicative of an end point, as has already been mentioned. At this time, the showily colored or patterned domain 614 indicating detection effectuating frames in the detection domain bar 637 (FIG. 19) on the IDX panel 600 changes in compliance with the movement of the detection arrow 506 or 507 caused by the operator.

Next, the description will be made of the case where the operator adds a new detection effectuating domain due to an omission in detection or the like.

To perform this work, the operator clicks (or drags) and selects desired frame images on the film image 501 as a domain to be added and then turns on a detection effectuating domain ADD button 512. In compliance with the clicking (or dragging) motion of the mouse pointer 810, the condition of the selected domain (or frame images) is reflected and displayed in the detection domain bar 637 on the IDX panel 600. This area representation 614' in the detection domain bar 637 is provided with another color, another pattern, the combination thereof or the like in order that it is distinctive from the area representation 614 in the case where the detection effectuating frames are showily colored or patterned. Thereby, at a look and more simply without making the switching of window display, the operator can know about which one of frames for which one of M-icons is the selection/change now made for. It is hard to recognize this information from the film image 501 alone.

The above similarly holds for the case where the result of detection is to be deleted or cleared. In this case, a detection effectuating domain CLEAR button 514 is turned on in lieu of the detection effectuating domain ADD button 512. At this time, the area representation 616' of a deleted detection effectuating domain in the detection domain bar 637 is provided with a different color, a different pattern, the combination thereof or the like in order that it is distinguishable from the representation in the case where detection effectuating frames are showily colored or patterned and the representation in the case where a detection effectuating domain is added.

Next, a further embodiment will be described in conjunction with the case where the detection processing was previously performed one or more times.

Figure 21:
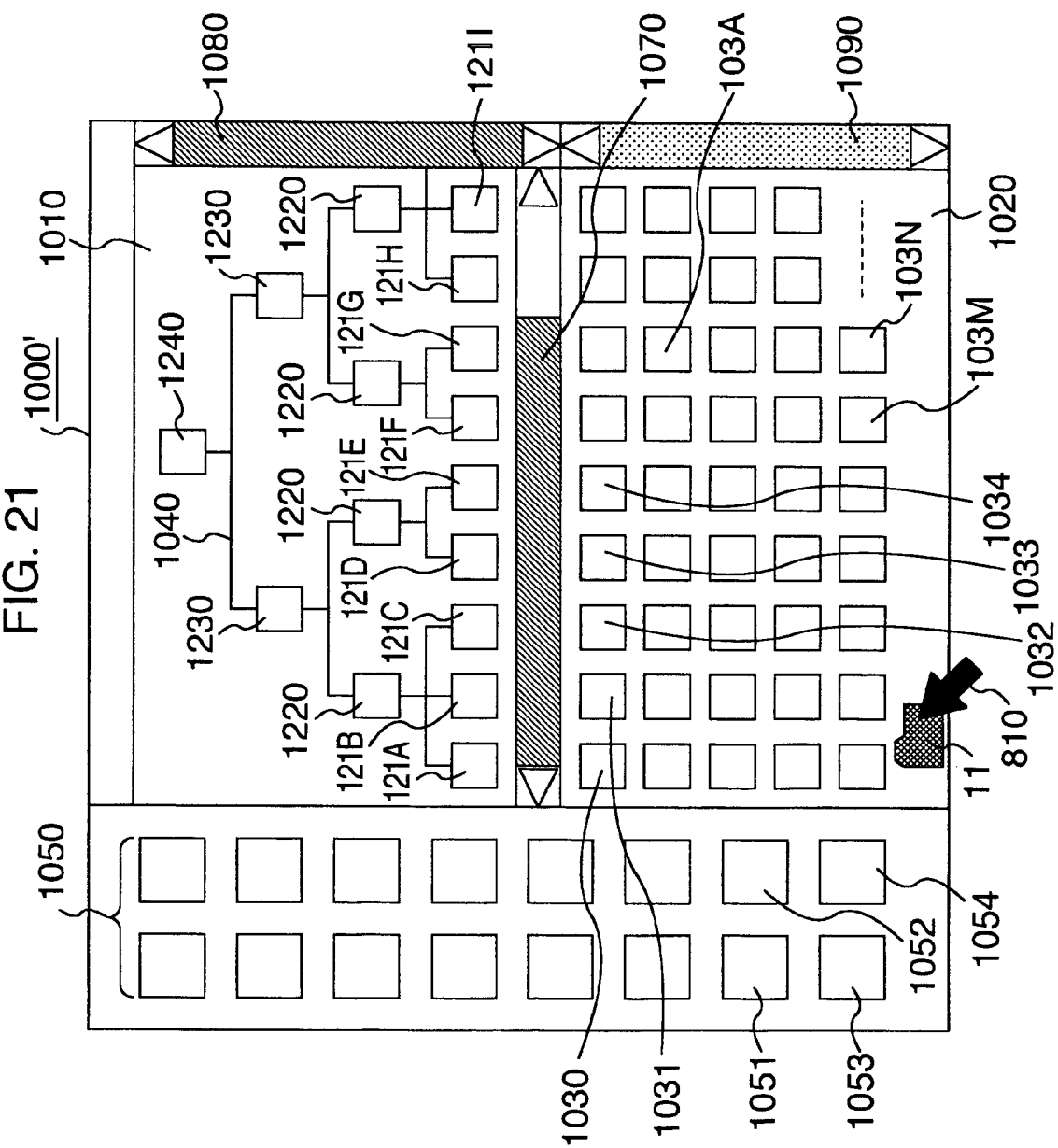
FIG. 21 is a diagram showing an editing window according to an embodiment of the present invention.

Herein, the description will be made in connection to the case where a tree structure 1040 (FIG. 21) having already been subjected to editing work is invoked from the information storage device 3060. FIG. 21 is a diagram showing an editing window in an embodiment of the present invention. In FIG. 21, the same parts as those in FIG. 8 are denoted by the same reference numerals as those used in FIG. 8. Numeral 1000' denotes an editing window, numeral 11 an IDX icon, and numerals 121A, 121B, 121C, - - - , 121H, 121I, - - - M-icons representing the lowermost cut images in an editing area 1010. Also, it is assumed that this tree structure 1040 was previously subjected to detection processing once with the uppermost M-icon 1240 selected (that is, with all the M-icons of the lowermost layer taken as a section to be subjected to detection processing).

First, the description will be made of the case where a character detecting button 1051 is turned on with the uppermost M-icon 1240 selected for the tree structure 1040. As shown in FIG. 20, an ID panel 500 and an IDX panel 600 are displayed on an editing window 1000 of the monitor 3080. At this time, ten leading frames of the M-icon 121A at the head (or left extreme) of the lowermost layer shown in FIG. 21 are displayed as a film image 501 on the ID panel 500. On the IDX panel 600, a target image 631 designated at the time of detection is displayed in a target image synopsis display area 611 and the conditions of frames subjected to detection processing are displayed in a detection result bar 637, as shown in FIG. 19.

In this state, however, the result of the previous detection processing is not displayed on the ID panel 500. In order to display this detection result, a desired target image 631 (FIG. 19) on the IDX panel 600 is clicked. Thereby, image data of the frame of the target image 631 and color designating frames 503, 504 and 505 used for color designation are simultaneously displayed in an enlargement display area 502 (FIG. 14) on the ID panel 500. Further, a detection arrow 506 indicative of a begin point and a detection arrow 507 indicative of an end point are displayed in the film image 501. Frame images 521, 522 and 523 between the detection arrows 506 and 507 are displayed with respective object frames 561, 562 and 563. Also, the clicking of the target image 631 (FIG. 19) results in that M-icons 121A, 121B, 121C, 121E and 121G having effectuated the detection of the character "X" are displayed, for example, in a form enclosed by a red frame of dotted line (FIG. 21). This is convenient for, e.g. a work of gathering only the M-icons 121A, 121B, 121C, 121E and 121G having the character "X" therein to generate a digest version. In FIG. 21, M-icons 1030, 1034 and 103A are displayed with red frames, too. This corresponds to the case where these M-icons 1030, 1034 and 103A are respectively copied to the M-icons 121A, 121B and 121C in the editing area 1010. The other M-icons 121D, - - - , 121H, 121I, - - - are ones resulting from the movement.

Figure 22:
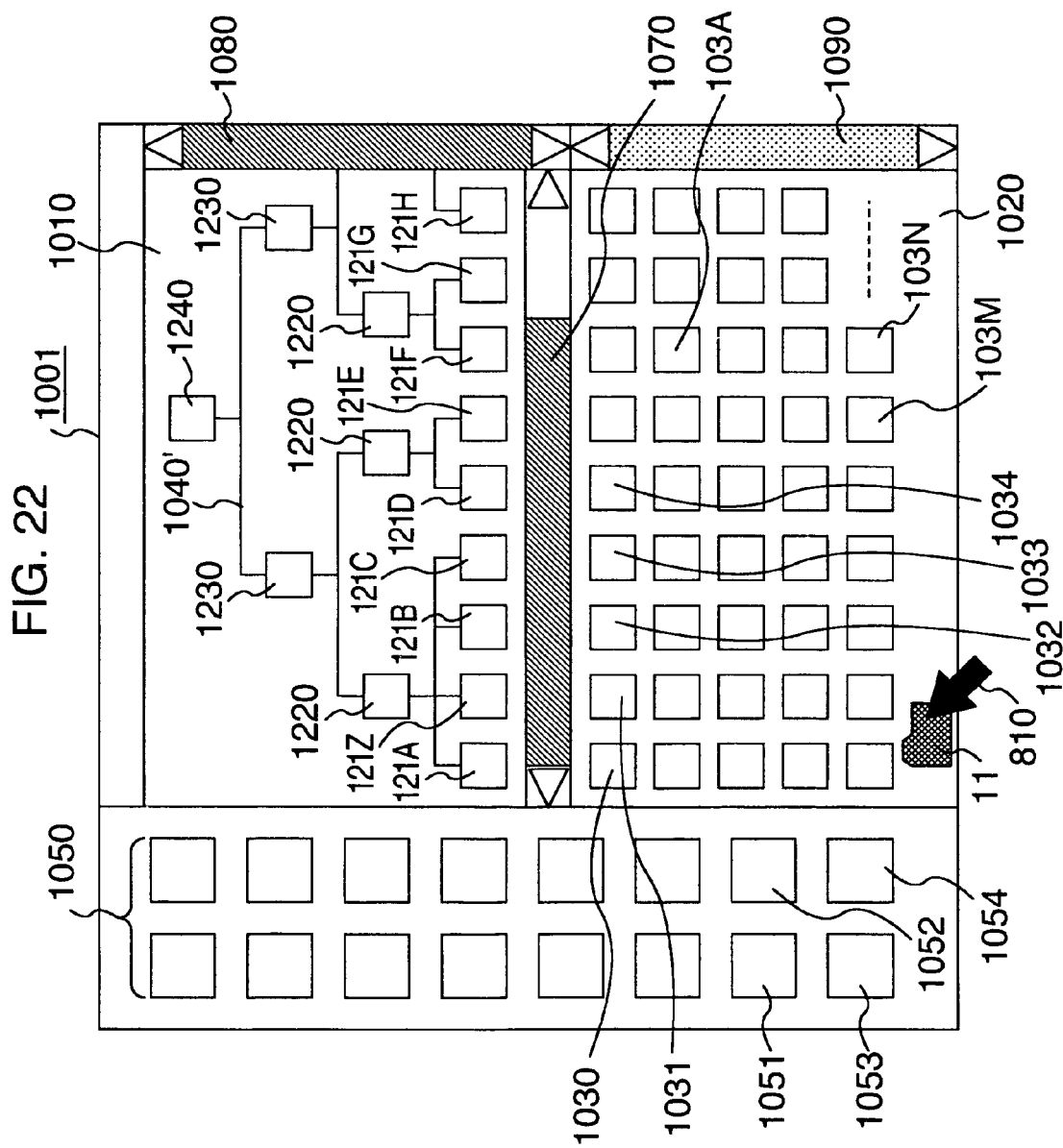
FIG. 22 is a diagram showing multi-window display according to an embodiment of the present invention.
Figure 23:
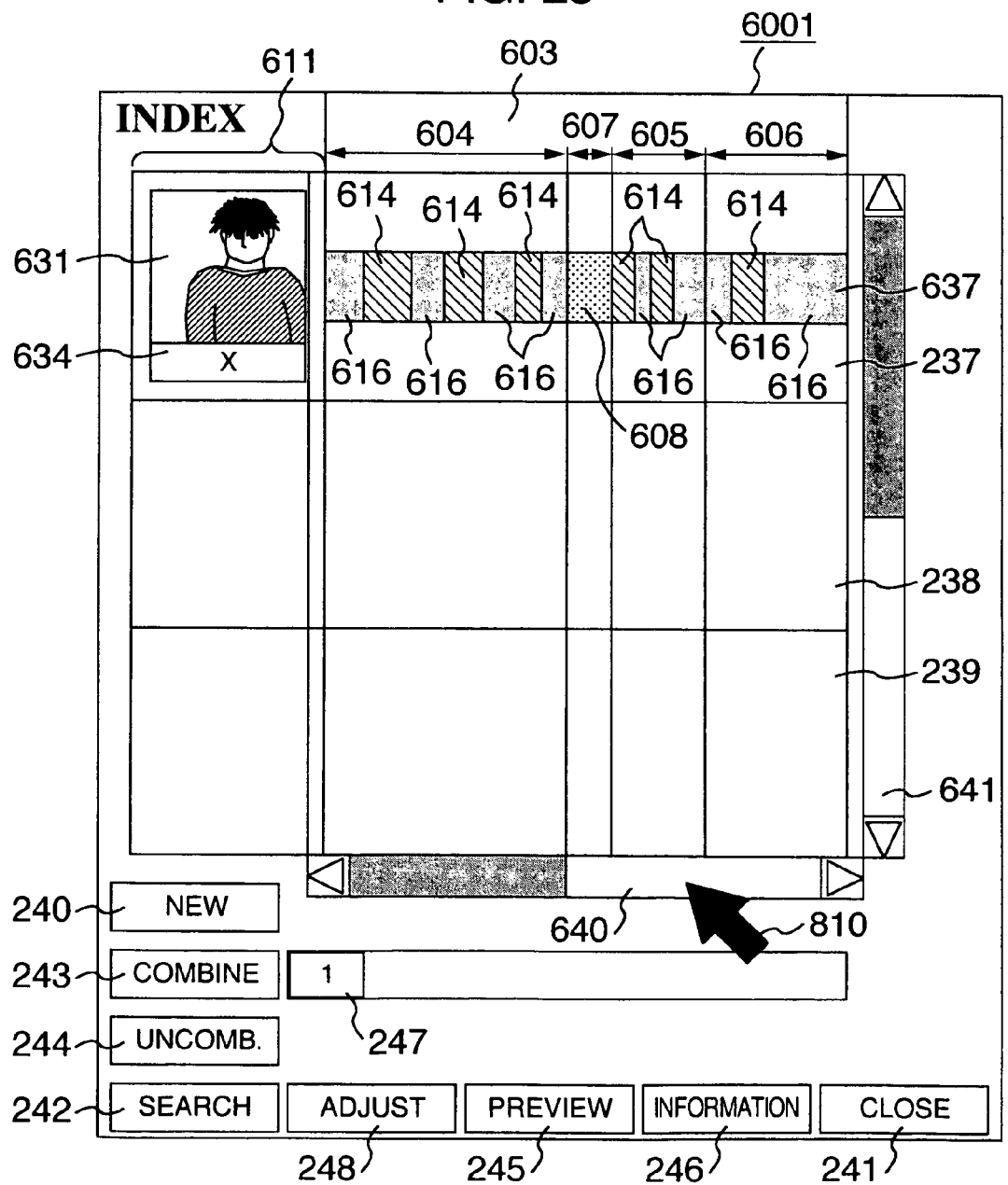
FIG. 23 is a diagram showing an embodiment of an IDX panel in the present invention.
Figure 24:
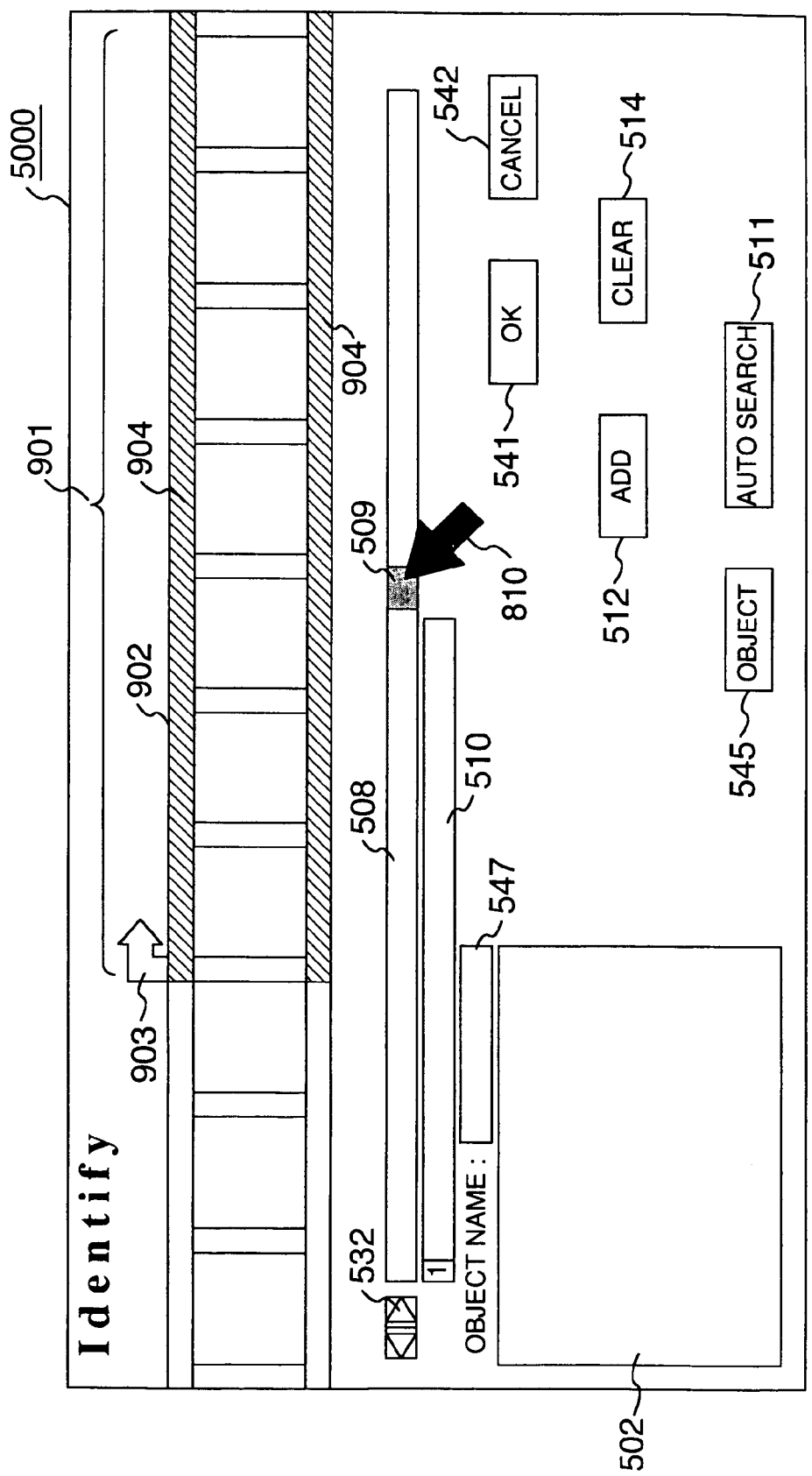
FIG. 24 is a diagram showing an ID panel according to an embodiment of the present invention.

Next, consider the case where an M-icon is newly added from the material area in a state in which the tree structure 1040 is invoked. FIGS. 22 and 20 are diagrams showing an editing window in an embodiment of the present invention. In FIG. 22, the same parts as those in FIG. 21 are denoted by the same reference numerals as those used in FIG. 21. Numeral 1001 denotes an editing window, numeral 1040' a tree structure in the editing area 1020, numeral 121Z an M-icon newly inserted between the M-icon 121A and 121B, numeral 11' an IDX icon, and numeral 1053 an IDX information button. FIG. 20 shows an embodiment in which a beam representation 10 is additionally displayed on the display window shown in FIG. 18. FIG. 23 shows an example of the case where a new zone is added after the M-icon 103A for the zone 604. FIG. 23 shows an IDX panel in an embodiment of the present invention as an example of display of the IDX panel shown in FIG. 18. In FIG. 23, the same parts as those in FIG. 19 are denoted by the same reference numerals as those used in FIG. 19. Numeral 6001 denotes an IDX panel, numeral 607 a newly added zone, and numeral 608 a detection unprocessed zone (or a zone having not yet been subjected to detection processing) in the detection domain bar 637 indicating the location of newly added frame images. FIG. 24 is a diagram showing an ID panel in an embodiment of the present invention. In FIG. 24, the same parts as those in FIG. 16 are denoted by the same reference numerals as those used in FIG. 16. Numeral 5000 denotes an ID panel, numeral 901 a detection unprocessed zone, numeral 902 a film image, numeral 903 a detection arrow, and numeral 904 a frame portion.

In FIG. 22, since the detection unprocessed M-icon 121Z is inserted between the M-icons 121A and 121B in the course of edition of a motion picture, the tree structure 1040' has the coexistence of M-icons having already been subjected to detection processing for a certain character "X" (that is, the zones 604, 605 and 606 having already been subjected to the detection of the character "X") and an M-icon having not yet been subjected to detection processing (that is, the zone 607 having not yet been subjected to the detection of the character "X"). When the character detecting button 1051 is turned on in this state, the zone for the M-icon 121Z having not yet been subjected to detection processing is displayed on the ID panel and the IDX panel to clarify the existence thereof so that it is showily colored or patterned with a color different from colors indicative of frames subjected to detection processing or colors indicative of selected zones.

For example, on the ID panel, the frame portion 904 of the detection unprocessed zone 901 in the film image 902 is showily colored or patterned with a discriminative color or pattern or the combination thereof, as shown in FIG. 24. On the IDX panel, the detection unprocessed zone 608 is showily colored or patterned with the different color or pattern or the combination thereof, as shown in FIG. 23 and mentioned above. In the shown example, the detection of the character "X" is effectuated in all regions of the detection zone 607. In the case where the operator desires to make the character detection for images in the detection unprocessed zone 901, the operator double-clicks the detection unprocessed zone representation 608 on the IDX panel 6001. At this time, ten leading frame images in the detection unprocessed zone 608 are displayed in the film image 901 on the ID panel 5001. At the same time, a beam representation 10 is provided for the M-icon 103Z corresponding to the detection unprocessed zone 608. Thereby, the specification of an M-icon under edition and a relationship between that M-icon and an editing work become clear. The beam representation 10 is a beam-bike representation which makes the interconnection of those data representations on separate windows which have a relation therebetween, as shown in FIG. 20. The form, color, pattern, etc. of the beam representation 10 may be arbitrary. For example, the beam representation 10 can be displayed in a discriminative mode which changes depending on the amount of information or the contents of information.

Though a sequence in accordance with which zones to be newly subjected to detection processing are added on the IDX panel follows the sequence of edited tree structures in the editing area, the sequence of addition may be the sequence of attachment or the sequence of display in the material area.

Now, the description will be made of the case where a detection processing is actually performed. At this time, number information of M-icons having already been subjected to detection is stored in the memory 3020. Therefore, it is only required to make the detection for frames of an M-icon having not yet been subjected to detection processing. On the ID panel, the result of detection is distinctively displayed with a detection arrow 506 (indicative of a begin point) and a detection arrow 507 (indicative of an end point) the colors of which are different from those of detection arrows for the already performed detection processing. On the IDX panel, frames subjected to the present detection processing are clarified so that they are showily patterned with a color different from that of frames having already been subjected to detection. This representation with different color is finished when the operator moves the detection arrow 506 or 507 or turns on the OK button 541. When the tree structure is invoked again, such representation with different color turns to the representation having the same color as the detection arrows for the already performed detection processing.

Finally, these panels are closed by turning on the OK button 541 or the CANCEL button 542 on the ID panel 500 to complete the editing work.

The editing window, the ID panel and the IDX panel can be moved by use of the input device 3090 such as a mouse.

Figure 25:
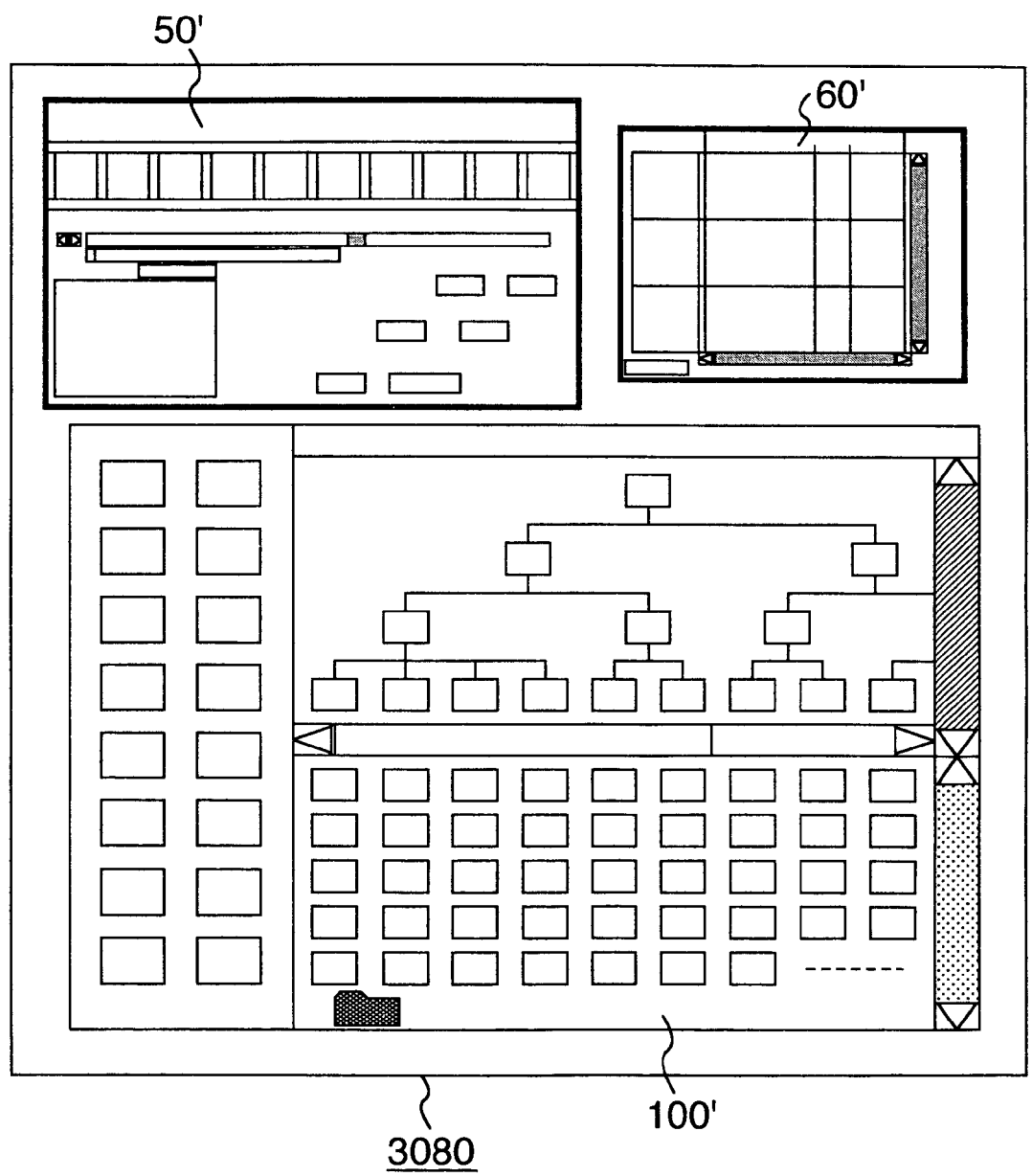
FIG. 25 is a diagram showing an embodiment of a multi-window screen on which an editing window, an ID panel and an IDX panel are simultaneously displayed.
Figure 26:
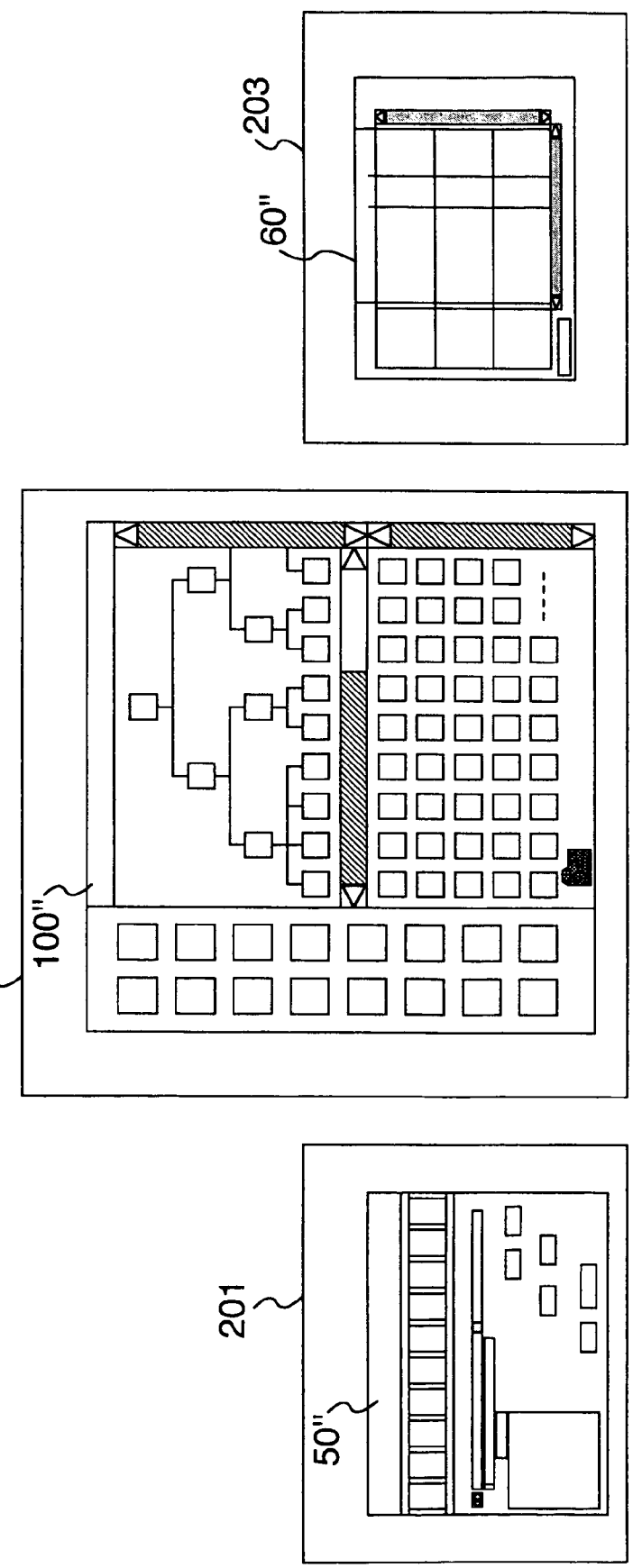
FIG. 26 is a diagram showing an embodiment in which an editing window, an ID panel and an IDX panel are simultaneously displayed.

FIGS. 25 and 26 are diagrams showing an embodiment of the editing window according to the present invention. FIG. 25 is substantially the same as FIG. 18. In FIGS. 25 and 26, reference numerals 201, 202 and 203 denote monitor display screens, numerals 50' and 50" ID panels, numerals 60' and 60" IDX panels, and numerals 100' and 100" editing windows.

As shown in FIG. 25, the displayed editing window 100', ID panel 50' and IDX panel 60' may be positioned so that one or all of the panels do not overlap. The monitor 3080 may be constructed so that it has the plurality of display screens 201, 202 and 203 on which the ID panel 50", the editing window 100" and the IDX panel 60" are displayed, respectively, as shown in FIG. 26. Also, a plurality of monitors may be provided. In this case, a beam representation becomes possible, for example, by preliminarily informing the CPU 3010 of the installation positions of the monitors 201, 202 and 203.

According to the foregoing embodiments, when the edition of a motion picture is made using a motion picture editing apparatus, the contents of change made in an editing work are displayed on an ID panel and an IDX panel simultaneously. Therefore, it becomes possible to perform a work of confirming information of the respective panels (with the actual image data seen on the ID panel in units of one frame and seen on the IDX panel in units of one M-icon or frames corresponding thereto). As a result, it is possible to improve the efficiency of edition.

In the foregoing embodiments, there is the following problem. In order that after the detection of a specified image such as a character or the like, a domain resulting in the effectuation of detection of the specified image is to be changed, it is required that an operation of newly generating a begin point and an operation of deleting the original begin point should be performed or an operation of newly generating an end point and an operation of deleting the original end point should be performed. These operations are complex and are liable to make an error.

Another problem concerns a change in object frame. When an operator makes the change in position/size of an object frame which lies in one frame image (hereinafter referred to as frame simply), there results in that the identical object frames in the succeeding frames are also changed to the same position/size as the one object frame, that is, the change is automatically made for object frames for which the operator does not intend to make the change. Therefore, in the case where an object frame in one frame is changed, it is necessary to pay attention to object frames in the succeeding frames.

In an embodiment of the present invention which will be described in the following, the above problem is overcome, thereby providing a correcting method in which the simplified operationality is attained, an error is hard to generate, and it is easy to find out an error even if the error is generated.

To solve the above problem, an image detecting method according to one embodiment of the present invention enables the implementation of the change the position of a detection arrow and the change of a detection effectuating domain by interlocking the detection arrow and the detection effectuating domain with each other and moving the detection arrow. In the case where a detection effectuating domain is to be newly added, there is implemented a construction in which it is possible to perform an operation by clicking the ADD button after the domain to be newly added is designated on a film image beforehand. Similarly, in the case where a detection effectuating domain is to be deleted or cleared, there is implemented a construction in which it is possible to perform an operation by clicking the CLEAR button after the domain to be deleted added is designated on a film image beforehand. In the case where it is desired to move the detection arrow to the end of a film image being displayed so that it is further moved to a zone for which no film image is being displayed, there is implemented a construction in which frame images are automatically scrolled.

According to an image detecting method according to an embodiment of the present invention in the case where an object frame is changed, the change in object frame is made for only a selected portion on a film image. Further, object frames outside of a designated area can individually be changed every frame.

Thus, there is realized the image detecting method in which the simplified operationality is attained, an error is hard to generate, and it is easy to find out an error even if the error is generated.

The method for change in detection effectuating domain and object frame according to the present invention will now be described.

First, the change in detection effectuating domain (the enlargement/reduction of a domain and the joint of domains) by the dragging of a detection arrow will be described using FIG. 27 which shows a flow chart illustrating an embodiment of a processing performed in the case where the change in detection effectuating domain is made.

The case of the reduction of a domain will now be described in conjunction with a detection effectuating domain 211 exemplarily shown in FIG. 28.

Figure 28:
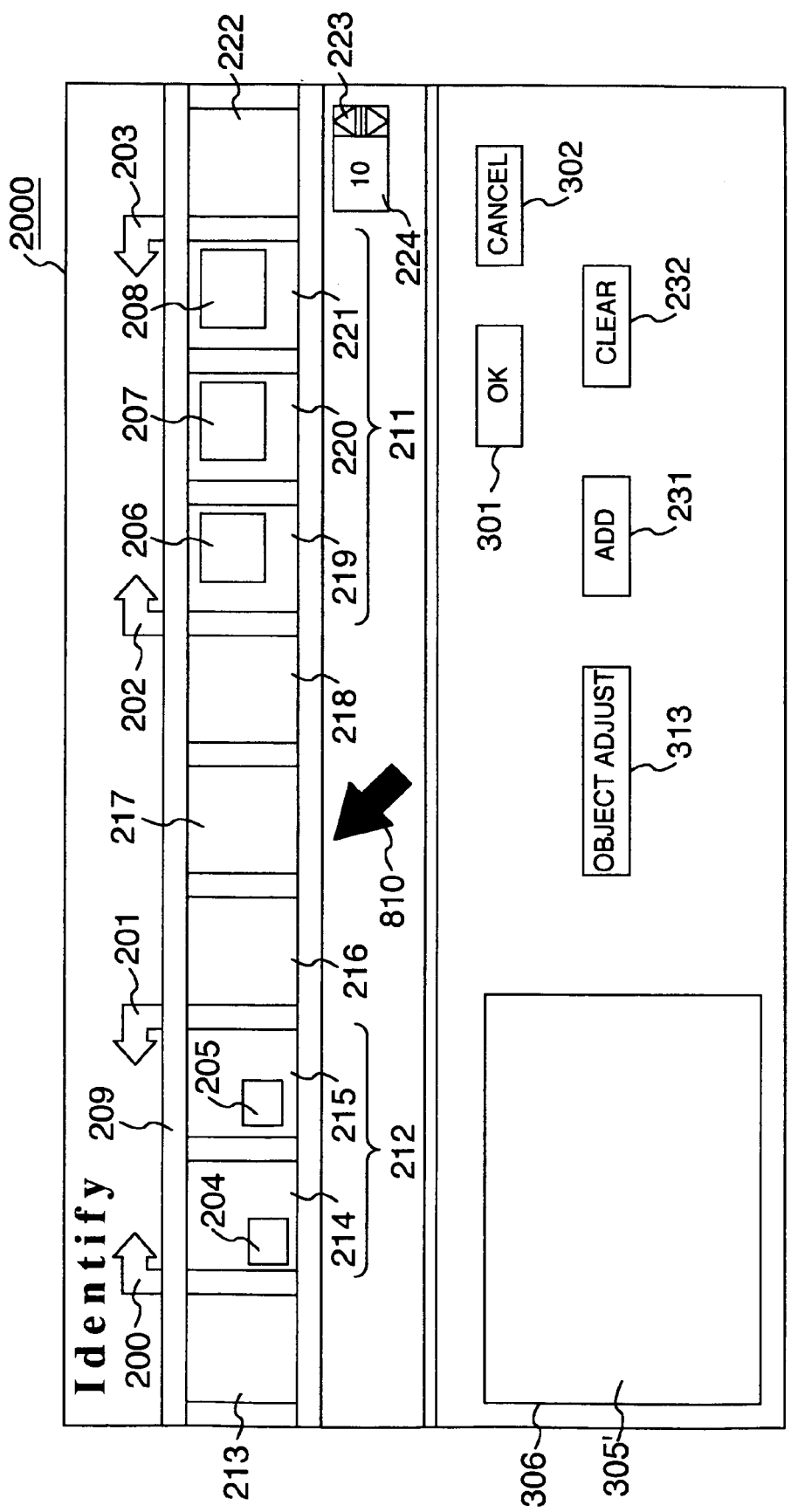
FIG. 28 is an embodiment of an ID panel in the present invention.

FIG. 28 is a diagram showing an embodiment of an ID panel when the confirmation or change of the result of detection according to the present invention is made. Reference numeral 2000 denotes an ID panel, numerals 200, 201, 202 and 203 detection arrows, numerals 204, 205, 206, 207 and 208 object frames, numeral 209 a film image, numerals 211 and 212 detection effectuating domains, numerals 213, 214, 215, 216, 217, 218, 219, 220, 221 and 222 frame images arranged in the film image 209 in order along the time axis from the left of the screen, numeral 223 a skip button, numeral 224 a display box, numeral 231 an ADD button, numeral 232 a CLEAR button, numeral 305' an enlarged version of the frame image 213 positioned at the leftmost portion of the film image 209, numeral 306 an enlargement display area where the enlarged image 305' is displayed, numeral 301 an OK button, numeral 302 a CANCEL button, and numeral 313 an OBJECT FRAME ADJUST button.

The detection arrows 200 to 203 displayed on the upper side of the film image 209 are arrows indicating the beginning and end of each detection effectuating domain. The detection arrow 200 or the detection arrow 202 is the head of detection called a begin point. The detection arrow 201 or the detection arrow 203 is the termination of detection called an end point. A domain sandwiched between the detection arrow 200 of the begin point and the detection arrow 201 of the end point is the detection effectuating domain 212, and a domain sandwiched between the detection arrow 202 of the begin point and the detection arrow 203 of the end point is the detection effectuating domain 211. Each of the object frames 204 to 208 displayed in the frame images belonging to the detection effectuating domain 211 and the detection effectuating domain 212 indicates a position at which a character "X" exists in the frame image. The object frame is displayed as the result of character detection.

Figure 27:
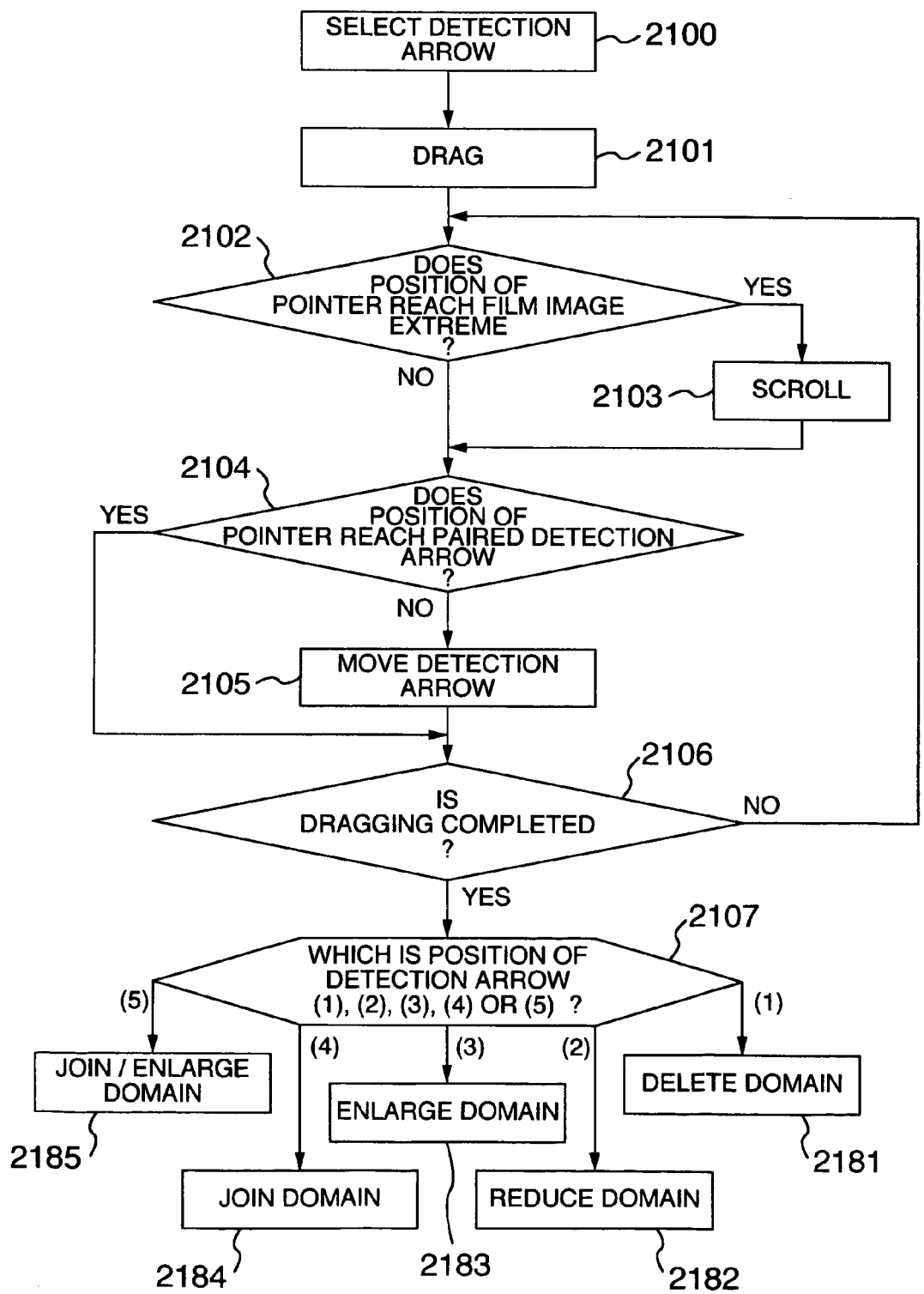
FIG. 27 shows a flow chart showing an embodiment of a processing for making a correction for a detection effectuating domain according to the present invention.

When the processing shown in FIG. 27 is started, the pointer 810 is moved to the position of the detection arrow 202 of the begin point in the detection effectuating domain 211 made of an object of change and is then clicked (step 2100).

Next, the mouse pointer 810 is dragged to drag the detection arrow 202 into a desired right/left position (step 2101).

Thereafter, the check is made of whether or not the mouse pointer 810 being dragged in step 2101 reaches the right/left extreme of the film image 209 (step 2102). When the mouse pointer 810 reaches the right/left extreme of the film image 209, the flow goes to step 2103. When the case is not so, the flow goes to step 2104.

In step 2103, the film image 209 is subjected to a scroll processing. For example, when the mouse pointer 810 being dragged reaches the right extreme of the film image 209, frame images positioned on the further right side of the film image 209 are slid leftwards so that they are displayed on the film image 209. Similarly, when the mouse pointer 810 being dragged reaches the left extreme of the film image 209, frame images positioned on the further left side of the film image 209 are slid rightwards so that they are displayed on the film image 209. Then, the flow goes to step 2104.

The number of frames to be scrolled at once can be set in units of the predetermined number of frames (for example, in units of one or more frames). A method of changing this unit of scroll or the number of frames to be scrolled may include, for example, a method in which an upward/downward arrow on the skip button 223 is attached to increase or decrease the number of frames to be skipped which is displayed in the display box 224 on the left side of the skip button 223 (wherein the attachment of the upward arrow causes the increase in number of frames and the attachment of the downward arrow causes the decrease in number of frames), a method in which the number of frames is inputted into the display box 224 directly from the keyboard, and a method in which the number of frames is entered into a configuration file and that numeric value is written into the memory at the time of start of an application. The configuration file includes various setting conditions of the application (for example, the directory setting of a destination for output of the file) which are designated by the operator beforehand.

Next, the judgement is made of whether or not the dragged mouse pointer 810 reaches the position of the detection arrow 203 of the end point paired with the detection arrow 202 (step 2104). When the case is so, the flow goes to step 2106. When the case is not so, the flow goes to step 2105.

In step 2105, the detection arrow 202 is moved in compliance with the motion of the mouse pointer 810. Then, the flow goes to step 2106.

In step 2106, the judgement is made of whether or not the dragging of the mouse pointer 810 is completed. If the dragging is not completed, the flow returns to step 2102 to repeat the processing. If the dragging is completed, the flow proceeds to step 2107.

In step 2107, the flow branches off here to (1) to (5) (steps 2181 to 2185) in accordance with the stop position of the detection arrow 202.

(1) Step 2181: In the case the begin point (or the detection arrow 202) overlaps the end point of the detection effectuating domain 211 (or the detection arrow 203), the detection effectuating domain 211 is deleted. Namely, data of the detection arrow 202 (or the begin point), the detection arrow 203 (or the end point) and the object frames 206 to 208 in the corresponding domain is deleted from the data structure. Thereby, the display of the detection arrows 202 and 203 and the object frames 206 to 208 in the corresponding domain is extinguished.

(2) Step 2182: In the case where the begin point (or the detection arrow 202) lies in the detection effectuating domain 211, the extent of detection effectuating domain 211 is reduced. For example, provided that the detection arrow 202 is dragged rightwards by two frames, data of the detection arrow 202 is shifted rightwards by two frames so that data of the object frames 206 and 207 is deleted from the data structure. Thereby, the detection arrow 202 of the begin point is displayed on the left side of the frame 221 and the display of the object frames 206 and 207 is extinguished.

(3) Step 1283: In the case where the begin point (or the detection arrow 202) lies between the detection effectuating domains 211 and 212, the detection effectuating domain 211 is enlarged. For example, provided that the detection arrow 202 is dragged leftwards by one frame, data of the detection arrow 202 is shifted leftwards by one frame so that data of an object frame is newly added to the data structure. This newly added object frame takes the same size/position as the object frame 206. Thereby, the detection arrow 202 is displayed on the right side of the frame image 217 and the new object frame having the same size/position as the object frame 206 is displayed in the frame 218.

(4) Step 1284: In the case where the begin point (or the detection arrow 202) lies in the detection effectuating domain 212 (inclusive of the case where it overlaps the detection arrow 200 or 201), two detection effectuating domains 211 and 212 are joined. Namely, data of the detection arrow 202 and the detection arrow 201 of the end point is deleted from the data structure and data of three object frames falling between the domains 211 and 212 is newly added to the data structure. These newly added object frames are generated through linear interpolation in position made between the object frames 206 and 205.

(5) Step 1285: In the case where the begin point (or the detection arrow 202) lies on the further left side than the detection effectuating domain 212, the detection effectuating domain 211 is enlarged so that it is joined with a plurality of domains on the left side thereof (inclusive of the domain 212). The detection arrows and object frames take the combination of the case of joint and the case of enlargement.

Figure 29:
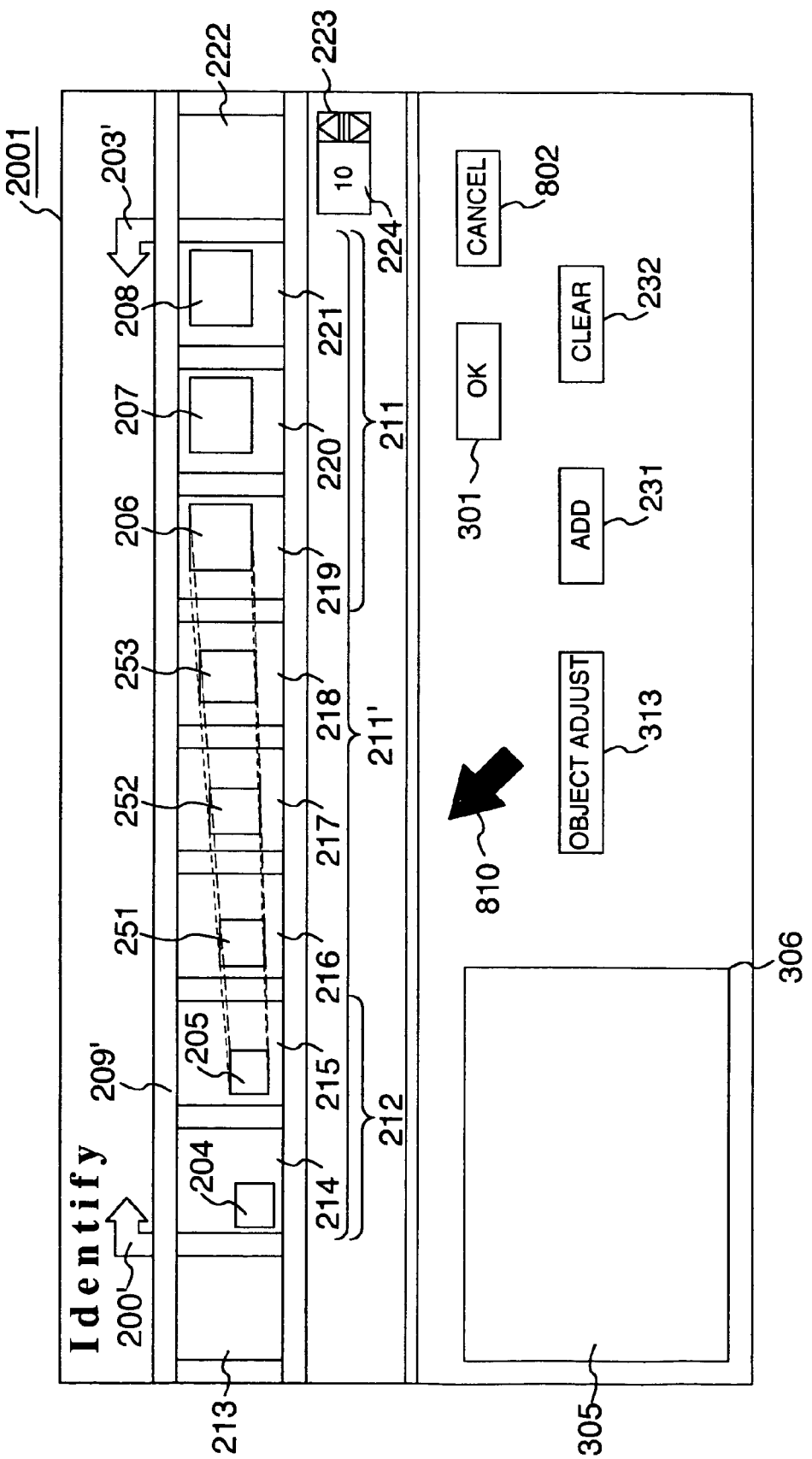
FIG. 29 is a diagram showing an ID panel according to an embodiment.

The object frame change based on the linear interpolation will now be described using FIG. 29. FIG. 29 shows an ID panel showing an embodiment of the result of joint of the detection effectuating domains 211 and 212. In FIG. 29, the same parts as those in FIG. 28 are denoted by the same reference numerals as those used in FIG. 28. Numeral 2001 denotes an ID panel, numeral 200' a detection arrow indicative of a begin point, numeral 203' a detection arrow indicative of an end point, numeral 209' a film image, numeral 211' a detection effectuating domain, and numerals 251 to 253 object frames.

FIG. 29 shows a state resulting from the leftward movement of the begin point of the detection effectuating domain 211 (or the detection arrow 202) for the change in domain to overlap the end point of the detection effectuating domain 212 (or the detection arrow 201) (see FIG. 28). The detection arrows 201 and 202 are deleted and the detection effectuating domains 211 and 212 are jointed to form a detection effectuating domain 211'.

The new object frames of the frame images 216 to 218 newly added to the detection effectuating domain are determined from positions obtained by the equi-interval division of lines which connect the apexes of the object frame 205 of the frame image 215 on the left side of the new object frames and the corresponding apexes of the object frame 206 of the frame image 219 on the right side of the new object frames. Though the connecting lines are depicted in FIG. 29 as dotted lines for the convenience of illustration, those lines are not actually displayed. These linearly interpolated object frames 251 to 253 are displayed. Thus, the frame images 216 to 218 are respectively allotted with the object frames 251 to 253 having their positions and sizes which equally change from that of the object frame 205 to that of the object frame 206.

Though the change in object frame is made by clicking the OBJECT FRAME ADJUST button 313 for the switching to an object frame change mode, the details thereof will be mentioned later on. When the OK button 301 is clicked after the change in object frame, the ID panel 2001 is closed with the result of change held. On the other hand, when the CANCEL button 302 is clicked, the ID panel 2001 is closed with the result of change cancelled. In the case where the OBJECT FRAME ADJUST button 313 is clicked to switch the ID panel 2001 to the object frame change mode and the OBJECT FRAME ADJUST button 313 is clicked again, the ID panel 2001 returns to the former display mode.

Next, the change in object frame will be described. The change in object frame divides into interpolation change and individual change. The interpolation change is used when it is desired to correct a plurality of object frames at once (or en bloc). The individual change is used when object frames are to be changed one by one.

Figure 30:
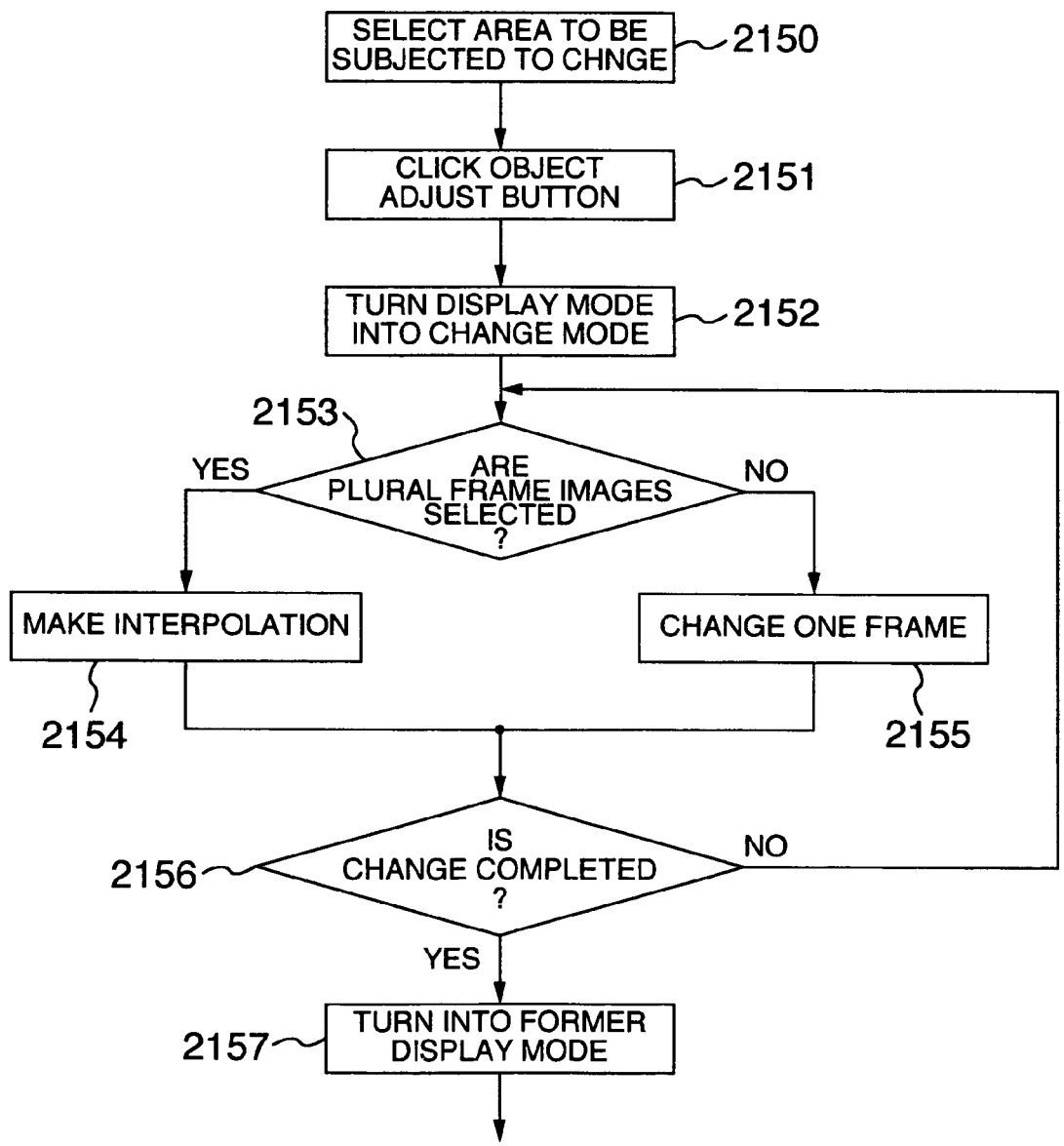
FIG. 30 shows a flow chart showing an embodiment of a processing for interpolation change in selected frame according to the present invention.
Figure 31:
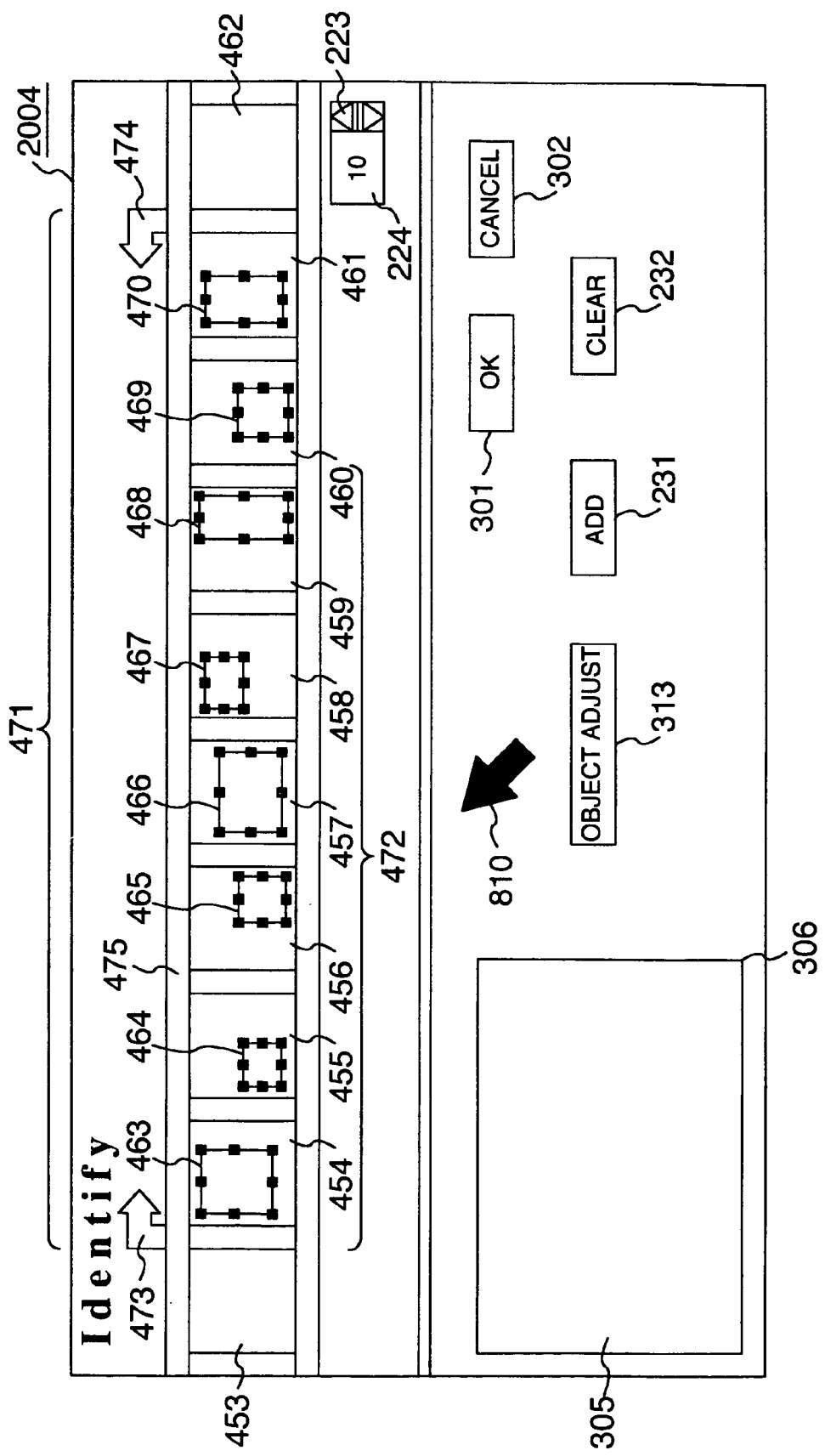
FIG. 31 is a diagram showing an embodiment of an ID panel in which an interpolation change in selected frame according to the present invention is made.
Figure 32:
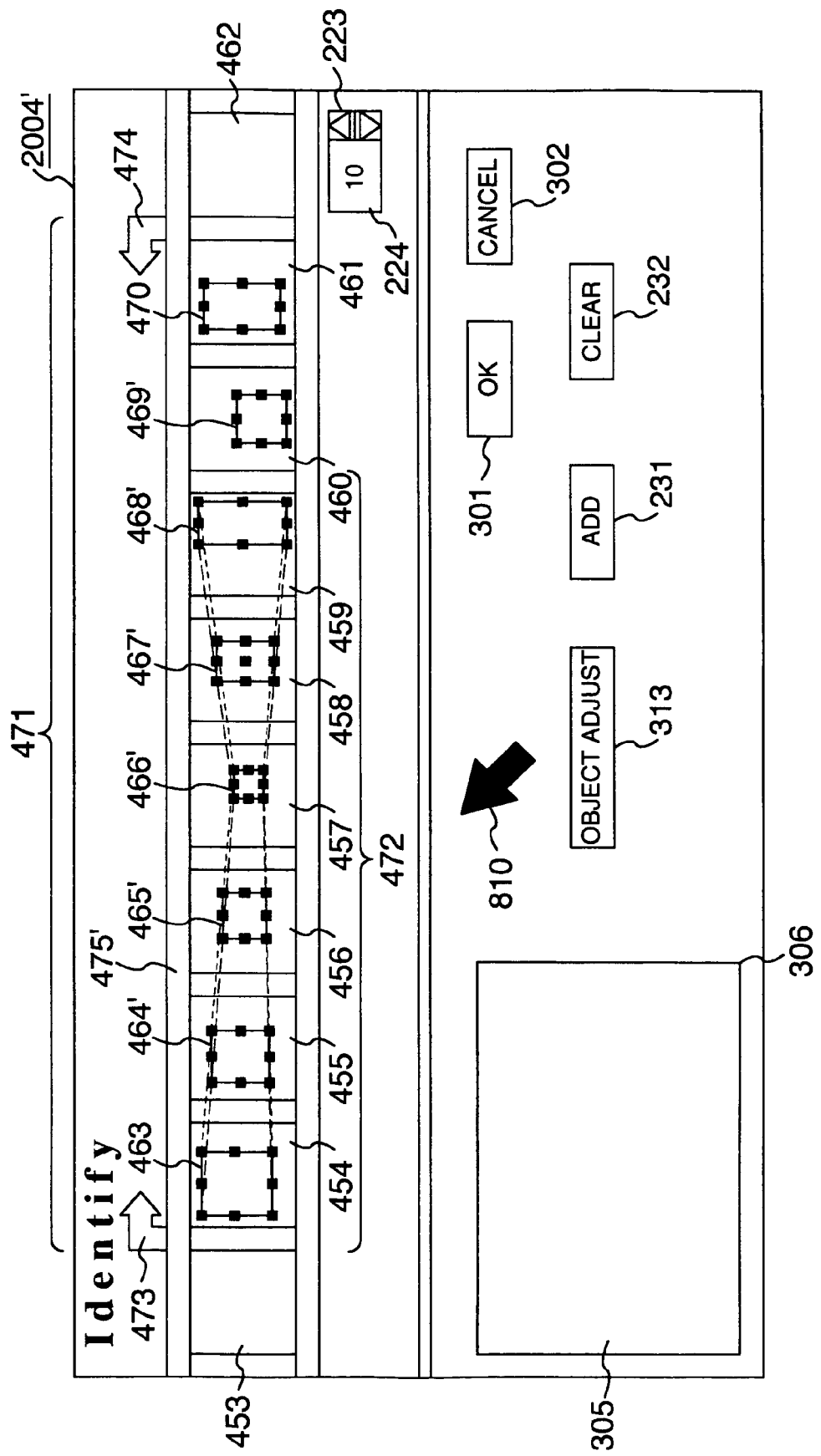
FIG. 32 is a diagram showing an embodiment of an ID panel in which an interpolation change in selected frame according to the present invention is made.

First, the description using FIGS. 30, 31 and 32 will be made of an embodiment in the case where a plurality of object frames are interpolated at once. FIG. 30 is a flow chart showing an embodiment of a processing in the case where a plurality of object frames are interpolated at once. FIGS. 31 and 32 are diagrams showing an embodiment of an ID panel in the case a plurality of object frames are interpolated at once. In FIGS. 31 and 32, the same parts as those in FIG. 28 are denoted by the same reference numerals as those used in FIG. 28. Numerals 2004 and 2004' denote ID panels, numerals 475 and 475' film images, numeral 473 a detection arrow indicative of a begin point, numeral 474 a detection arrow indicative of an end point, numerals 453 to 462 frame images, numerals 463 to 470 and 464' to 467' object frames, numeral 471 a detection effectuating domain, and numeral 472 a selected frame area.

When the processing shown in FIG. 30 is started on the ID panel shown in FIG. 31, the operator selects frame images 454 to 459 (that is, a frame area 472) by use of the mouse pointer 810 (step 2150).

Next, in the case where the OBJECT FRAME ADJUST button 313 is clicked (step 2151), the flow proceeds to step 2152.

In step 2152, the object frame display mode is turned to a change mode. In the object frame change mode, eight square points are added to each of selected object frames 463 to 470, as shown in FIG. 31.

Next, whether or not the number of object frames selected in step 2150 is one or plural is judged to determine whether or not the change in object frame should be made en bloc (step 2153). Namely, when plural object frames are selected, the flow goes to step 2154 in order to make the en bloc change of these frames. When only one object frame is selected, the flow goes to step 2155 in order to make the change of only the one frame.

In describing the enbloc change made in step 2154, consider by way of example the case where the necessity of making a change in position/size of the object frames 463 and 468 is little whereas the position/size of the object frame 466 is most different from the pixel region of a character "X" appearing in the frame image 457. In this case, the object frame 466 is subjected to deformation or change. The object frame 466 is deformed by dragging the mouse pointer 810. When the deformation of the object frame 466 is completed (or the dragging is stopped), the object frames 463 to 468 in the selected frame area 472 are subjected to interpolation change with the object frames 463 and 466 taken as origins or reference frames and with the object frames 466 and 468 taken as reference frames, in a manner similar that described in conjunction with FIG. 29. An example of the changed object frames is object frames 464', 465', 466' and 467' displayed in FIG. 32. Dotted lines depicted in FIG. 32 for the convenience of illustration are not actually displayed.

In the case where only one object frame is selected (step 2153), only the selected object frame is subjected to change (step 2156).

When the change in step 2154 or step 2155 is completed, the flow proceeds to step 2156 in which the judgement is made of whether or not the OBJECT FRAME ADJUST button 313 is clicked again. If the button 313 is not clicked, the flow returns to step 2153 to continue the change processing. If the button 313 is clicked, the flow proceeds to step 2157.

In step 2157, the object frame display mode is turned to the former mode so that the change mode is cancelled.

In the case where the OK button 301 is clicked, the ID panel 2004' is closed with the result of change held. On the other hand, in the case where the CANCEL button 302 is attached, the ID panel 2004' is closed with the result of change cancelled.

In the foregoing embodiment, one example of the image detecting method has been described in conjunction with an example in which a character is detected. However, it is self-evident that an object image other than characters can be detected by designating the combination of specific colors. Further, it is needless to say that the present invention can also be applied in conjunction with a detecting method other than that mentioned above.

Now, the procedure for storing data of the result of detection of a character always in the information region of an M-icon of the lowermost layer of a hierarchical structure will be described in reference to a flow chart shown in FIG. 33. In the above-mentioned embodiment of the present invention, it has been shown that in the case where an upper layer of the tree structure, for example, the M-icon 1220 "a" (FIG. 8) is attached to perform a processing for the detection of the character "A", the data of the result of detection of the character "A" is stored into data structures corresponding to M-icons 1210 "b", "c" and "d" in the lowermost layer of the tree structure. The operation of a processing performed in this case will be described referring to the flow chart shown in FIG. 33 and data structures shown in FIGS. 35 to 41.

In step 8001 for scene number acquisition, a scene number in a data region 72 of a data structure 7000($a$) (see FIG. 35) of the attached M-icon 1220 "a" is acquired. Namely, when an M-icon corresponding to a scene is attached in order to detect the character "A", an attach structure of the attached M-icon is generated corresponding to a scene number. For example, assume that an operator attaches the M-icons 1031 to 1033 (FIG. 4) in a sequence from a smaller number to a larger number. In the case where the number of attached M-icons is thus not one but plural, a pointer to an attach structure 7000($b$) (FIG. 35) of the next attached M-icon is acquired from a data region 71 of the attach structure 7000($a$) and a scene number is acquired from a data region 74 of the attach structure 7000($b$). Then, a pointer to an attach structure 7000($c$) of the next attached M-icon is acquired from a data region 73 of the attach structure 7000($b$) and a scene number is acquired from a data region 76 of the attach structure 7000($c$). Then, the address of the next attach structure is acquired from a data region 75 of the attach structure 7000($c$). Thus, scene numbers are acquired by the number of attached M-icons.

Next or in step 8002 for scene structure acquisition, there is acquired a scene structure which has the same scene number as the scene number acquired in step 8001. This scene structure is generated as an editing work is performed to generate a tree structure in the editing area 1010. For example, in the case of the attach structure 7000(*a*) shown in FIG. 35, a scene structure 7100 shown in FIG. 36 is found out referring to the scene number stored in the data region 72 of the attach structure 7000(*a*). In the case of the attach structures 7000(*b*) and 7000(*c*), the reference is made to the scene numbers stored in the data regions 74 and 76 of the respective attach structures.

Next or in step 8003 for display class judgement, a display class is judged from a display class number in the scene structure. For example, in the case where the attached M-icon is the M-icon 1220 "a" which represents a scene of the tree structure 1040 having already been edited in the editing area 1010 on the editing window 1000 shown in FIG. 8, a display class number stored in a data region 78 of a scene structure 7100 corresponding to a scene number of that scene is acquired. Namely, data regions 78, 82, 86 and 90 are stored with display class numbers or numeric values each of which indicates a layer in the tree structure for the M-icon corresponding to that scene structure. For example, the display class number equal to "0" indicates the lowermost or first layer, the display class number equal to "1" indicates the second layer, the display class number equal to "2" indicates the third layer, and so forth. Now, the data region 78 is stored with "1" representing the layer of the M-icon 1220 "a" and e the data regions 82, 86 and 90 are stored with "0" representing the layer of the M-icons 1210 "b", "c" and "d". In step 8003, the judgement is made of whether or not the scene structure is one of the lowermost layer. If it is the lowermost layer, the flow goes to step 8004. If it is not the lowermost layer, the flow goes to step 8008. The judgement of whether or not the scene structure is one of the lowermost layer, can be made by referring to the data region in which the display class number is stored. Namely, the flow goes to step 8004 if a numeric value stored in the data region for display class number is "0" and step 8008 if it is equal to "1" or larger than that.

In step 8008 for lower layer scene structure acquisition, there is acquired a scene structure which lies in a layer lower than the tree structure layer of the scene structure acquired in step 8002. For example, provided that a scene structure corresponding to a scene number of the M-icon 1220 "a" shown in FIG. 8 is the scene structure 7100 (FIG. 36), a pointer to (or an address of) a scene structure 7100A corresponding to the M-icon 1210 "b" at the leftmost position of the lower tree layer is stored in a data region 77 of the scene structure 7100. With the reference made to this pointer, the scene structure 7100A can be acquired. Further, the reference is made to a data region 81 of the scene structure 7100A, thereby making it possible to acquire a scene structure 7100B corresponding to the M-icon 1210 "c" on the right side of the M-icon 1210 "b". Similarly, the reference is made to a data region 85 of the scene structure 7100B, thereby making it possible to acquire a scene structure 7100C corresponding to the M-icon 1210 "d" on the right side of the M-icon 1210 "c". If the lowermost scene structure(s) are acquired, the flow returns to step 8003.

In step 8004 for cut structure acquisition, the reference to a cut number stored in any of the data region 84, 88, 92 of the scene structures 7100A, 7100B and 7100C of the lowermost layer (FIG. 36) is made to acquire a cut structure which is storing the same cut number as that cut number. In an example shown in FIG. 36, data regions 83, 87 and 91 of the scene structures 7100A, 7100B and 7100C are stored with scene numbers to which the respective scene structures belong. Similarly, data regions 84, 88 and 92 of the scene structures 7100A, 7100B and 7100C are stored with cut numbers belonging to the lower layer of the respective scene structures. The reference to a cut number data region of a scene structure having a display class number equal to "0" is made to acquire a cut structure having the same cut number as that cut number. For example, in the case of the scene structure 7100A, the cut structure 7200 (FIG. 37A) is acquired, and in the case of scene structure 7100B, a cut structure 7200A (FIG. 38) is acquired.

Next or in step 8005 for object class structure acquisition, the reference is made to a data region 94 of the cut structure 7200 (FIG. 37A) in which a pointer to object class structure is stored. Thereby, an address for an object class structure 7300P is acquired in which information of the character detection result is stored. Namely, an object class structure for storing information of character search is acquired on the basis of a data region of the cut structure indicating a pointer to object class structure. In the case of the cut structure 7200A shown in FIG. 38, the reference to a data region 95 is made to acquire an address for an object class structure 7300S.

Figure 38:
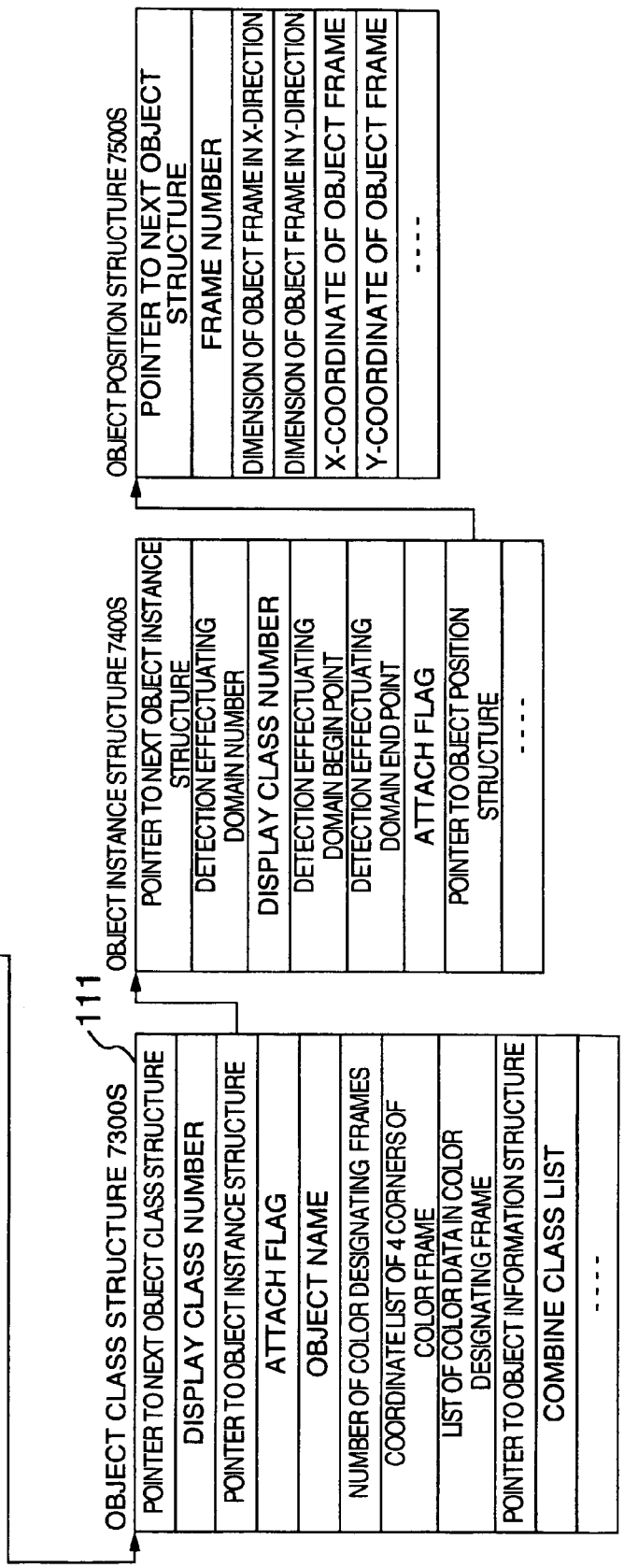
FIG. 38 shows another example of the data structure concerning the hierarchical structure for cuts.

Next or in step 8006 for data storage, each data of the result of detection is stored into the corresponding region of the object class structure 7300P and the succeeding structures. In other cases, each data of the result of character detection is stored into the corresponding region of the object class structure 7300S as shown in FIG. 38 and the succeeding structures as the same manner.

Next or in step 8007 for cut process completion judgement, the judgement concerning one attached M-icon for cuts in its lowermost layer is made as to whether or not the processing up to the data storage is completed. If the processing is not completed, the flow returns to step 8005. If the processing is completed, the flow proceeds to step 8009.

Next or in step 8009 for process completion judgement, the judgement concerning all list structures 7100A to 7100C (FIG. 36) for the scene structures of all the attached M-icons is made as to whether or not the processing up to the data storage is completed. If the processing is not completed, the flow returns to step 8002. If the processing is completed, the flow is finished.

Figure 34:
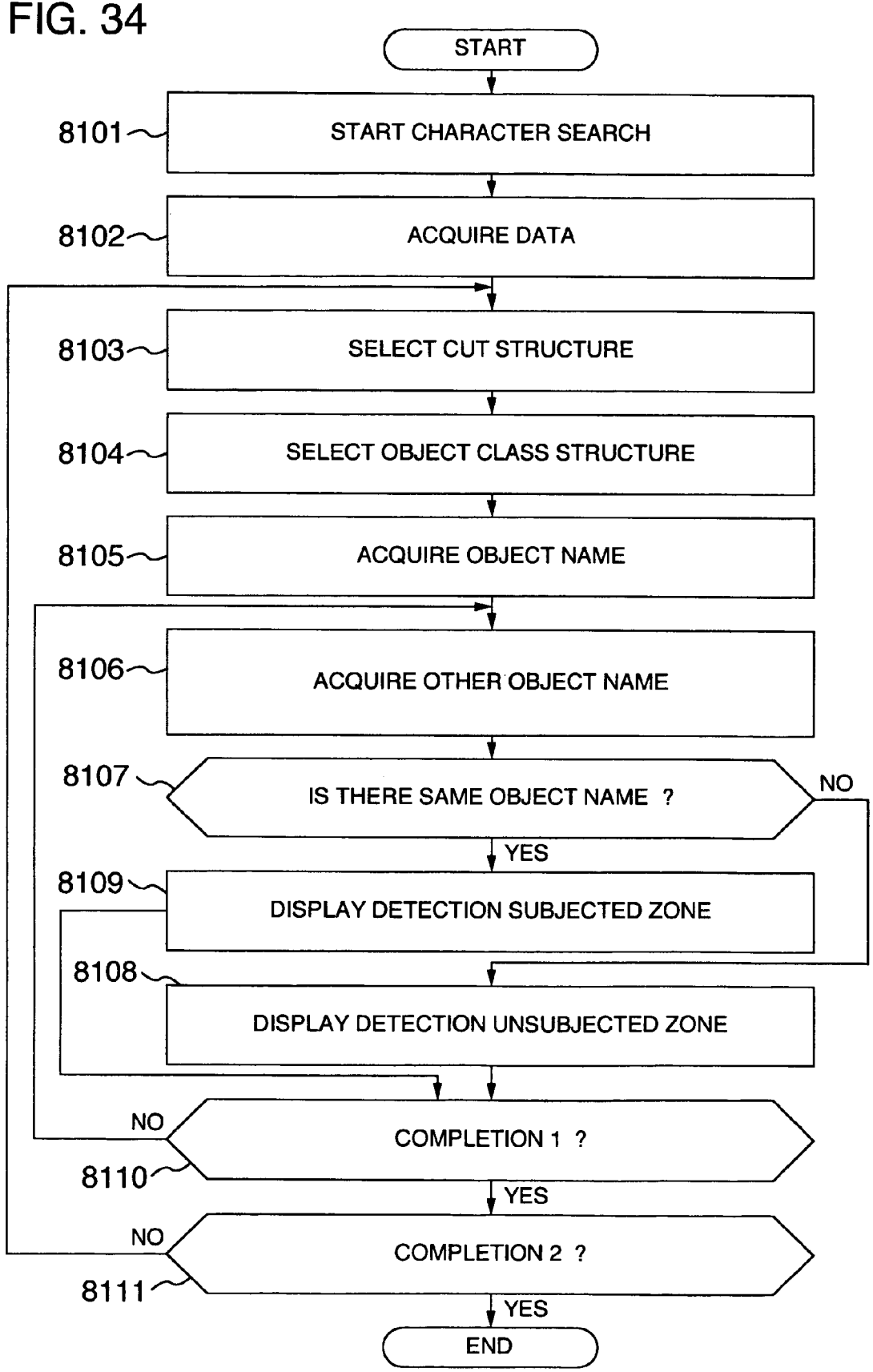
FIG. 34 shows a flow chart of a procedure for distinctively displaying a zone having already been subjected to image detection processing and a zone having not yet been subjected to image detection processing.

Next, the procedure for distinctively displaying a domain having already been subjected to character detection processing and a domain having not yet been subjected to character detection processing will be described referring to a flow chart shown in FIG. 34 and the data structures shown in FIGS. 35 to 41.

In step 8101 for character search start, an operator attaches the M-icons 1030 to 1032 in the material area 1020 by use of the mouse pointer 810 and clicks the character detecting button 1051 in the edition function button group 1050, thereby starting a character search.

Figure 33:
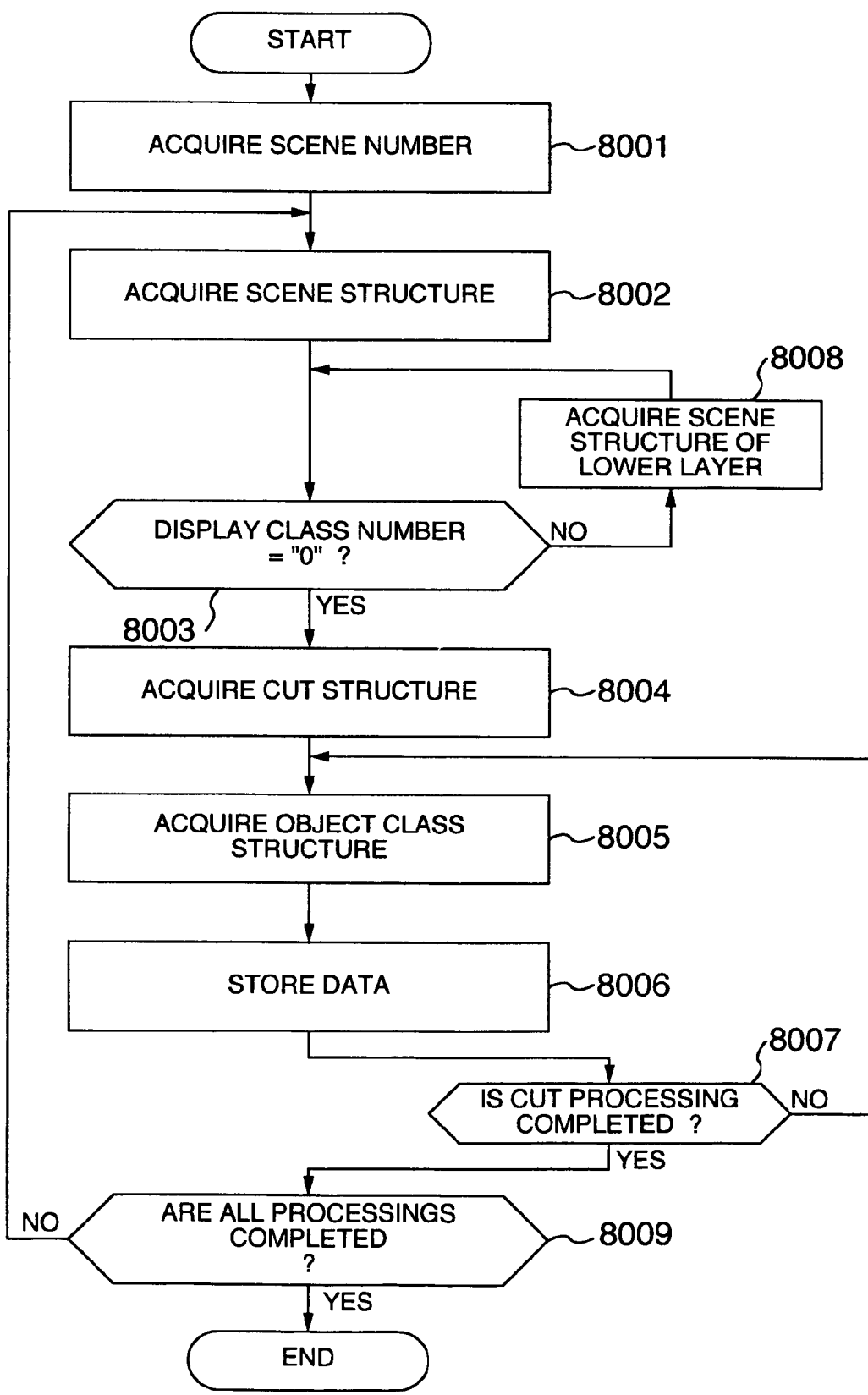
FIG. 33 shows a flow chart in the case where information of the result of image detection is stored into the data structures of M-icons in the lowermost layer of a hierarchical structure.

In step 8102 for data acquisition, the processing in the flow chart shown in FIG. 33 is performed to acquire data of the cut structures 7200(*a*) to 7200(*c*) (FIGS. 39 to 41) corresponding to the M-icons 1030 to 1032.

Figure 39:
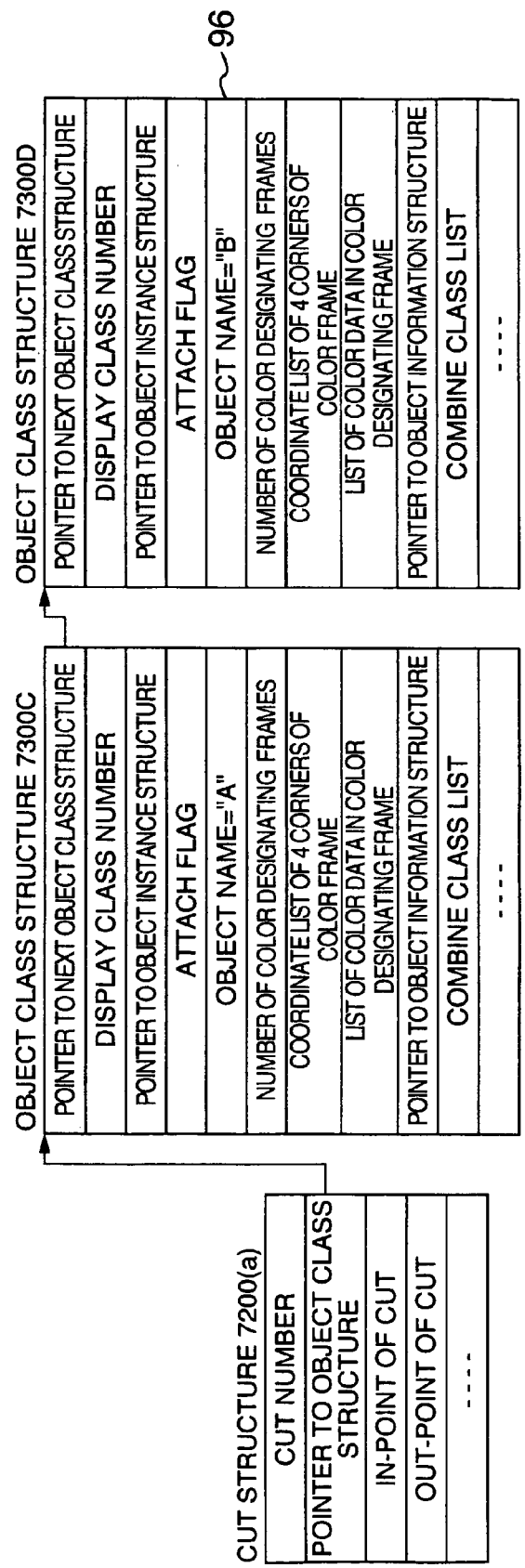
FIG. 39 shows a further example of the data structure concerning the hierarchical structure for cuts.
Figure 40:
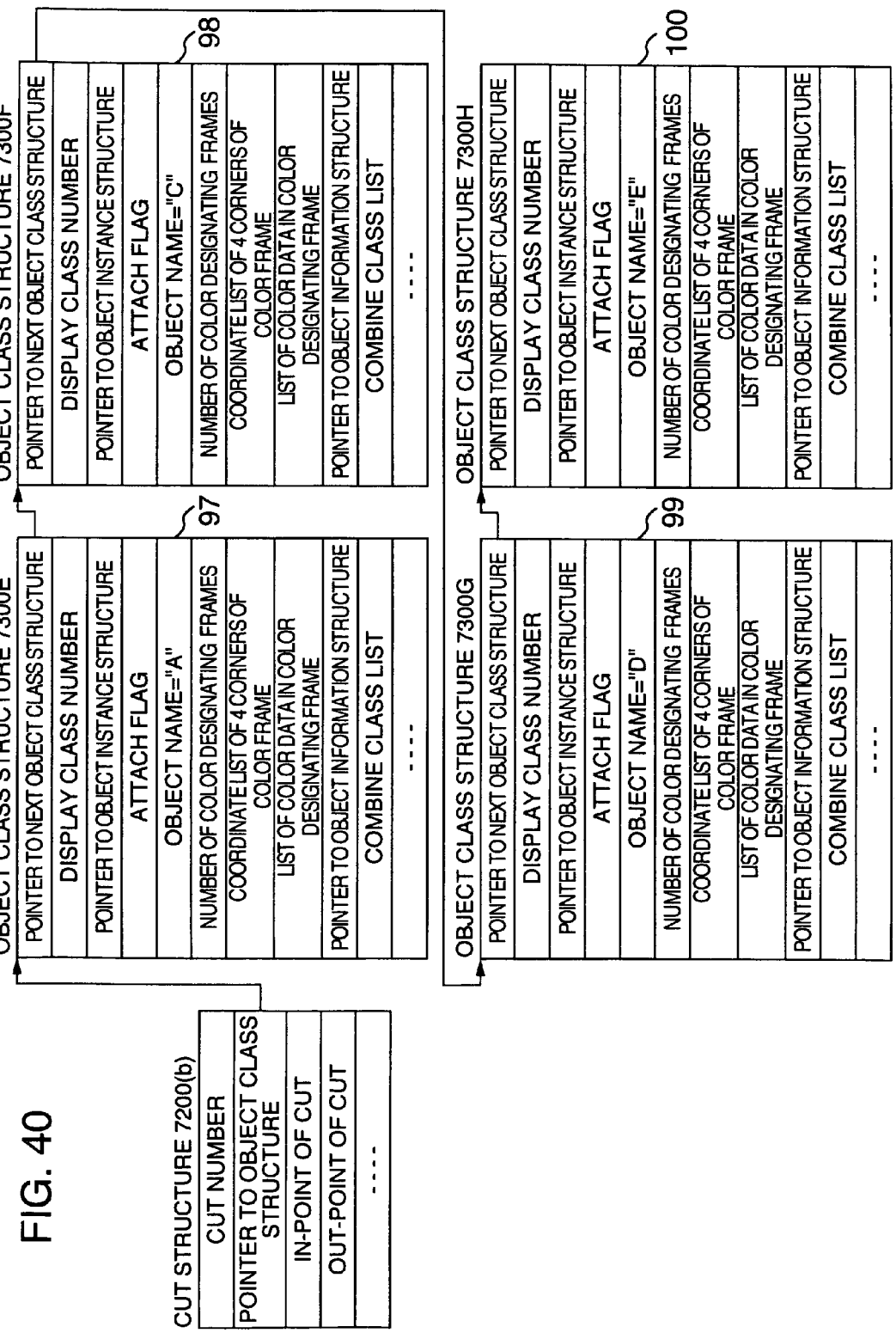
FIG. 40 shows a furthermore example of the data structure concerning the hierarchical structure for cuts.
Figure 41:
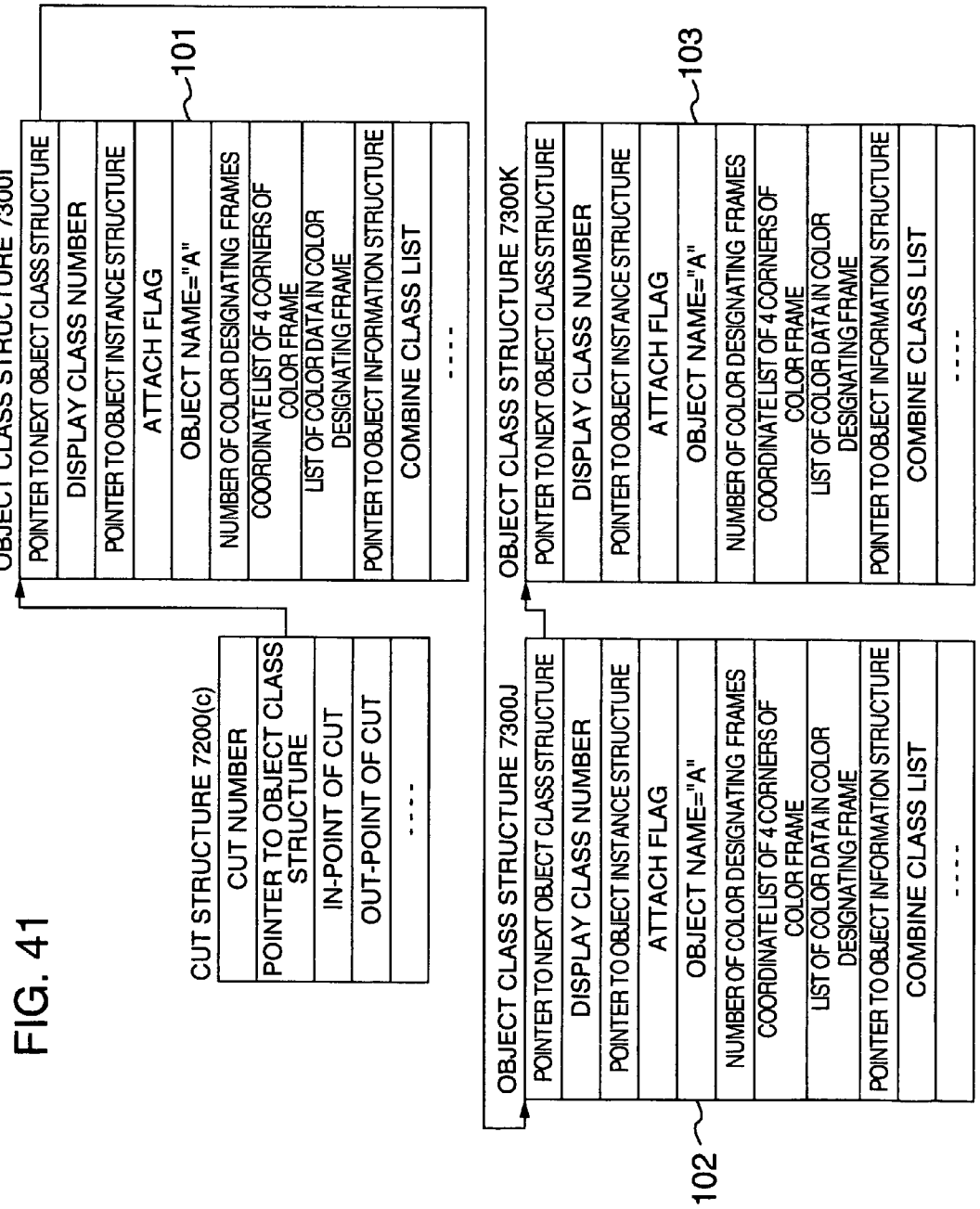
FIG. 41 shows a still further example of the data structure concerning the hierarchical structure for cuts.

In step 8103 for cut structure selection, one of the cut structures 7200(*a*) to 7200(*c*) shown in FIGS. 39 to 41 is selected. For example, the cut structure 7200(*a*) shown in FIG. 39 is selected.

In step 8104 for object class structure selection, there is selected one of object class structures which are under the cut structure selected in step 8103. For example, an object class structure 7300D is selected.

In step 8105 for object name acquisition, an object name in an object name data region of the object class structure selected in step 8104 is acquired. For example, for the object class structure 7300D, an object name "B" in a data region 95 thereof is acquired.

In step 8106 for other object name acquisition, one cut structure other than the cut structure selected in step 8103 is selected and object names in all object class structures under the selected other cut structure are acquired. For example, for all of object class structures 7300E to 7300H under the cut structure 7200(*b*) shown in FIG. 40, object names in data regions 96 to 99 thereof are acquired.

In step 8107 for object name judgement, the judgement is made of whether or not the same object name as the object name "B" acquired in step 8105 is included in the object names acquired in step 8106. If the same object same is not found out, the flow goes to step 8108. If the same object same is found out, the flow goes to step 8109.

In step 8108 for display of detection unsubjected zone, the zone 605 portion of the detection result display column 238 concerning the character "B" on the IDX panel 600 shown in FIG. 1 is displayed as a detection unsubjected zone 250 (for example, with the zone showily black-colored). Then, the flow proceeds to step 8100.

In step 8109 for display of detection subjected zone, that is, for example, in the case where there is an object class structure having the object name "B", the color distinction between a detection effectuating domain and a detection ineffectuating domain is made for the zone portion of the detection result display column of FIG. 1 corresponding to the cut structure. Then, the flow proceeds to step 8100.

For example, provided that for all object class structure 73001 to 7300J under the cut structure 7200(*c*) shown in FIG. 41, object names are acquired from data regions 100 to 102 thereof (step 8106), it is determined that the object class structure 7300J has the same object name "B". Therefore, a detection effectuating domain and a detection ineffectuating domain are distinctively displayed in the zone 606 portion of the detection result display column 238 concerning the character "B" on the IDX panel 600 shown in FIG. 1.

In step 8110 for completion 1 judgement, the judgement is made of whether or not the processings of steps 8106 to 8109 are completed for all the cut structures. If the case is so, the flow proceeds to step 8111. If the case is not so, the flow returns to step 8106.

In step 8111 for completion 2 judgement, the judgement is made of whether or not the processings of steps 8103 to 8110 are completed for all the cut structures. If the case is not so, the flow returns to step 8103. If the case is so, the processing along the flow chart is completed.

Next, the description will be described of the data structures of FIGS. 35 to 41 used in the present invention. In the case where a processing for detection of a specified character is performed for frame images in one cut, one object class structure is generated for one character. For example, the zones 604 of the detection result display columns 237 and 238 on the IDX panel shown in FIG. 1 correspond to the object class structure 7300P shown in FIG. 37A and the object class structure 7300Q shown in FIG. 37B.

By virtue of "POINTER TO NEXT OBJECT CLASS STRUCTURE", a list structure for object class structures can be formed. For example, the zone 604 of the detection result display column 237 on the IDX panel shown in FIG. 1 shows an object class structure 7300P shown in FIG. 37A and a pointer to next object class structure field 120 in the object class structure 7300P indicates an object class structure 7300Q corresponding to the zone 604 of the detection result display column 238.

Figure 37A:
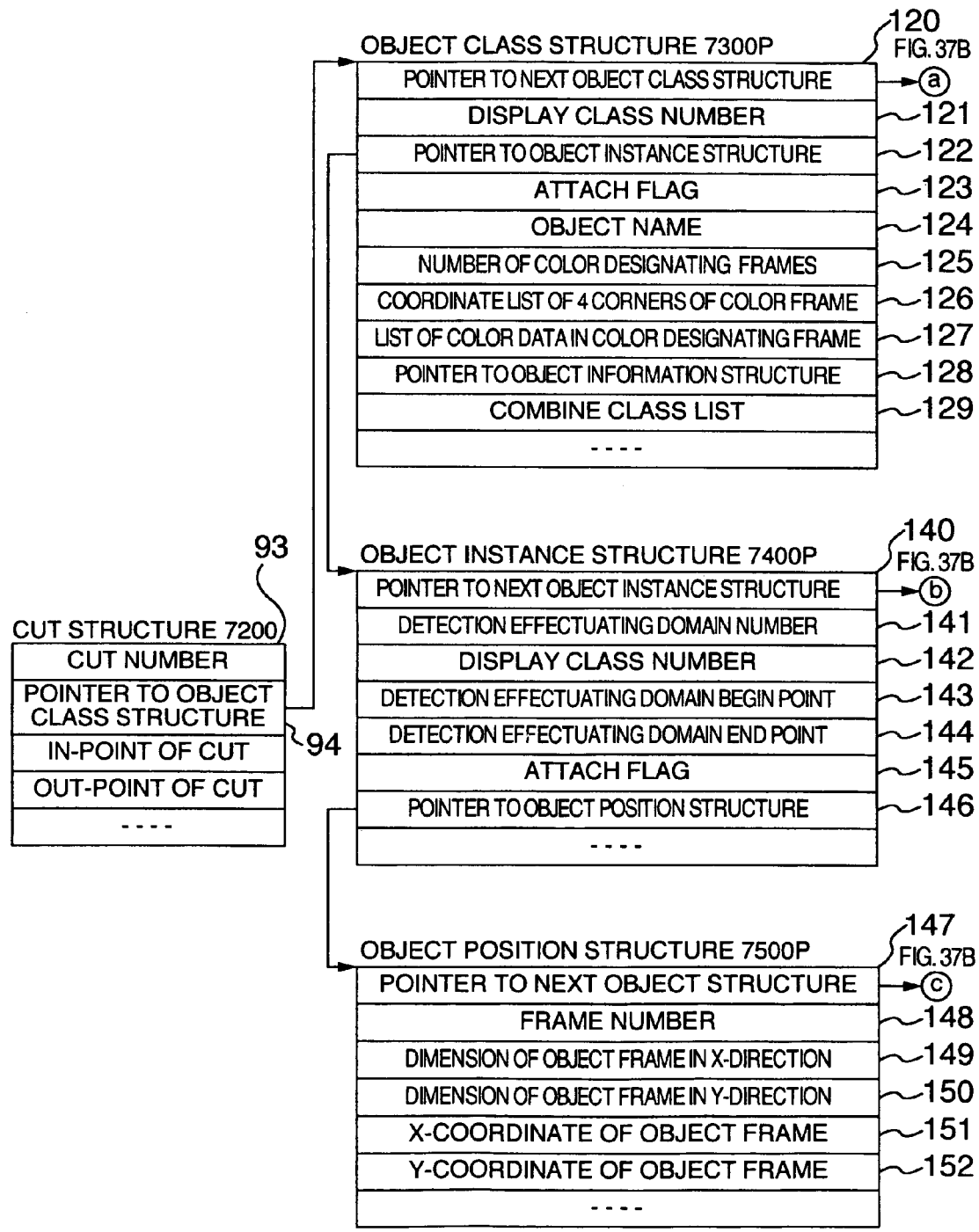

Provided that the zone 604 of the detection result display column 237 on the IDX panel shown in FIG. 1 is the zero-th zone, "0" is stored in a display class number field 121 of the object class structure 7300P shown in FIG. 37A. Also, since the zone 605 of the detection result display column 237 is the 1-st zone, "1" is stored in a display class number field 130 of the object class structure 7300Q shown in FIG. 37B.

By virtue of a pointer to object instance structure 122, it is possible to refer to an object instance structure in which data of one detection effectuating domain is stored. The details of the object instance structure will be described later on.

"ATTACH FLAG" is a flag indicating whether or not a target image on the IDX panel (shown in, for example, FIG. 1) is clicked by the mouse. "ATTACH FLAG"="1" indicates the presence of attachment and "ATTACH FLAG"= "0" indicates the absence of attachment. For example, in the case where the target image 631 is clicked or attached by the mouse, an attach flag 123 of the object class structure 7300P corresponding to the zone 604 at the head of the detection result display column 237 is turned to "1".

"OBJECT NAME" is a name of a character made an object of character detection processing. For example, the character name 634 "A" on the IDX panel shown in FIG. 1 is stored in an object name 124 of the object class structure 7300P. This name is a name inputted by the user as the object name 547 on the ID panel shown in FIG. 17.

"NUMBER OF COLOR DESIGNATING FRAMES" indicates the number of color designating frames designated for setting a color pattern. For example, since three color designating frames 503, 504 and 505 are set in the enlarged image 502 on the ID panel shown in FIG. 17, a numeric value in a number of color designating frames field 125 of the object class structure 7300P is "3".

A "COORDINATE LIST OF FOUR CORNERS OF COLOR DESIGNATING FRAMES" (two-dimensional array) field stores the x- and y-coordinates of four corners of color designating frames on the screen. The x- and y-coordinates are the coordinates on the screen in the lateral and longitudinal directions, respectively. Coordinate sets exist by the number of color designating frames. For example, since three color designating frames are set in the enlarged image 502 on the ID panel shown in FIG. 17, three coordinate sets each having the x- and y-coordinates of four corners of one color designating frame are stored in a coordinate list of four corners of color designating frames field 126 of the object class structure 7300P. A "LIST OF COLOR DATA IN COLOR DESIGNATING FRAMES" (two-dimensional array) field stores data of designation colors in color designating frames. Color data sets exist by the number of color designating frames. For example, since three color designating frames are set in the enlarged image 502 on the ID panel shown in FIG. 17, three color data sets are stored in a list of color data in color designating frames field 127 of the object class structure 7300P.

A "POINTER TO OBJECT INFORMATION STRUCTURE" field 128 of the object class structure 7300P stores information for referring to an object information structure in which information associated with the character made the object of character detection processing (for example, birth date, copyright and so forth) is stored.

In the case where a combine processing is performed on the IDX panel shown in FIG. 1, display class numbers in object class structures in the same cut made an object of combination are stored in a "COMBINE CLASS LIST" (one-dimensional array) field. For example, in the case where the detection result display columns 237 and 238 are combined, a numeric value in the display class number 121 of the object class structure 7300P and a numeric value in the display class number 130 of the object class structure 7300Q are stored in the combine class list field 129 of the object class structure 7300P.

Next, the object instance structure will be described. In the case where a processing for detection of a specified character is performed for frame images in one cut, one object instance structure is generated for a domain in which one character exists. For example, the detection effectuating domains 614 in the zones 604 of the detection result display column 237 on the IDX panel shown in FIG. 1 correspond to object instance structures 7400P, 7400Q and 7400R shown in FIGS. 37A, 37B and 37C.

By virtue of "POINTER TO NEXT OBJECT INSTANCE STRUCTURE", a list structure for object instance structures can be formed. For example, the first one of the detection effectuating domains 614 in the zone 604 of the detection result display column 237 on the IDX panel shown in FIG. 1 is the object instance structure 7400P (FIG. 37A) and a pointer to next object instance structure field 140 in the object instance structure 7400P indicates the object instance structure 7400Q (FIG. 37B) corresponding to the second one of the detection effectuating domains 614.

"DETECTION EFFECTUATING DOMAIN NUMBER" is a unique serial number for object instance structure. For example, provided that the first one of the detection effectuating domains 614 in the zone 604 of the detection result display column 237 on the IDX panel shown in FIG. 1 is the zero-th domain, "0" is stored in a detection effectuating domain number 141 of the object instance structure 7400P shown in FIG. 37A. Since the second detection effectuating domain 614 is the 1-st domain, "1" is stored is stored in a detection effectuating domain number 161 of the object instance structure 7400Q shown in FIG. 37B.

A "DISPLAY CLASS NUMBER" field of the object instance structure stores a display class number of an object class structure to which that object instance structure belongs. For example, a numeric value in the display class number field 121 of the object class structure 7300P is shown in a display class number field 142 of the object instance structure 7400P shown in FIG. 37A.

"DETECTION EFFECTUATING DOMAIN BEGIN POINT" is a frame number indicating the beginning of a detection effectuating domain. For example, a frame number of the beginning of the first one of the detection effectuating domains 614 in the zone 604 of the detection result display column 237 on the IDX panel shown in FIG. 1 is stored in a detection effectuating domain begin point 143 of the object instance structure 7400P shown in FIG. 37A.

"DETECTION EFFECTUATING DOMAIN END POINT" is a frame number indicating the end of a detection effectuating domain. For example, a frame number of the end of the first one of the detection effectuating domains 614 in the zone 604 of the detection result display column 237 on the IDX panel shown in FIG. 1 is stored in a detection effectuating domain end point 144 of the object instance structure 7400P shown in FIG. 37A.

"ATTACH FLAG" is a flag indicating whether or not a detection effectuating domain on the IDX panel is clicked by the mouse. "ATTACH FLAG"="1" indicates the presence of attachment and "ATTACH FLAG"="0" indicates the absence of attachment. For example, in the case where the first one of the detection effectuating domains 614 in the zone 604 of the detection result display column 237 on the IDX panel shown in FIG. 1 is clicked or attached by the mouse, an attach flag 145 of the object instance structure 7400P shown in FIG. 37A is turned to "1".

A "POINTER TO OBJECT POSITION STRUCTURE" field (146) of the object instance structure stores information for referring to an object position structure in which data of an object frame indicating the position of a character made an object of character detection processing in one frame is stored.

Next, the object position structure will be described. The object position structure stores data of an object frame indicating the position of a character made an object of character detection processing in one frame. For example, the object frames 561 to 563 on the ID panel shown in FIG. 17 correspond to object position structures 7500P to 7500R shown in FIGS. 37A to 37C.

By virtue of "POINTER TO NEXT OBJECT POSITION STRUCTURE" (147), a list structure for object position structures can be formed.

For example, the object frame 561 on the ID panel shown in FIG. 17 is the object position structure 7500P (FIG. 37A) and a pointer to next object position structure field 147 of the object position structure 7500P indicates the object position structure 7500Q (FIG. 37B) corresponding to the object frame 562.

"FRAME NUMBER" is a unique frame number of a cut in which an object frame exists. For example, a frame number of the object frame 561 on the ID panel shown in FIG. 17 is stored in a frame number field 148 of the object position structure 7500P shown in FIG. 37A.

"DIMENSION OF OBJECT FRAME IN X-DIRECTION" indicates the length of an object frame on the screen in a lateral direction. For example, the lateral length of the object frame 561 on the ID panel shown in FIG. 17 is stored in a dimension of object frame in x-direction field 149 of the object position structure 7500P shown in FIG. 37A.

"DIMENSION OF OBJECT FRAME IN Y-DIRECTION" indicates the length of an object frame on the screen in a longitudinal direction. For example, the longitudinal length of the object frame 561 on the ID panel shown in FIG. 17 is stored in a dimension of object frame in y-direction field 150 of the object position structure 7500P shown in FIG. 37A.

"X-COORDINATE OF OBJECT FRAME" indicates the x-coordinate of the left/upper corner of an object frame on the screen. For example, the x-coordinate of the left/upper corner of the object frame 561 on the ID panel shown in FIG. 17 is stored in an x-coordinate of object frame field 151 of the object position structure 7500P shown in FIG. 37A.

"Y-COORDINATE OF OBJECT FRAME" indicates the y-coordinate of the left/upper corner of an object frame on the screen. For example, the y-coordinate of the left/upper corner of the object frame 561 on the ID panel shown in FIG. 17 is stored in a y-coordinate of object frame field 152 of the object position structure 7500P shown in FIG. 37A.

According to the embodiment of the present invention mentioned above, the scroll processing for a film image by the dragging of a detection arrow or the attachment of the film image is possible. Therefore, it is possible to make the adjustment of a long film image without operating a scroll bar.

A second effect of the embodiment of the present invention is that it is possible to change only designated object frames regularly or systematically through interpolation change.

What is claimed is:

1. A method for forming a hierarchical structure of representative images for use in editing a motion picture, wherein said hierarchical structure including a plurality of representative images is displayed on a screen of a display device, each of said representative images represents a series of frame images forming said motion picture, said method of forming a hierarchical structure comprising the steps of;

selecting first representative images representing a series of said frame representative images;

designating by a user a feature of a predetermined object to be detected in a frame image of the representative images;

performing an image detection processing for detecting said predetermined object based on said feature from a series of frame images corresponding to said selected first representative images;

displaying first information showing that said predetermined object is included in a series of said frame images on said screen, as a result of said image detection processing displaying second information showing that said image detection processing has not been performed yet in a series of said frame images; and forming said hierarchical structure based on said first representative images corresponding to a series of said frame images within which said predetermined object has been detected.

2. A method according to claim 1, wherein in the step of displaying said first information, said frame images including said predetermined object and said frame not including said predetermined object are distinctively displayed.

3. A method according to claim 1, wherein said image detection processing is performed based on one or more features possessed by said predetermined object.

4. A method according to claim 1, wherein said predetermined object is the image of an object appearing in said motion picture.

5. A method according to claim 1, further comprising a step to deleting a part of said first information on said screen.

6. A method according to claim 1, further comprising a step of:

performing separately plural image detection processings on the basis of different features for predetermined objects, and displaying in combination of results of said plural image detection processings on said screen.

7. A method according to claim 1, further comprising a step of:

displaying, said representative image combined with additional information which relates to said predetermined object detected by said image detection processing, on said screen.

8. A method according to claim 1, further comprising a step of:

varying a display area of said first information on said screen.

9. A method according to claim 1, further comprising a the steps of:

selecting one of said representative images constructing said hierarchical structure;

applying said image detection processing to a series of frame images corresponding to said selected representative image, wherein the results of said image detection processing are included in said representative images arranged at the lowest position of said hierarchical structure.

10. An image information displaying method according to claim 1, wherein said representative image is displayed in multi-layers form of a series of frame images on said screen, and said frame images containing said predetermined object detected in said image detection processing and said frame images containing no said predetermined object are distinctively displayed on a side face portion of said multi-layers form.

11. An image information display method according to claim 1, further comprising a step of:

displaying three windows simultaneously on said screen, said three windows including a first window which displays said hierarchical structure to edit the motion picture, a second window which displays the selected first representative images applied said image detection processing, and a third window which displays the detection result of said image detection processing corresponding to said the selected first representative images.

12. An image information displaying method according to claim 11, wherein said representative images are displayed in said first window with an image size so that said hierarchical structure formed by said representative images can be displayed in said first window, and the displayed representative image is designated by the GUI so that said image detection processing is applied to the designated representative image.

13. An image information displaying method for editing a motion picture, wherein a representative image representing a series of frame images forming the motion picture is displayed on a screen of a display device and a hierarchical structure based on a plurality of the representative images is displayed on said screen, said method comprising the steps of:

selecting first representative images in each of which a predetermined object to be detected is included, from said representative images based on an image detection processing;

displaying a first information relating to said representative images including said first representative images, to which said image detection processing has been performed, on said screen; and displaying a second information relating to said representative images, to which said image detection processing has not been performed, yet, with said first information, simultaneously, on said screen, wherein said image detection processing comprises the steps of:

displaying an object frame on the detected predetermined object, said object frame designating a part of a selected frame image which contains said predetermined object, making the judgment of whether or not the same image information as image information of a region enclosed by said object frame is included in the plurality of frame images applied to said image detection processing, and changing at least one of the size and position of said object frame by I operating icons displayed on said screen.

14. An image information displaying apparatus for editing a motion picture, comprising:

a display device having a screen for displaying representative images representing a series of frame images forming the motion picture;

a control device for controlling image information displayed on said screen;

a storage device for storing said frame images, said image information and data for managing said frame images and said image information; and an input device for inputting data into said control device, wherein said control device comprises:

means for selecting first representative images representing a series of said frame images;

means for designating by a user a feature of a predetermined object to be detected in a frame image of the representative images;

means for performing an image detection processing for detecting said predetermined object based on said feature from a series of frame images corresponding to said selected first representative images;

means for displaying a first information showing that said predetermined object is included in a series of said frame images on said screen, as a result of said image detection processing and displaying a second information showing that said image detection processing has not been performed yet in a series of said frame images; and means for forming said hierarchical structure based on said first representative images corresponding to a series of said frame images which said predetermined object have been detected.

15. A computer program embodied on a computer readable medium for the display of image information for editing a motion picture, said computer readable medium having computer readable program code means comprising:

means for selecting first representative images representing a series of said frame images;

means for designating by a user a feature of a predetermined object to be detected in a frame image of the representative images;

means for performing an image detection processing for detecting said predetermined object based on said feature from a series of frame images corresponding to said selected first representative images;

means for displaying a first information showing that said predetermined object is included in a series of said frame images on said screen, as a result of said image detection processing and displaying a second information showing that said image detection processing has not been performed, yet, in a series of said frame images; and means for forming said hierarchical structure based on said first representative images corresponding to a series of said frame images which said predetermined object have been detected.

16. A method of displaying for editing a motion picture, wherein a hierarchical structure based on a plurality of representative images is displayed on a screen of a display device, each of which represents a series of frame images forming said motion picture, said method comprising the steps of:

selecting representative images representing a series of said frame images;

designating by a user a feature of a predetermined object to be detected in a frame image of the representative images;

performing an image detection processing for detecting said predetermined object based on said feature from a series of frame images corresponding to said selected first representative images;

displaying said predetermined object;

displaying a first information showing that said predetermined object is included in a series of said frame images on said screen, as a result of said image detection processing; and displaying a second information showing that said image detection processing has not been performed yet in a series of said frame images.

17. An image information displaying method for editing a motion picture, wherein a hierarchical structure based on a plurality of representative images is displayed on said screen of a display device, each of which represents a series of frame images forming said motion picture, said method comprising the steps of:

selecting first representative images representing a series of said frame images;

performing an image detection processing for detecting a predetermined object from a series of frame images corresponding to said selected first representative images;

displaying a first information showing that said predetermined object is included in a series of said frame images on said screen, as a result of said image detection processing; and displaying a second information showing that said image detection processing has not been performed yet in a series of said frame images;

wherein said image detection processing includes:

a step of displaying an object frame on the detected predetermined object, said object frame designating a part of a selected frame image which contains said predetermined object;

a step of making the judgment or whether or not the same image information as image information of a region enclosed by said object frame is included in the plurality of frame images applied to said image detection processing; and a step of changing at least one of the size and position of said object frame by operating icons displayed on said screen.

* * * * *

UNITED STATES PATENT AND TRADEMARK OFFICE
CERTIFICATE OF CORRECTION

PATENT NO. : 6,983,420 B1
DATED : January 3, 2006
INVENTOR(S) : T. Itou et al.

It is certified that error appears in the above-identified patent and that said Letters Patent is hereby corrected as shown below:

<u>Title page,</u>
Item [75], Inventors, insert:
-- Tsutomu Itou, Kodaira-shi (JP); Hirotada Ueda, Kokubunji-shi (JP); Masanori Sumiyoshi, Kodaira-shi (JP) --.

Signed and Sealed this

Eighteenth Day of April, 2006

JON W. DUDAS
*Director of the United States Patent and Trademark Office*